(12) United States Patent
Sugimori et al.

(10) Patent No.: US 12,106,561 B2
(45) Date of Patent: Oct. 1, 2024

(54) INFORMATION PROCESSING DEVICE, INFORMATION PROCESSING METHOD, AND PROGRAM

(71) Applicant: Sony Group Corporation, Tokyo (JP)

(72) Inventors: Shigeo Sugimori, Tokyo (JP); Yuki Murata, Tokyo (JP)

(73) Assignee: Sony Group Corporation, Tokyo (JP)

( * ) Notice: Subject to any disclaimer, the term of this patent is extended or adjusted under 35 U.S.C. 154(b) by 78 days.

(21) Appl. No.: 17/798,684

(22) PCT Filed: Jan. 28, 2021

(86) PCT No.: PCT/JP2021/003094
§ 371 (c)(1),
(2) Date: Aug. 10, 2022

(87) PCT Pub. No.: WO2021/166583
PCT Pub. Date: Aug. 26, 2021

(65) Prior Publication Data
US 2023/0137452 A1    May 4, 2023

(30) Foreign Application Priority Data

Feb. 17, 2020   (JP) .............................. 2020-024625
Sep. 28, 2020   (JP) .............................. 2020-162637

(51) Int. Cl.
*G06V 20/30*    (2022.01)
*G06F 3/0484*   (2022.01)
*G06T 11/60*    (2006.01)
*G06V 20/00*    (2022.01)
(Continued)

(52) U.S. Cl.
CPC ............ *G06V 20/30* (2022.01); *G06F 3/0484* (2013.01); *G06T 11/60* (2013.01); *G06V 20/35* (2022.01); *G11B 27/031* (2013.01); *G06T 2200/24* (2013.01); *G06V 40/174* (2022.01)

(58) Field of Classification Search
CPC ...... G06V 20/30; G06V 20/35; G06F 3/0484; G06T 11/60; G11B 27/031
See application file for complete search history.

(56) References Cited

U.S. PATENT DOCUMENTS 9,311,961  B2 *  4/2016  Yamaji ................. G11B 27/034
2015/0242090 A1 *  8/2015  Suzuki ................ G06F 3/04817
                                                       715/765
2019/0205685 A1 *  7/2019  Hara ................... G06F 16/5866

FOREIGN PATENT DOCUMENTS

JP   2016-081173 A   5/2016
JP   2017-058783 A   3/2017
(Continued)

OTHER PUBLICATIONS

International Search Report (PCT/ISA/210), International Application No. PCT/JP2021/003094, dated Apr. 20, 2021.

*Primary Examiner* — Mishawn N. Hunter
(74) *Attorney, Agent, or Firm* — Michael Best & Friedrich LLP

(57) ABSTRACT

An information processing device performs a control process that provides a user interface that allows a designation operation for designating an extraction condition for an image group of images captured at an event related tom marriage, and an extraction process that extracts an image from the image group according to the designated extraction condition.

18 Claims, 67 Drawing Sheets

(51) Int. Cl.
*G11B 27/031* (2006.01)
*G06V 40/16* (2022.01)

(56) References Cited

FOREIGN PATENT DOCUMENTS

| WO | 2014/073275 A1 | 5/2014 |
| WO | 2019/132016 A1 | 7/2019 |

* cited by examiner

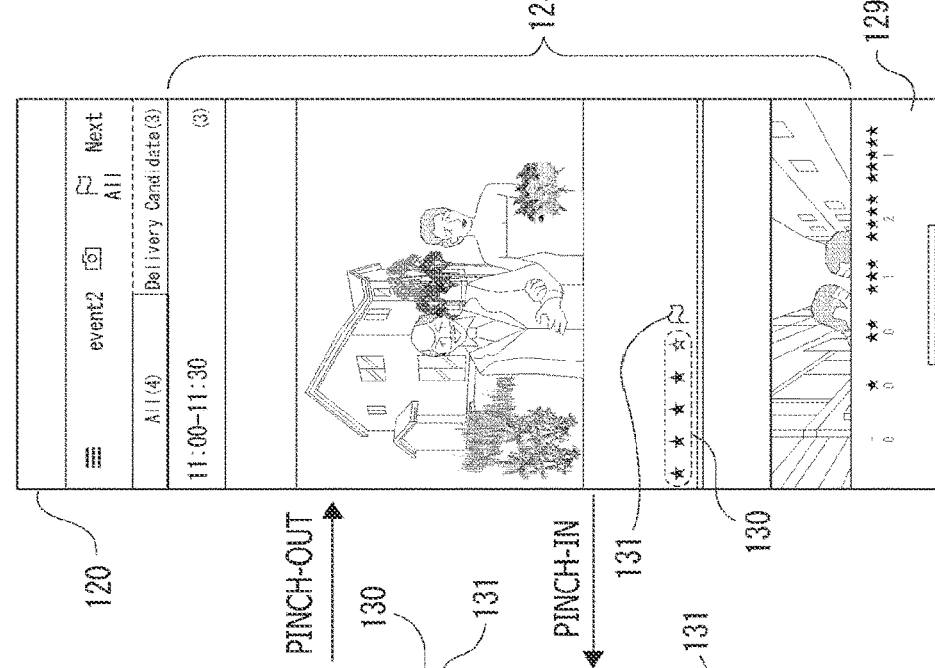
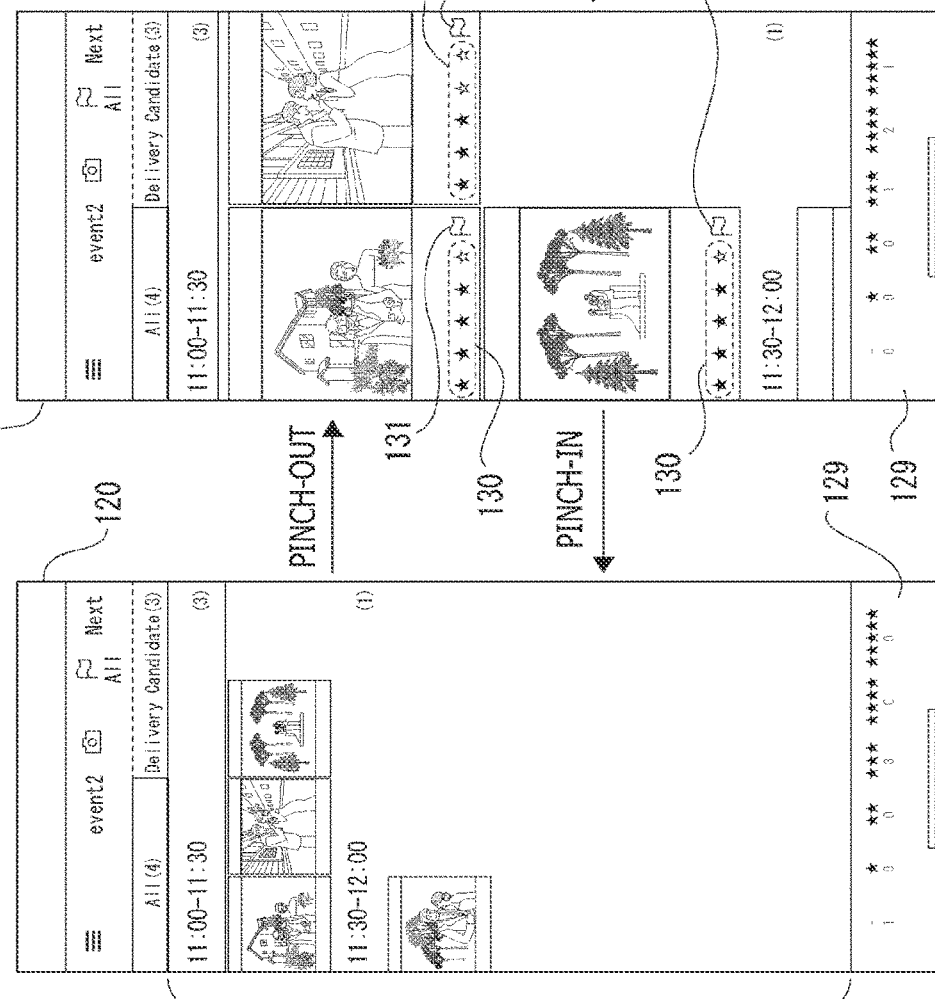
FIG. 20

FIG. 32
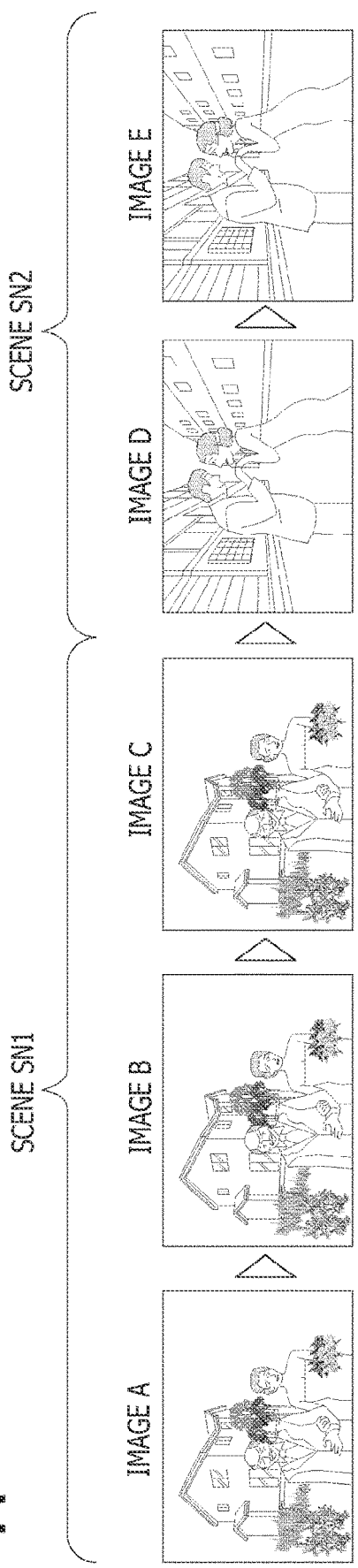
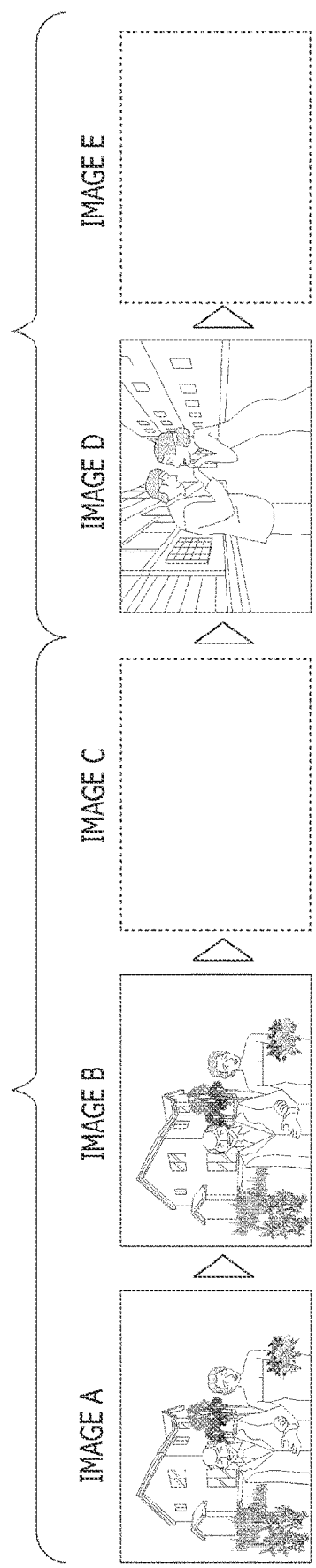

FIG.35
A  BEFORE EVALUATION REPLACEMENT
IMAGE W
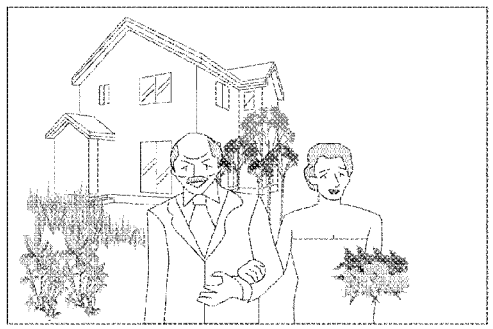
★★★☆☆
IMAGE Y
☆☆☆☆☆
B  AFTER EVALUATION REPLACEMENT
IMAGE W
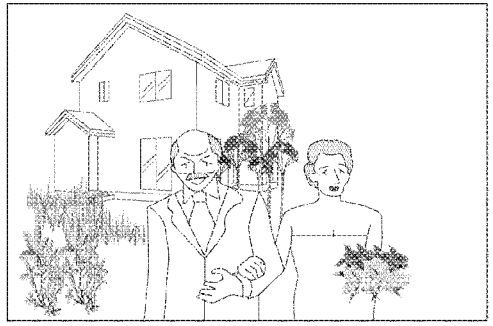
☆☆☆☆☆
IMAGE Y
★★★☆☆

FIG.36
A  BEFORE EVALUATION REPLACEMENT
IMAGE W
IMAGE Y
B  AFTER EVALUATION REPLACEMENT
IMAGE W
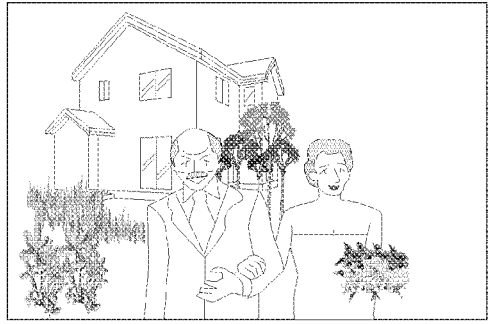
IMAGE Y

FIG.37
A 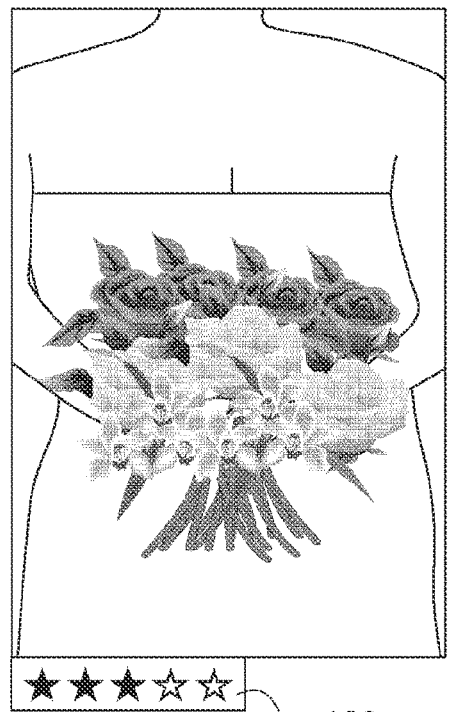
B 

FIG.38
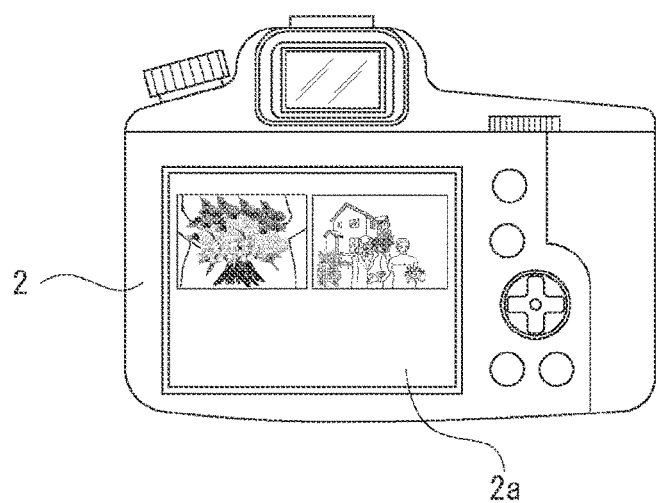
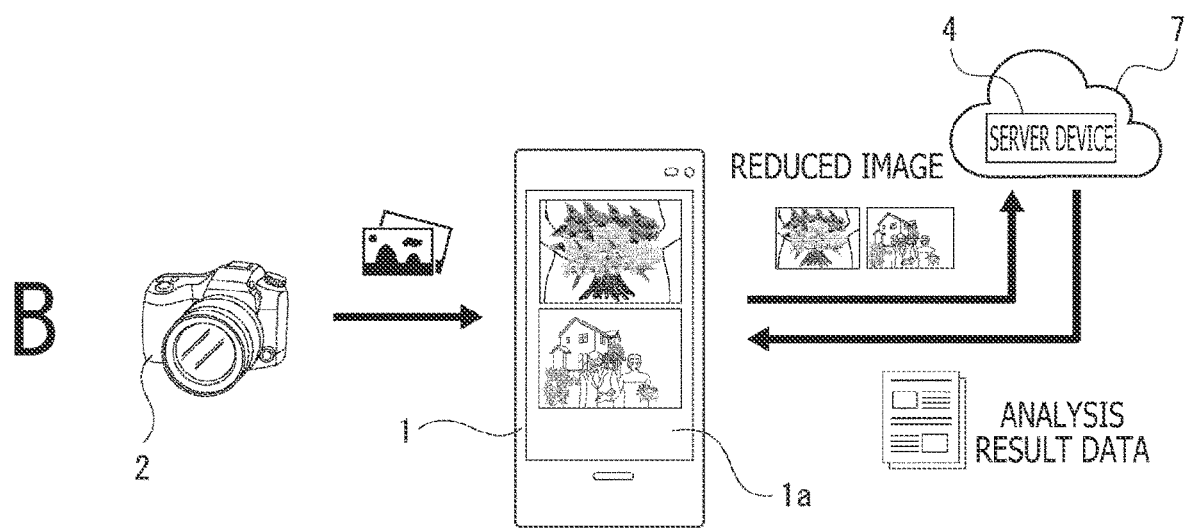
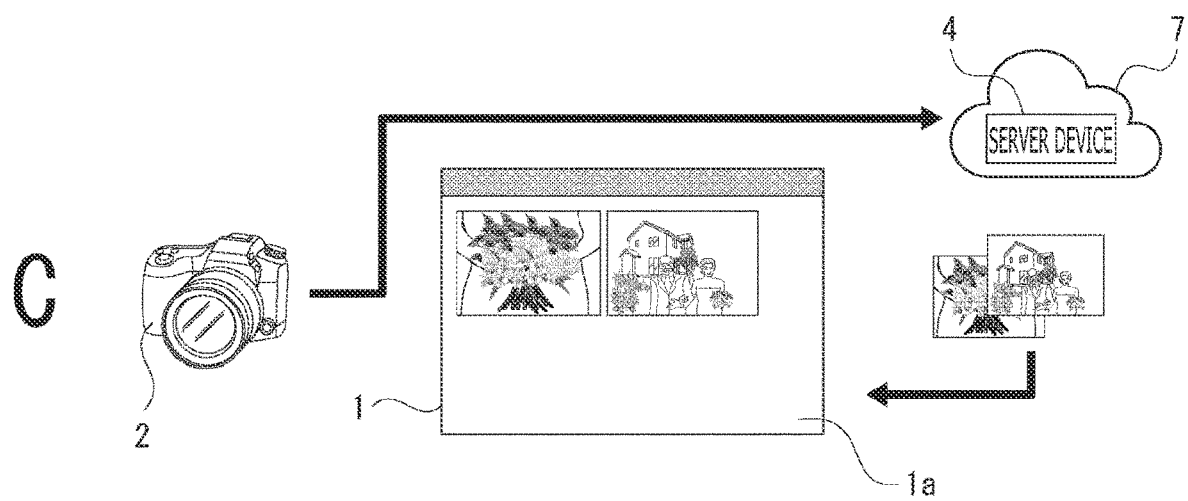

FIG.39
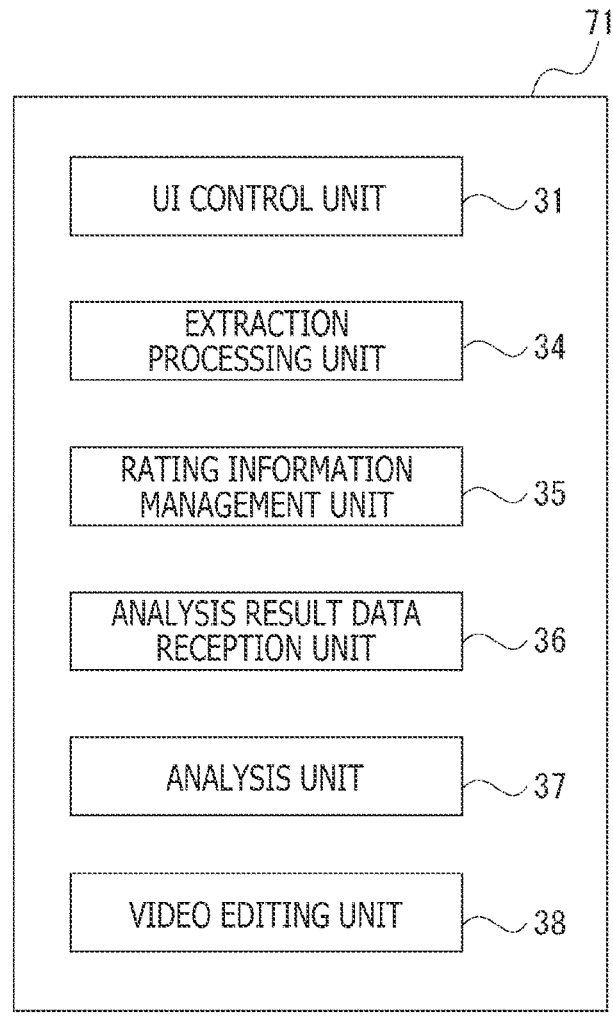
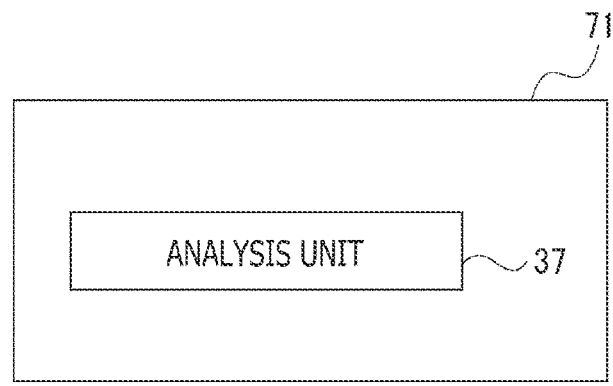

FIG.40
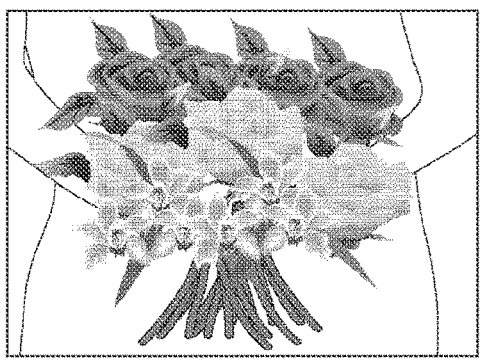
A 
OBJECT: BOUQUET
RECOGNITION RATE: 80%
B 
OBJECT: BRIDE
RECOGNITION RATE: 80%
OBJECT: BRIDEGROOM
RECOGNITION RATE: 75%
OBJECT: CAKE
RECOGNITION RATE: 70%

FIG. 41
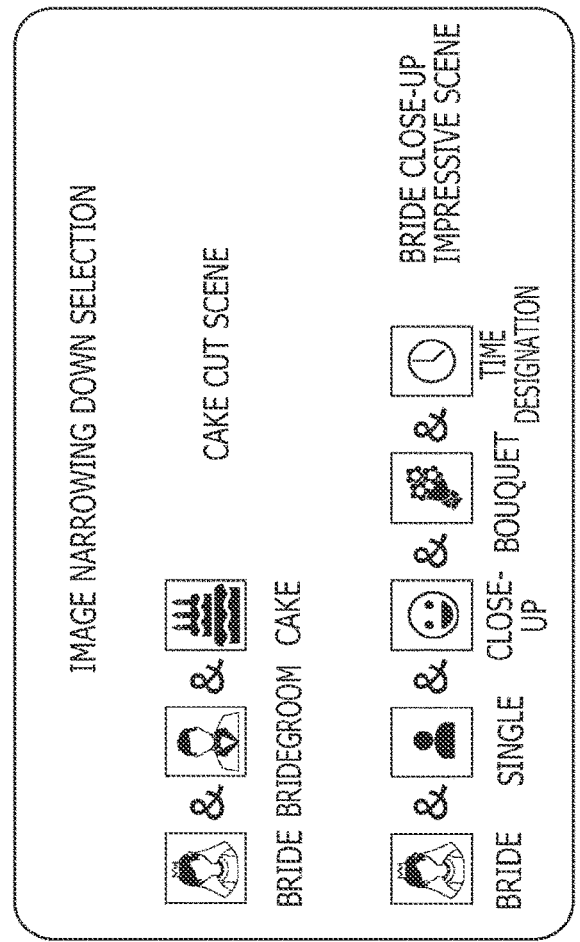
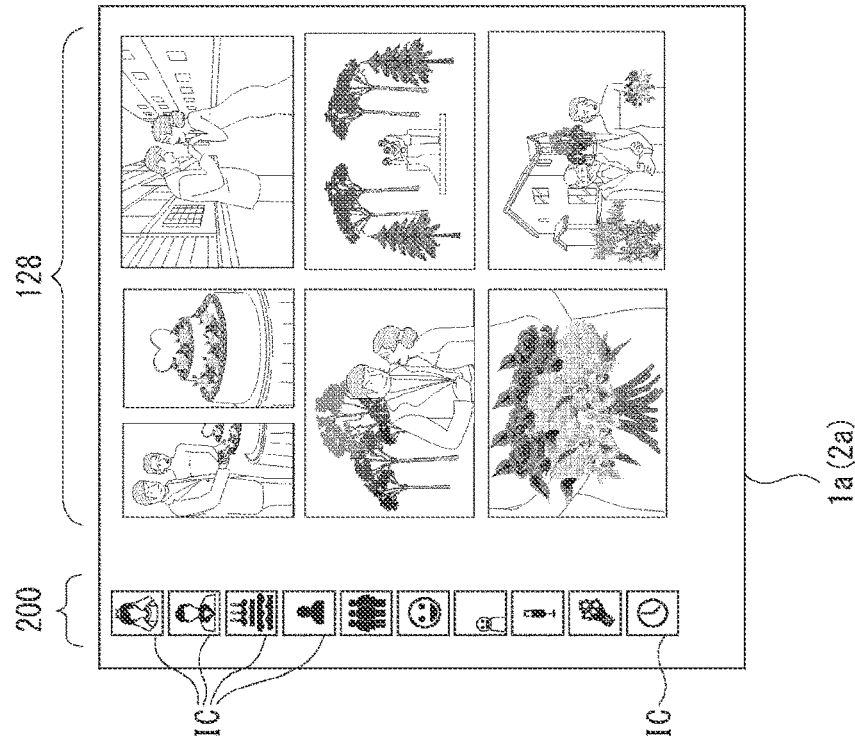

FIG. 46
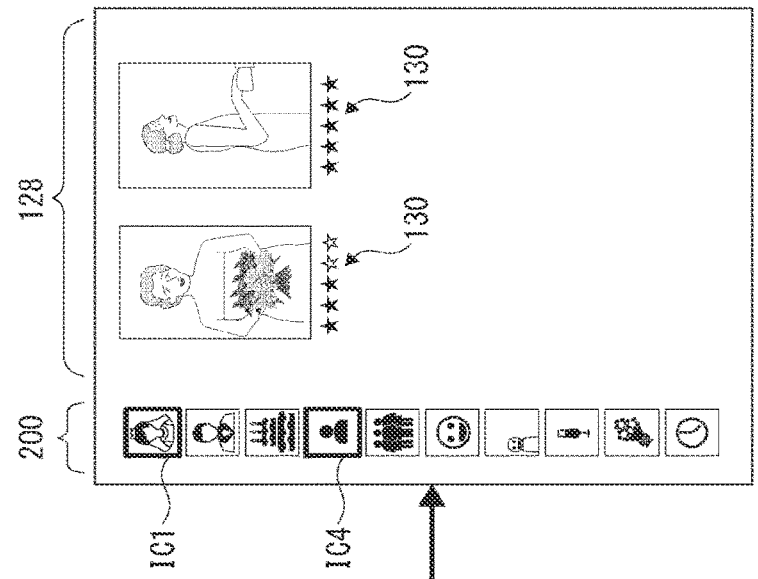
C
RATING
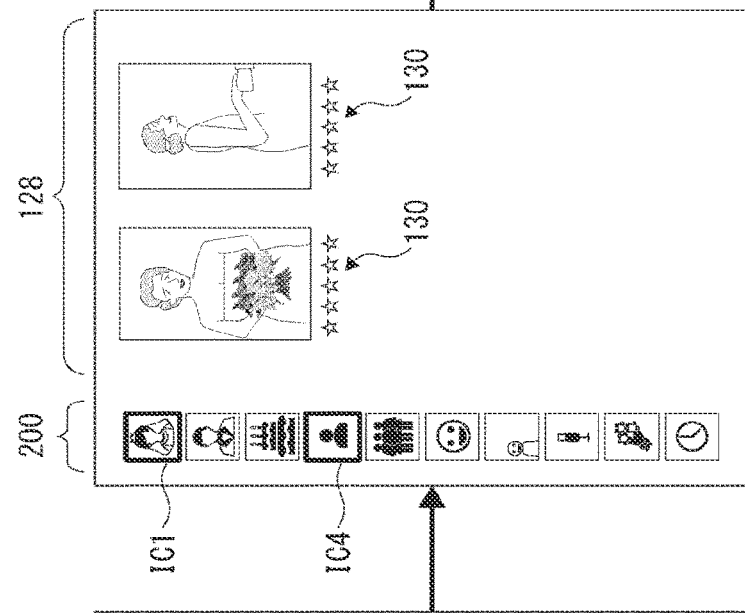
B
DISPLAY OF EXTRACTION RESULT
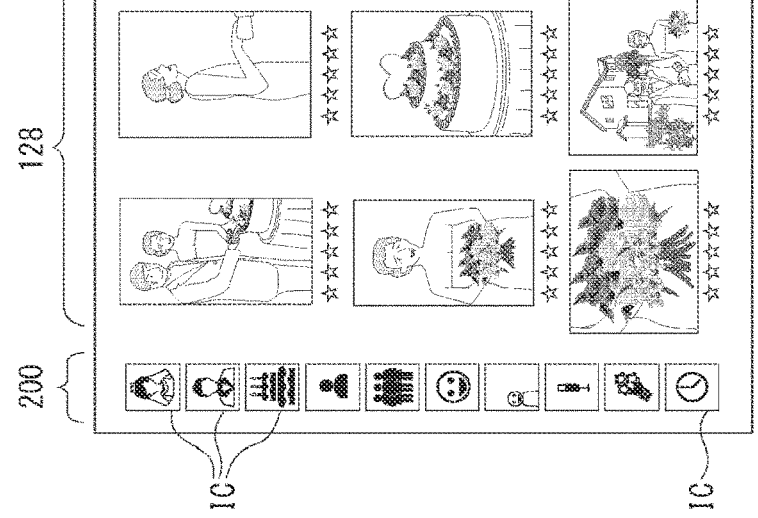
A
DISPLAY OF CAPTURED IMAGE AND ICON
FLOW FROM IMAGE EXTRACTION TO RATING FIG.47
IC1 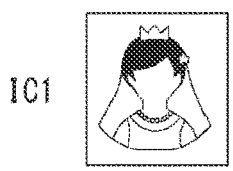 IMAGE CONTAINING BRIDE
IC2 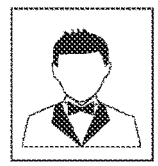 IMAGE CONTAINING BRIDEGROOM
IC3 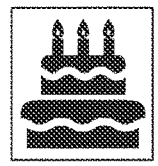 IMAGE CONTAINING CAKE
IC4 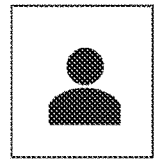 IMAGE CONTAINING SINGLE PERSON
IC5 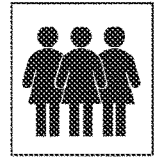 IMAGE CONTAINING MULTIPLE PERSONS
IC6 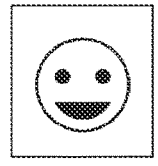 CLOSE-UP IMAGE CONTAINING LARGE-SIZED FACE
IC7 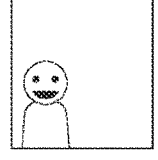 ZOOM-OUT IMAGE CONTAINING SMALL-SIZED FACE
IC8 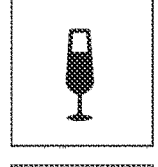 IMAGE CONTAINING GLASS
IC9 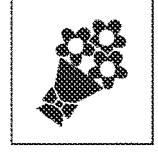 IMAGE CONTAINING BOUQUET
IC10 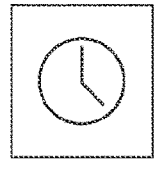 TIME DESIGNATION (EXAMPLE 1) EXTRACT BRIDE ALONE (EXAMPLE 2) EXTRACT BRIDE AND MULTIPLE PERSONS FIG.50
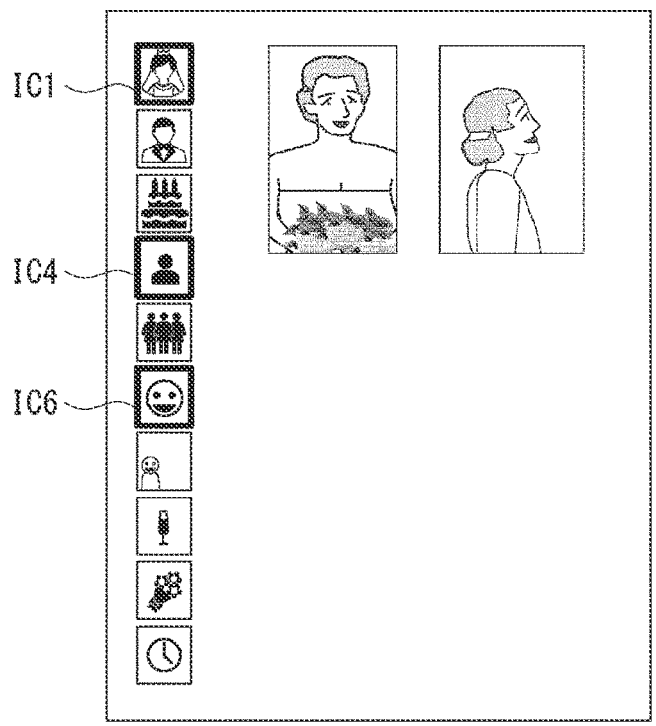
(EXAMPLE 3) BRIDE, SINGLE PERSON, AND CLOSE-UP
FIG.51
A EXAMPLE OF UPPER LEFT AND LOWER RIGHT COORDINATES
B EXAMPLE OF UPPER LEFT COORDINATES, WIDTH, AND HEIGHT
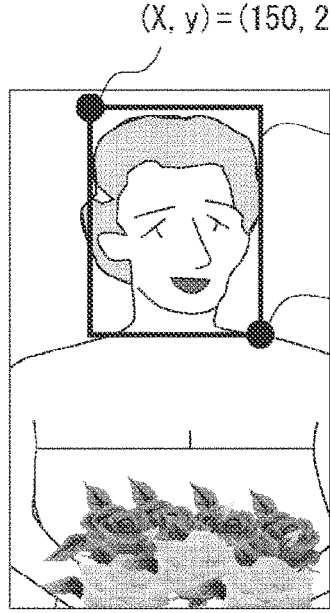
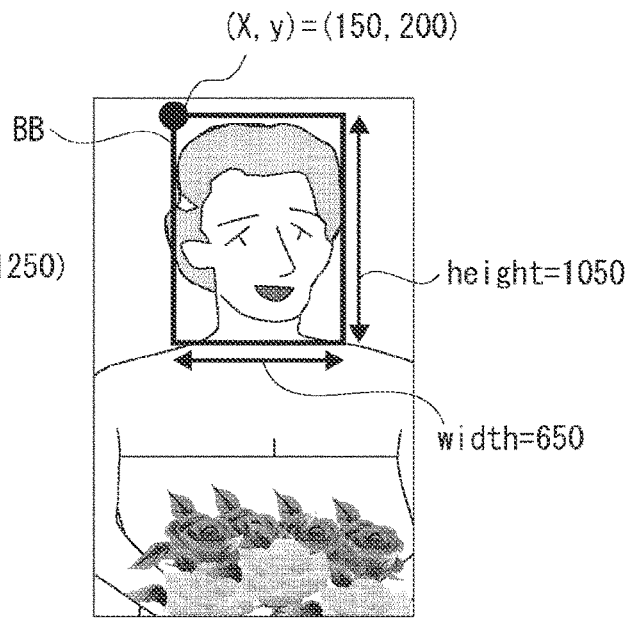

(EXAMPLE 4) BRIDE, SINGLE, AND ZOOM-OUT CUT (EXAMPLE 5) BRIDE AND CAKE (EXAMPLE 6) BOUQUET (EXAMPLE 7) BRIDE, BRIDEGROOM, AND TIME (EXAMPLE 8) SELECT SIMILAR IMAGES BY USING EMOTION
RECOGNITION INFORMATION ACCORDING TO smile DEGREE
(SMILING FACE DEGREE) OR cry DEGREE (CRYING FACE DEGREE)

(EXAMPLE 9) EXTRACT IMAGE CONTAINING BRIDE WITH PUPIL IN FOCUS BY BRIDE AND PUPIL IN FOCUS (EXAMPLE 10) EXTRACT IMAGE HAVING Bounding box OF BRIDE'S WHOLE BODY IN FOCUS BY BRIDE AND STATE IN FOCUS (EXAMPLE 11) EXTRACT IMAGE CONTAINING CAKE IN FOCUS BY CAKE AND STATE IN FOCUS (EXAMPLE 12) EXTRACT IMAGE CONTAINING ANIMAL WITH PUPIL OR BODY IN FOCUS (EXAMPLE 13) EXTRACT IMAGE CONTAINING EXTRACTED
OBJECT SUCH AS VEHICLE IN FOCUS FIG.68
(EXAMPLE 14) EXTRACT BY OR CONDITION
A 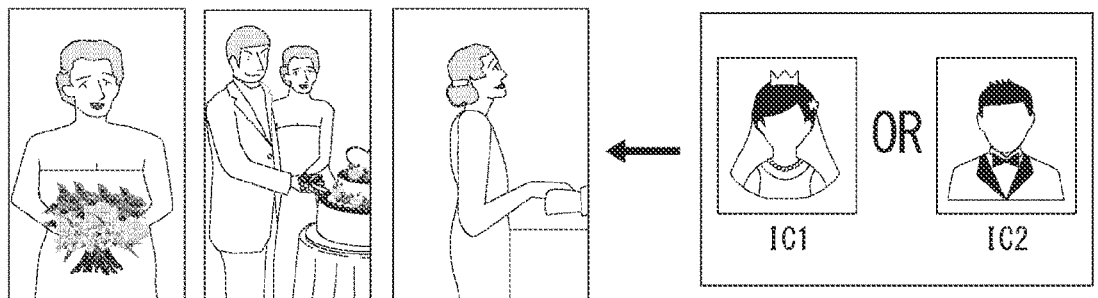
B 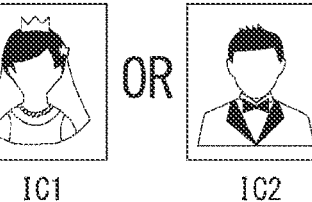
AND
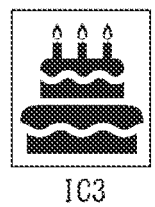
AND
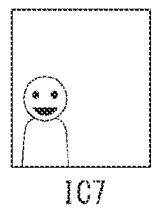

FIG.69
A 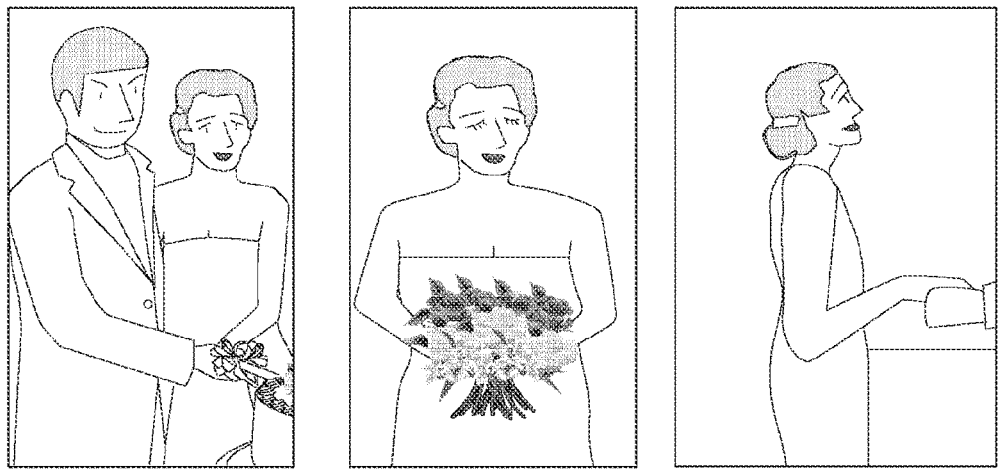
B 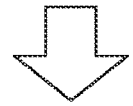 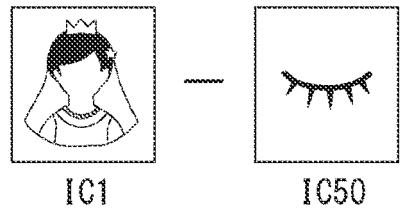 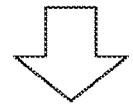
C 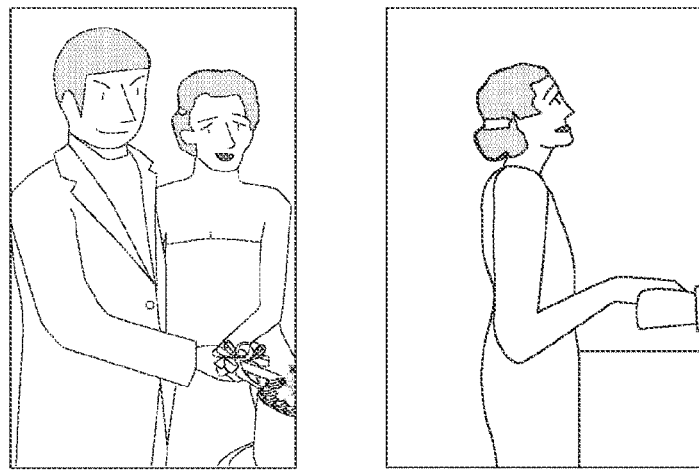
(EXAMPLE 15-1) EXCLUDE CLOSED EYE CUT FROM IMAGES CONTAINING BRIDE FIG.70
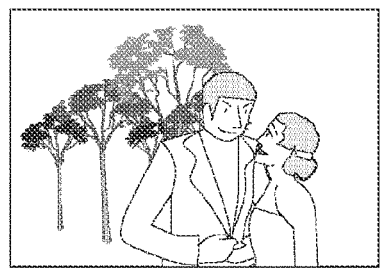
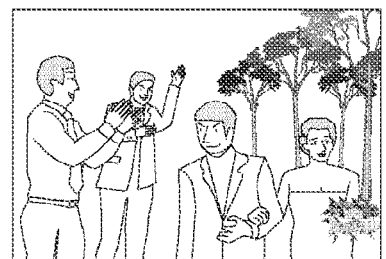
A
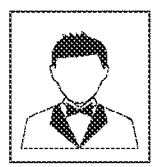
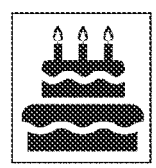
IC1     IC2     IC3
B
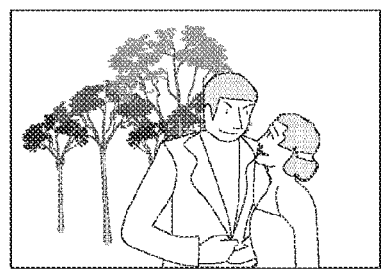
C
(EXAMPLE 15-2) EXCLUDE CAKE SCENE FROM
IMAGES CONTAINING BRIDE AND BRIDEGROOM

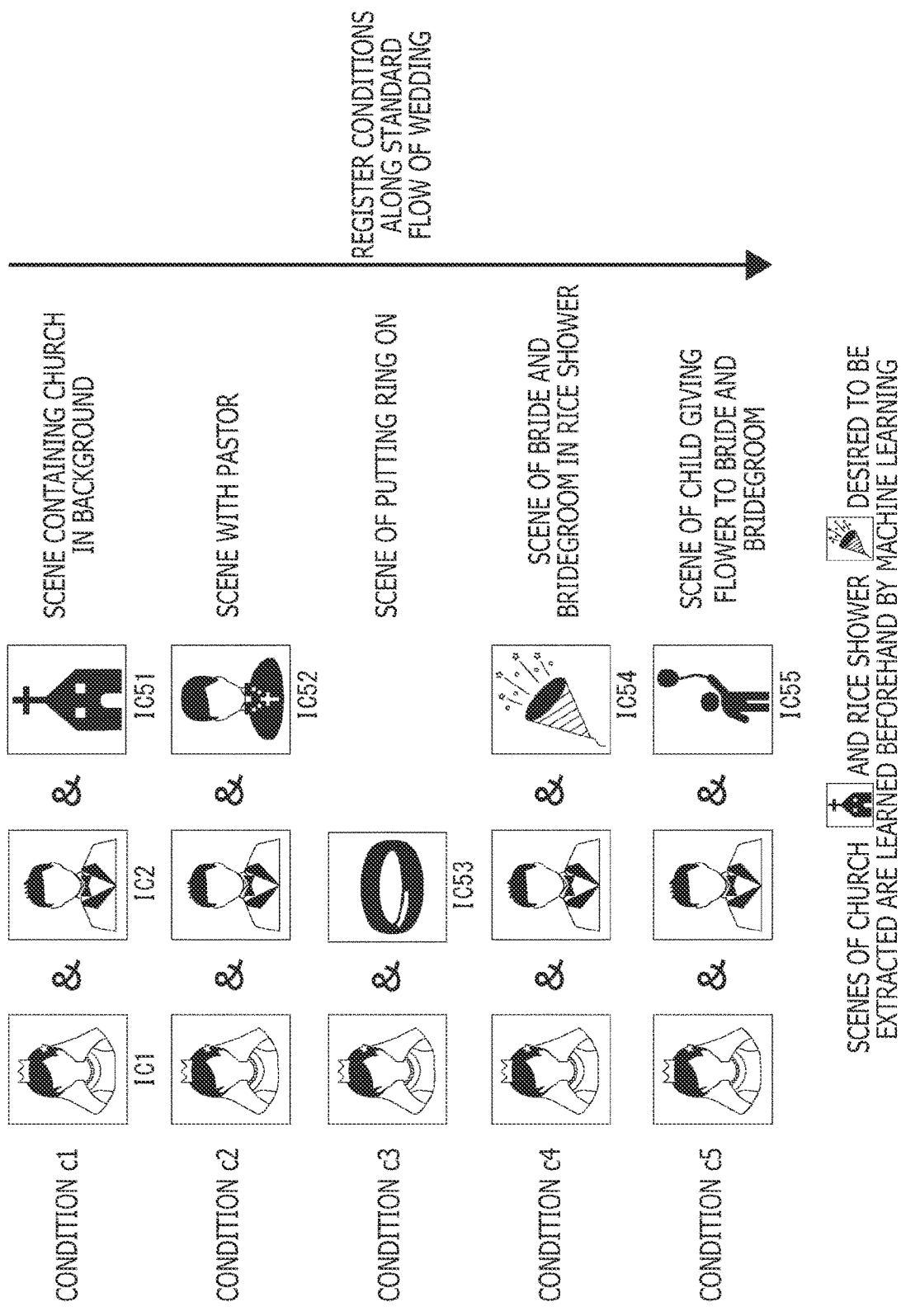

F I G. 7 2
(EXAMPLE 17) EXTRACT CUT OR SCENE DESIRED TO BE EXTRACTED FROM VIDEO
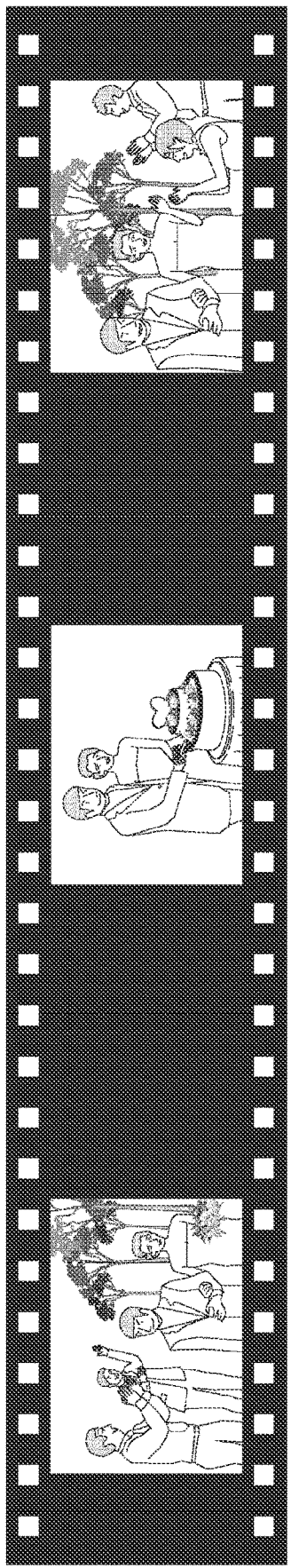
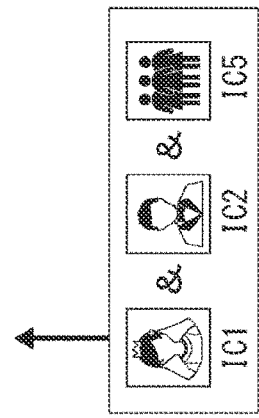
SCENE WITH FRIEND
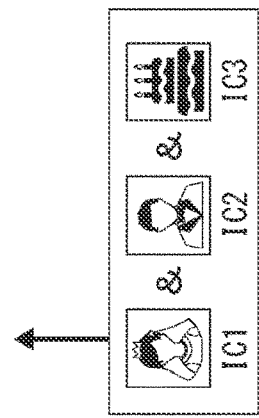
SCENE OF CAKE CUT
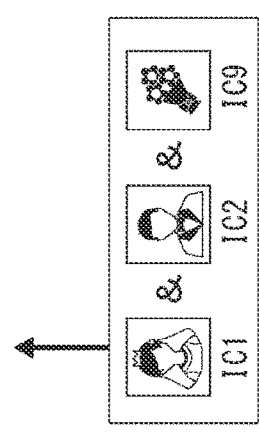
SCENE CONTAINING BRIDE HOLDING BOUQUET AND BRIDEGROOM

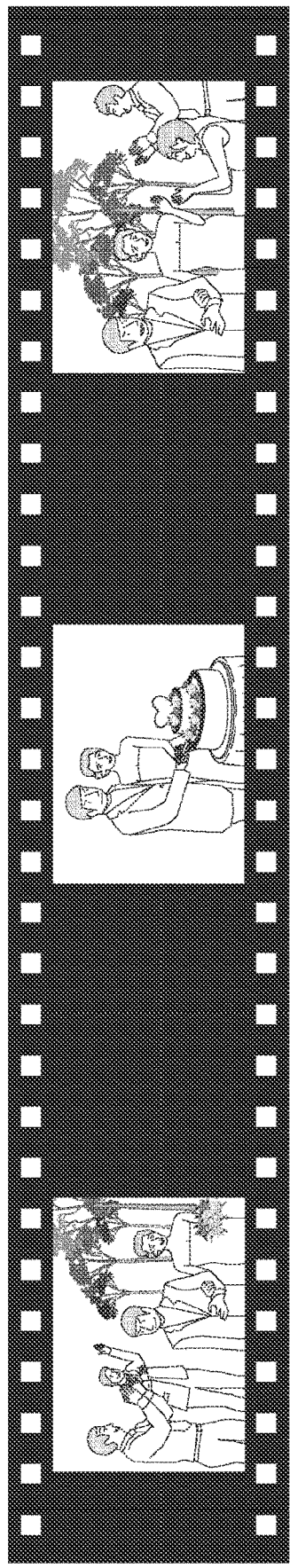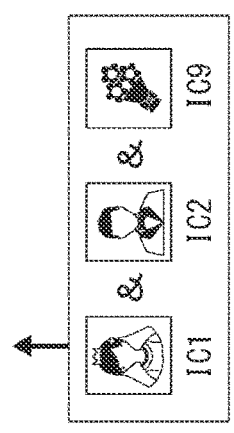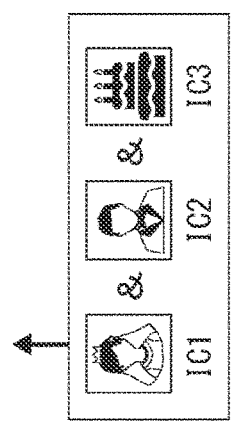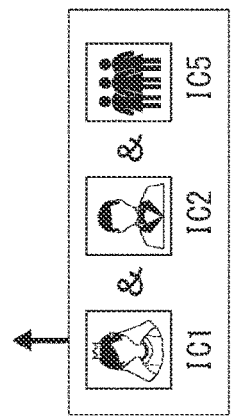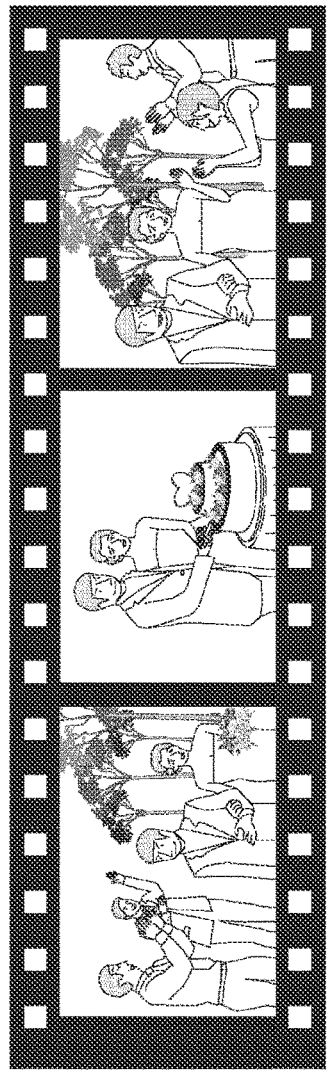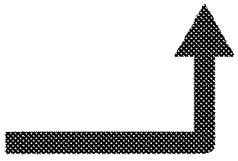
FIG. 73 (EXAMPLE 18) AUTOMATICALLY EXTRACT SCENE AND CREATE HIGHLIGHT VIDEO BY REGISTERING EXTRACTION CONDITION

INFORMATION PROCESSING DEVICE, INFORMATION PROCESSING METHOD, AND PROGRAM

TECHNICAL FIELD

The present technology relates to an information processing device, an information processing method, and a program, and particularly to a technology suitable for creating an image collection of an event related to marriage.

BACKGROUND ART

For example, there is such a service in which a picture album as an image collection of images captured by a photographer at an event related to marriage such as a wedding ceremony, a wedding reception, and a wedding after party is created and the created picture album is provided to participants or the like.

In this case, the photographer or the like imports images captured by an imaging device to a personal computer, a smartphone, or the like after the end of the event, and edits the images by using editing software or the like to create an image collection. Thereafter, this image collection is assumed to be provided using social media (SNS: social networking services), a cloud service, an e-mail, a message application, or the like.

PTL 1 identified below describes a technology which transfers images captured by a camera to a smartphone or the like to share the images.

CITATION LIST

Patent Literature

[PTL 1]
Japanese Patent Laid-open No. 2016-81173

SUMMARY

Technical Problem

Meanwhile, it is often the case that participants look forward to receiving the event image collection and hope to appreciate the event image collection after the end of the event as soon as possible.

For example, a bridal pair and the participants are likely to experience greater emotion if the captured images are appreciated immediately after the end of the wedding ceremony or the wedding reception where an afterglow still remains.

However, in a case where a large volume of pictures have been taken in the wedding ceremony, for example, it is a hassle and not appropriate also for viewers to simply view these pictures in a sequential manner.

Accordingly, an image collection may be created using images selected from a large volume of images and edited, and persons concerned may be allowed to view the created image collection. In this case, however, it is also hard work for a person who creates the image collection, such as a photographer, to determine and select which images are to be included in the image collection from the large volume of images.

It is therefore an object of the present disclosure to provide an information processing function which assists a creator at the time of creation of such type of image collection.

Solution to Problem

An information processing device according to the present technology includes a user interface control unit that performs control for providing a user interface that allows a designation operation for designating an extraction condition for an image group of images captured at an event related to marriage, and an extraction processing unit that extracts an image from the image group according to the designated extraction condition.

The event related to marriage is a wedding ceremony, a wedding reception, a wedding after party, an engagement ceremony, a meeting, a matchmaking, or the like, for example, and refers to an event in which multiple persons including a bridal pair participate.

Provided is such a device which allows the user to designate the extraction condition for the image group constituted by multiple images captured during such type of event and obtain an image extraction result.

According to the information processing device of the present technology described above, the user interface control unit may perform control for displaying the image extracted by the extraction processing unit, and providing a user interface that allows an input operation for inputting rating information associated with each of the images.

For example, a list of the images meeting a predetermined condition is displayed, and the user is allowed to set rating information for each of the images in any manner.

According to the information processing device of the present technology described above, the extraction processing unit may extract an image meeting the designated extraction condition with reference to analysis result data of image contents of the respective images included in the image group.

Information indicating image contents is obtained for each of the images by an image analysis process. It is determined whether or not this information indicating the analysis result meets the extraction condition for each of the images.

According to the information processing device of the present technology described above, the analysis result data may be received from an external device.

The information processing device transmits the respective images captured during the event to the external device, and receives analysis result data obtained by an image analysis process executed by the external device for the respective images.

According to the information processing device of the present technology described above, the user interface control unit may perform control for displaying an icon that indicates the extraction condition for the images of the image group, to detect an operation for the icon as a designation operation for designating the extraction condition.

The user is allowed to select an icon from icons displayed to indicate image types or the like of the images captured during the event related to marriage.

According to the information processing device of the present technology described above, the user interface control unit may display the icon corresponding to an operation target for designating the extraction condition in a display mode different from a display mode of an icon not corresponding to the operation target for the designation.

The operated icon is distinguished from the other icons by the color of the operated icon or the color of the frame being changed, or by highlight display being used, for example.

According to the information processing device of the present technology described above, the extraction condition may include a condition for designating a person.

Designation of a person corresponding to an object to be imaged during the event related to marriage is enabled. For example, designation of a bride, a bridegroom, relatives (e.g., parents, brothers and sisters), friends, guests of honor, or the like is enabled.

According to the information processing device of the present technology described above, the extraction condition may include a condition allowing designation of a scene of the event related to marriage.

A condition allowing designation of any scene during the event related to marriage, such as a cake cutting and greeting from guests of honor, is prepared.

According to the information processing device of the present technology described above, the extraction condition may include a condition allowing designation of time information for the event related to marriage.

Extraction is allowed on a condition of time information, such as a specific time, a period from a certain time to another time, and a time elapsed from an imaging start.

According to the information processing device of the present technology described above, the extraction condition may include a condition allowing designation of a thing or an animal corresponding to an object to be imaged.

A condition designating an article likely to become an object to be imaged during the event related to marriage, such as a cake, a candle, a ring, a pet, and a glass, is prepared.

According to the information processing device of the present technology described above, the extraction condition may include a condition allowing designation of an emotion or a facial expression of an object to be imaged.

For example, a condition designating a smiling scene, an emotional scene, a crying scene, a downcast-eye scene, or the like is prepared.

According to the information processing device of the present technology described above, the user interface control unit may present information indicating a degree of an emotion or a facial expression of an object to be imaged for the image extracted by the extraction processing unit.

For example, in a case where an image such as a smiling scene is extracted, presentation indicating a degree of smiling is made for each of the images.

According to the information processing device of the present technology described above, the extraction condition may include, as the extraction condition, a condition allowing designation of an item determined in reference to metadata added during imaging.

For example, a condition allowing determination by the imaging device during imaging with reference to the metadata associated with the images, such as information associated with focusing, can be designated.

According to the information processing device of the present technology described above, the user interface control unit may present a focal position of the image extracted by the extraction processing unit.

For example, an image indicating a position or a region in focus by using a focal frame or the like with reference to information that is included in the metadata and that indicates the focal region is superimposed and displayed in the extracted image.

According to the information processing device of the present technology described above, the user interface control unit may perform control for displaying an icon of the extraction condition in a candidate region in a display screen and displaying an icon designated by a predetermined operation in a selection region in the display screen.

The candidate region and the selection region are set in the display screen such that the icon in the candidate region can be displayed in the selection region according to an operation performed by the user.

According to the information processing device of the present technology described above, the user interface control unit may perform control for ending display of the icon displayed in the selection region, according to a predetermined selection cancelling operation.

The user is allowed to return the icon in the selection region to the candidate region by performing an operation.

According to the information processing device of the present technology described above, an AND condition, an OR condition, or an exclusion condition may be set for each of multiple designated extraction conditions, to extract an image.

Various types of extraction are achieved using multiple extraction conditions prepared for the event related to marriage.

The information processing device of the present technology described above may further include a video editing unit that creates video content by using multiple video scenes extracted by the extraction processing unit according to the extraction condition.

The video scenes are extracted according to the extraction condition to create the video content by use of the extracted video scenes.

An information processing method according to the present technology performed by an information processing device includes a control process that provides a user interface that allows a designation operation for designating an extraction condition for an image group of images captured at an event related to marriage, and an extraction process that extracts an image from the image group according to the designated extraction condition.

These processes constitute an assistance process which improves work efficiency for creating an image collection by a photographer or the like.

A program according to the present technology is directed to a program that causes an information processing device to execute these processes corresponding to the information processing method.

BRIEF DESCRIPTION OF DRAWINGS

FIG. 20 depicts explanatory diagrams of a pinch operation of the event screen of the embodiment.

FIG. 32 depicts explanatory diagrams of the display control process example according to the flag-on number of the embodiment.

FIG. 35 depicts explanatory diagrams of replacement of rating information of the embodiment.

FIG. 36 depicts explanatory diagrams of replacement of selection information of the embodiment.

FIG. 37 depicts explanatory diagrams of rating setting.

FIG. 38 depicts explanatory diagrams for a configuration example for achieving selection speedup according to the embodiment.

FIG. 39 depicts explanatory diagrams for a functional configuration example of the embodiment.

FIG. 40 depicts explanatory diagrams for image analysis of the embodiment.

FIG. 41 depicts explanatory diagrams for image selection of the embodiment.

FIG. 46 depicts explanatory diagrams for rating performed based on image extraction according to the embodiment.

FIG. 47 is an explanatory diagram for icons indicating extraction conditions of the embodiment.

FIG. 50 is an explanatory diagram illustrating a closeup image of the embodiment.

FIG. 51 depicts explanatory diagrams for a bounding box of the embodiment.

FIG. 68 depicts explanatory diagrams for extraction according to OR conditions according to the embodiment.

FIG. 69 depicts explanatory diagrams for extraction using exclusion conditions according to the embodiment.

FIG. 70 depicts explanatory diagrams for extraction using exclusion conditions according to the embodiment.

FIG. 71 is an explanatory diagram for customizing extraction conditions according to the embodiment.

FIG. 72 is an explanatory diagram for application of the embodiment to videos.

FIG. 73 is an explanatory diagram for highlight video creation according to the embodiment.

DESCRIPTION OF EMBODIMENT

Figure 1:
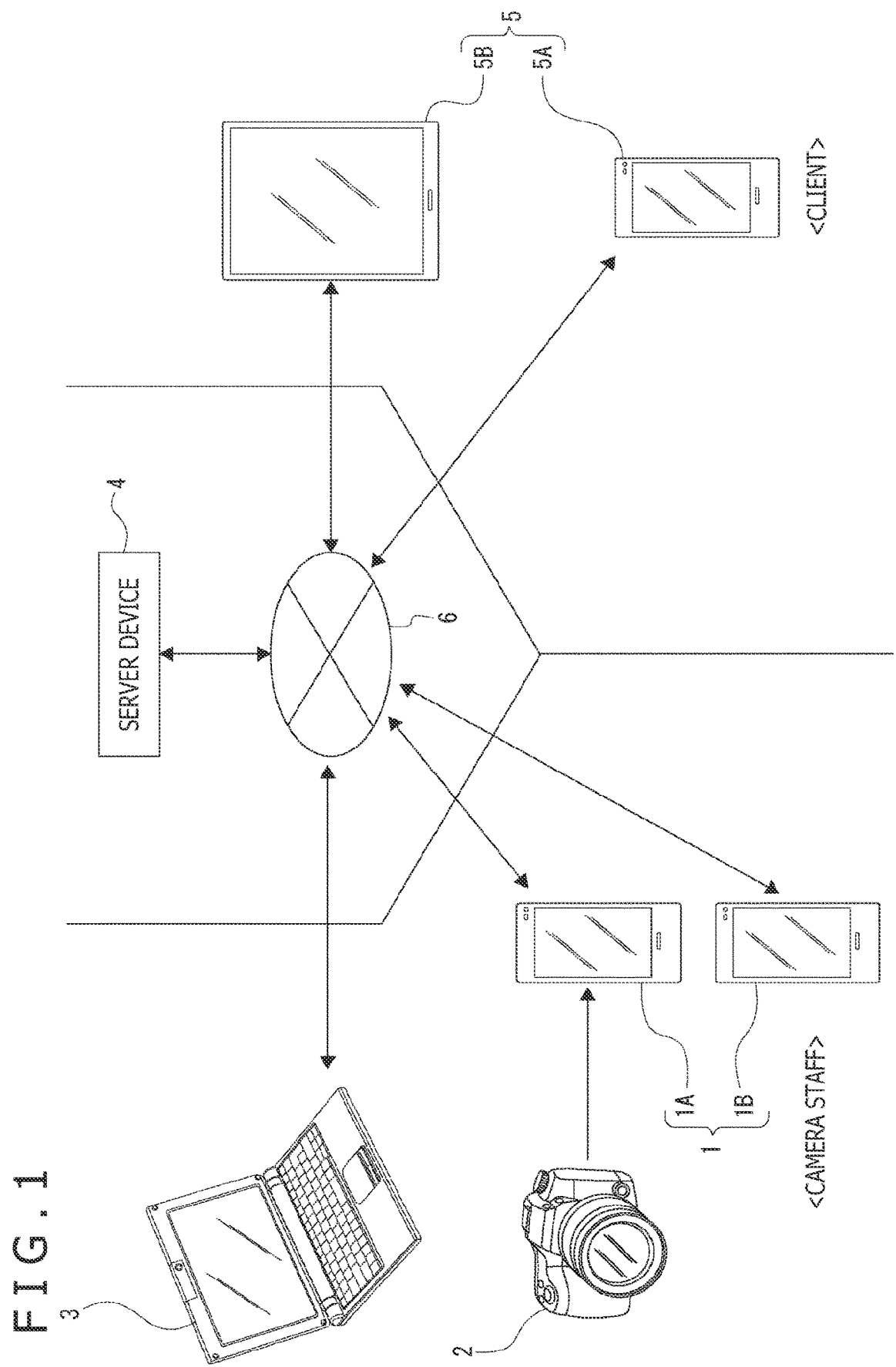
FIG. 1 is an explanatory diagram of a system configuration for providing a service of an embodiment according to the present technology.

An embodiment will hereinafter be described in the following order.

<1. System configuration and work procedure for image collection providing service>
<2. Configuration of information processing device>
<3. Prior setting process>
<4. Transfer/editing process>
<5. Selection process>
<6. Server process>
<7. Web gallery delivery process>
<8. Regular delivery process>
<9. Automatic setting process>
<10. Selection speedup assistance process>
<11. Final confirmation support for selection of delivered image>
<12. Presentation based on face information>
<13. Automatic selection of delivered image>
<14. Presentation of person not included in delivered picture by using face information or others>
<15. Imaging support using shot list>
<16. Summary and modifications>

1. System Configuration and Work Procedure for Image Collection Providing Service The embodiment will be described on an assumption of a case of creating content as an image collection including captured images which are still images (pictures) taken by a photographer in such an event as a wedding, and providing the created content to a client for a charge or no charge.

Note that an image collection containing videos captured with sound or videos captured without sound may be created instead of the image collection of still images. Alternatively, an image collection including multiple videos may be created.

A photographer and an assistant of the photographer will collectively be referred to as a camera staff for convenience of explanation.

Moreover, a client is a general term of not only a purchaser but also a user allowed to receive supply of an image collection and view the image collection. For example, persons concerned such as a bridal pair and relatives and friends of the bridal pair will collectively be referred to as a client.

The image collection refers to a wide range of content constituted by a collection of images (still images and videos), such as a picture album, and may be provided in any providing mode. According to the present embodiment presented by way of example, it is assumed that an image collection for a web gallery and an image collection for regular delivery are providable.

For example, the image collection for the web gallery here is an electronic image collection containing event pictures which are made browsable on a web site promptly after the end of such an event as a wedding.

Note that described here is an example which uses a web site. However, this case is presented only by way of example. Adoptable is such a providing mode capable of transmitting a content file constituting an image collection to the terminal device of the client, by using an e-mail, an electronic message, social media, or the like, for example.

Moreover, the image collection for regular delivery refers to an event image collection officially created by the camera staff as a picture album, and provided to the client later, for example. The image collection for regular delivery may be an electronic image collection including image album content, slideshow content, or the like created by editing image data of images captured during an event, or may be an image collection created using a paper medium, for example. The electronic image collection may be provided by downloading, streaming, or by other methods, or may be stored in a portable storage medium such as a disk-shaped storage medium, a card-shaped storage medium, a tape-shaped storage medium, and a flash memory medium, and provided in this form.

According to the present embodiment, an image collection which the client can promptly browse is created as the image collection for the web gallery prior to creation of the image collection for regular delivery. Moreover, the image collection for the web gallery is not a collection simply containing a large volume of captured images arranged in a simple manner, but a collection containing selected images and having quality sufficient for offering pleasure to viewers.

On the other hand, the image collection for regular delivery is considered as a collection created by the camera staff with investment of time and editing with more sophisticated creativity.

FIG. 1 depicts terminal devices 1A and 1B, an imaging device 2, a personal computer 3, a server device 4, terminal devices 5A and 5B, and a network 6.

Note that the terminal devices 1A and 1B indicate terminal devices used by the camera staff, and will collectively be referred to as a staff terminal 1 for the purpose of distinction for the explanation.

The terminal devices 5A and 5B are terminal devices each used by a user corresponding to the client described above, and will collectively be referred to as a client terminal 5 for convenience of the explanation.

Each of the staff terminal 1 and the client terminal 5 here is a portable terminal device, such as a smartphone and a tablet device, presented by way of example.

For example, the terminal device 1A is a smartphone assumed to be used by the photographer, while the terminal device 1B is a smartphone assumed to be used by the assistant.

Meanwhile, the terminal device 5A is a smartphone assumed to be used by a bride, while the terminal device 5B is a tablet device assumed to be used by a friend present at the event site.

Each of the staff terminal 1 and the client terminal 5 is only required to be what is generally called an information processing device. Specific examples of these terminals are assumed to include a personal computer device, a cellular phone device, a game console, an audio device, a video device, a communication device, a television device, and other various types. In other words, each of the staff terminal 1 and the client terminal 5 of the present disclosure may be any information processing device capable of performing information processing operation, such as a device including a built-in micro-computer.

However, it is preferable that each of the terminals be a portable terminal, such as a smartphone and a tablet device, on an assumption of use at the event site or like places.

It is assumed that the imaging device 2 is any of various types of imaging devices functioning as a video camera or a still camera. It is assumed that the imaging device 2 depicted in the figure is a camera used by the photographer at the site of the wedding.

The imaging device 2 and the staff terminal 1 (e.g., terminal device 1A) are assumed to communicate with each other by data communication. This data communication is achieved using FTP (File Transfer Protocol) communication, for example.

Specifically, it is considered that the terminal device 1A functions as an FTP server to sequentially or collectively upload an image file (containing image data and metadata) of images captured by the imaging device 2, by FTP communication.

Accordingly, it is assumed that the imaging device 2 has FTP setting for data transfer to the terminal device 1A.

Contents of FTP setting information include a host name of an FTP server, a storage destination path, a user name, a password, a connection type, and the like.

However, each of the imaging device 2 and the terminal device 1A is not necessarily required to use FTP, and may adopt other protocols.

Moreover, any communication system may be applied to transfer images and metadata between the imaging device 2 and the terminal device 1A. For example, information communication may mutually be achieved by short-range wireless communication such as Bluetooth (registered trademark), WI-FI (Wireless Fidelity: registered trademark), and NFC (Near Field Communication: registered trademark), infrared communication, or the like.

Furthermore, communication between the imaging device 2 and the terminal device 1A may mutually be achieved by wired connection communication such as a wired LAN.

The personal computer 3 is an example of an information processing device used by the camera staff for creating image collection content for regular delivery, for example.

The personal computer 3 is employed to carry out work of acquiring data associated with event images from the server device 4 and creating image collection content for regular delivery from the acquired data by using an image editing application or the like.

The server device 4 provides and manages various types of information to be used by the camera staff for creating the image collection for the web gallery or for regular delivery.

For example, the staff terminal 1 has an application program installed to provide an image collection providing service, and performs processes described below under this application program. The server device 4 manages data associated with the event and creates a web gallery, for example, in correspondence with the processes performed by the staff terminal 1.

The staff terminal 1 and the server device 4 are always connected to each other during operation of the application program described above, for example, to achieve synchronization of the event data. As described below, examples of the event data include image data of images captured during the event, data used for creating the web gallery, and others.

The "synchronization" in the present disclosure refers to a state where at least a part of data contents of event data stored in the staff terminal 1 and event data stored in the server device 4 are kept equivalent to each other. Particularly, data to be synchronized is image data, rating information, selection information, editing information, or the like, for example. Respective contents of these kinds of data will be described later.

For example, the network 6 is assumed to be the Internet, a home network, a LAN (Local Area Network), a satellite communication network, or other various types of networks.

The staff terminal 1 is capable of uploading image data and the like to the server device 4 via the network 6, and transmitting information for synchronization.

The client terminal 5 is capable of accessing a web page provided by the server device 4 via the network 6, and browsing a web gallery.

The personal computer 3 is capable of acquiring an image file for creating image collection content for regular delivery from the server device 4 via the network 6.

Note that the imaging device 2 has a display unit such as a display panel provided on a rear surface of the device and a view finder, and is configured to receive operation input by a function of various types of operators, a touch panel, or the like. In other words, the imaging device 2 has a sufficient function as a user interface. Moreover, the imaging device 2 includes a microcomputer, and is capable of performing various types of information processing and communication.

Accordingly, it is also assumed that the imaging device 2 functions as the information processing device described in the present disclosure, and communicates with the server device 4 without using the terminal devices 1A and 1B, or executes processes performed by the terminal devices 1A and 1B as will be described later.

Processes performed by the staff terminal 1 and the server device 4 will mainly be described in the embodiment. However, also possible is such an example where all or a part of processes described hereinafter and performed by the staff terminal 1 is carried out by the imaging device 2.

Described with reference to FIG. 2 will be a schematic procedure achieved by the system configured as illustrated in FIG. 1 to provide an image collection. This is a work procedure performed by the staff terminal 1 according to operations performed by the camera staff corresponding to a service provider.

In step S1, prior setting is provided. For example, the camera staff provides communication setting between the staff terminal 1 and the imaging device 2, event setting, image retouch setting, and other setting. This prior setting is completed before the start of the wedding.

In step S2, imaging, transfer, and automatic editing during the wedding are performed.

An image file of images captured by the photographer with use of the imaging device 2 is sequentially transferred to the staff terminal 1 (e.g., terminal device 1A).

The staff terminal 1 imports the image file, and also performs transfer of the image file and the like to the server device 4, automatic editing of images according to prior setting, and others, for example.

Work presented in step S3 is work allowed to be performed on the current day after the end of the wedding, for example.

The camera staff performs a selection operation by using the staff terminal 1. This selection includes selection of images posted on the web gallery, selection of a cover image and a highlight image, editing of images, and the like. The staff terminal 1 performs an update process and the like of the event data according to operations performed by the camera staff. A process for synchronization with the event data on the server device 4 side is also sequentially performed.

In step S4, a process for delivery of the web gallery is performed. The web gallery is created by the server device 4 in reference to the event data. An operation for allowing the client to browse the web gallery is performed after completion of checking of contents of the web gallery by the camera staff with use of the staff terminal 1. This allows the client to browse the web gallery constituting an image collection of the wedding on the current day after the end of the wedding, for example.

A process presented in step S5 is a process for creating an image collection for regular delivery and for achieving regular delivery.

The camera staff creates image collection content for regular delivery at a later date, by using the personal computer 3, for example, and provides the created content to the client.

This allows the client to receive the image collection content for regular delivery.

2. Configuration of Information Processing Device

Figure 3:
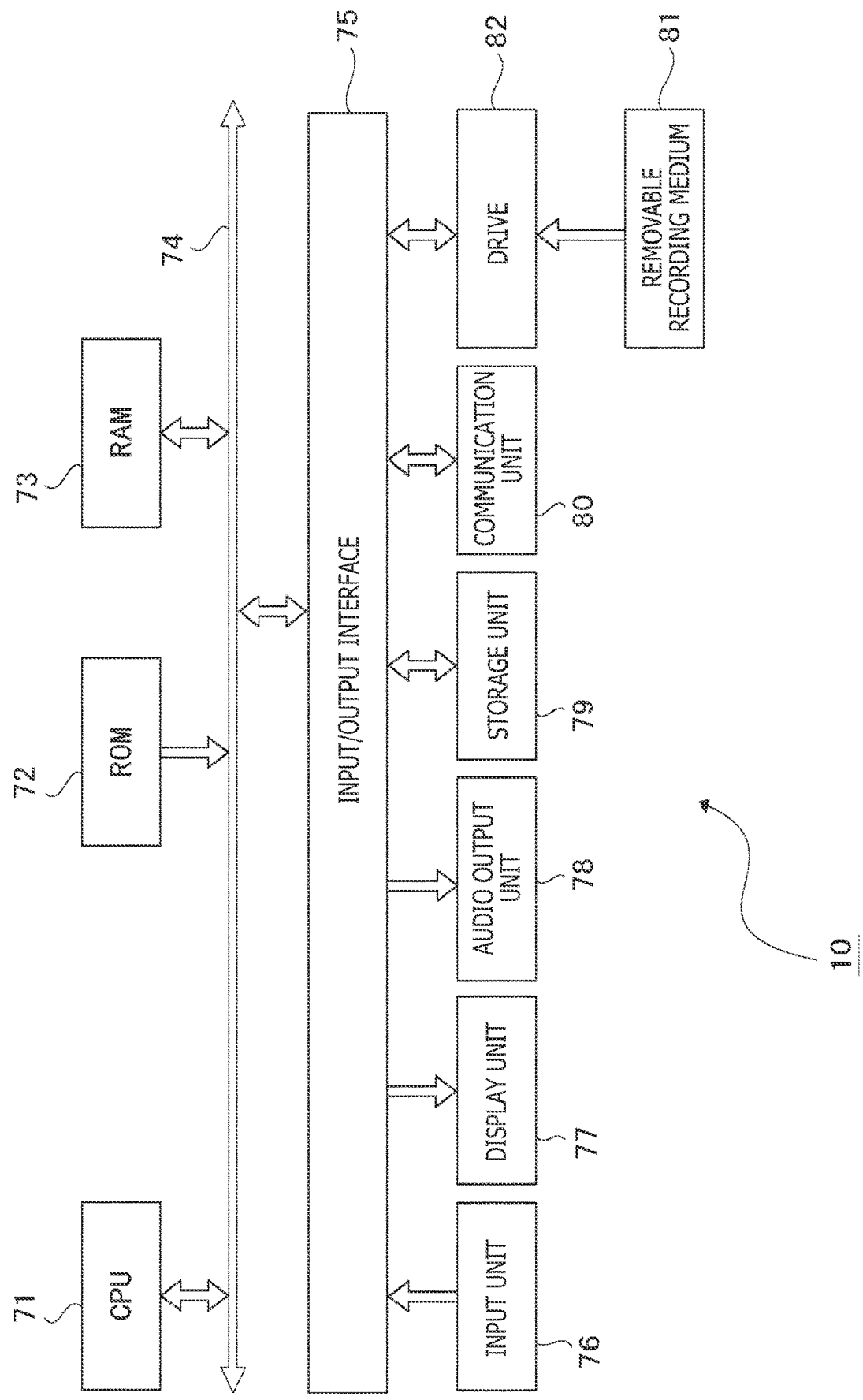
FIG. 3 is a block diagram of a configuration of each of a terminal device and a server device of the embodiment.

FIG. 3 depicts a configuration example of an information processing device 10 capable of constituting the staff terminal 1, the client terminal 5, the server device 4, or the personal computer 3. The staff terminal 1, the personal computer 3, or the server device 4 includes the following configuration of the information processing device 10 to execute processes described later. Further, by including the following configurations of the information processing device 10, the imaging device 2 can also execute processes similar to those executed by the staff terminal 1 as described later.

The CPU (Central Processing Unit) 71 of the information processing device 10 executes various types of processes under a program stored in a ROM (Read Only Memory) 72, or a program loaded from the storage unit 79 to a RAM (Random Access Memory) 73. The RAM 73 also appropriately stores data and the like necessary for the CPU 71 to execute the various types of processes.

The CPU 71, the ROM 72, and the RAM 73 are connected to one another via a bus 74. An input/output interface 75 is also connected to the bus 74.

An input unit 76 including an operator or an operation device is connected to the input/output interface 75.

For example, the input unit 76 is assumed to be any of various types of operators and operation devices such as a keyboard, a mouse, keys, a dial, a touch panel, a touch pad, and a remote controller.

An operation performed by the user is detected by the input unit 76. A signal corresponding to the input operation is interpreted by the CPU 71.

Moreover, a display unit 77 including a liquid crystal panel (LCD: Liquid Crystal Display), an organic EL (Electro-Luminescence) display, or the like and an audio output unit 78 including a speaker or the like are connected to the input/output interface 75, as integrated or separated components.

The display unit 77 is a display unit presenting various types of display, and includes a display device provided on a housing of the information processing device 10, a separate display device connected to the information processing device 10, or the like, for example.

The display unit 77 executes display of images used for various types of image processing, videos to be processed, and the like in a display screen in accordance with instructions from the CPU 71. Moreover, the display unit 77 displays various types of operation menus, icons, messages, or the like, i.e., items as GUI (Graphical User Interface), in response to instructions from the CPU 71.

A storage unit 79 including a hard disk, a solid-state memory, or the like and a communication unit 80 providing communication using various types of communication systems are connected to the input/output interface 75 depending on circumstances.

The communication unit 80 provides communication achieved by a communication process via such a transmission path as the Internet, by wired/wireless communication with various types of devices, by bus communication, or by other methods.

Assuming that the information processing device 10 constitutes the staff terminal 1, the communication unit 80 has a function of performing FTP communication with the imaging device 2 and a function of communicating with the server device 4 via the network 6. Alternatively, the communication unit 80 may have a function of providing communication achieved by short-range wireless communication such as Bluetooth, WI-FI, and NFC, infrared communication, wired connection communication, or the like described above. Moreover, the communication unit 80 may have a function of providing communication using a communication line for cellular phones, such as LTE (Long Term Evolution).

Assuming that the information processing device 10 thus configured constitutes the server device 4 or the personal computer 3, the communication unit 80 has at least the function of providing communication via the network 6.

A drive 82 is further connected to the input/output interface 75 as necessary. A removable recording medium 81 such as a magnetic disk, an optical disk, a magneto-optical disk, and a semiconductor memory is appropriately attached to the drive 82.

A data file such as an image file, various types of computer programs, and the like are readable from the removable recording medium 81 by the drive 82. The data file thus read is stored in the storage unit 79, or images and sounds contained in the data file are output from the display unit 77 or the audio output unit 78. Moreover, the computer programs and the like read from the removable recording medium 81 are installed in the storage unit 79 as necessary.

According to the information processing device 10 configured as above, software used for performing the processes of the present disclosure can be installed via network communication provided by the communication unit 80, or the removable recording medium 81, for example. Alternatively, this software may be stored in the ROM 72, the storage unit 79, or the like beforehand.

Figure 4:
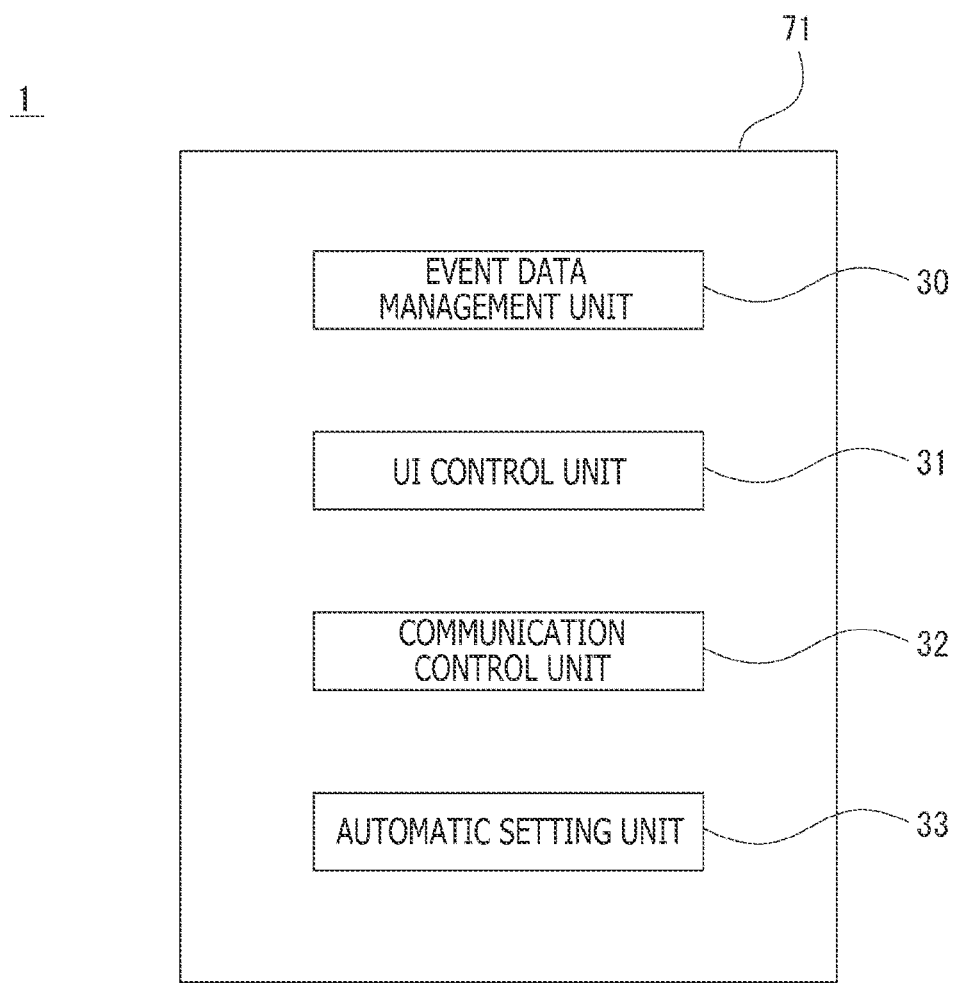
FIG. 4 is an explanatory diagram of a functional configuration of the terminal device of the embodiment.

In a case where the information processing device 10 is assumed to constitute the staff terminal 1, the information processing device 10 has a functional configuration depicted in FIG. 4 and constructed in the CPU 71 under software (application program).

FIG. 4 depicts an event data management unit 30, a UI (user interface) control unit 31, a communication control unit 32, and an automatic setting unit 33 as functions included in the information processing device 10 constituting the staff terminal 1.

The event data management unit 30 is a processing function for storing image data received via communication with the imaging device 2 and additional information containing rating information and the like corresponding to the image data, both as event data associated with a specific event. Moreover, the event data management unit 30 also performs an update process for updating the event data according to operation input from the camera staff.

Figure 5:
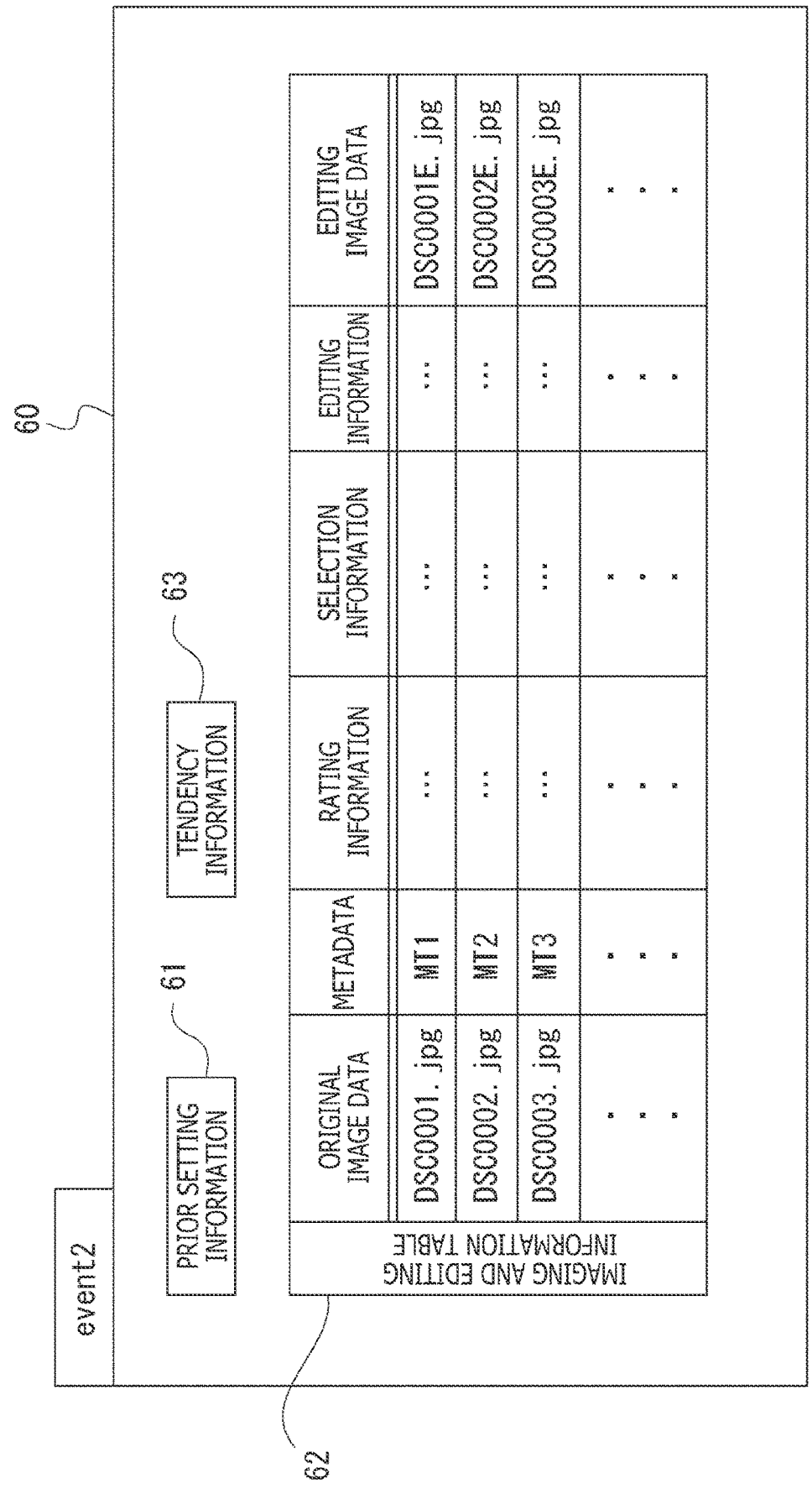
FIG. 5 is an explanatory diagram of event data on the terminal device side of the embodiment.

FIG. 5 schematically depicts an example of contents of the event data.

The event data is a group of data containing images and various contents of one event registered by an operation of the staff terminal 1 performed by the camera staff. FIG. 5 depicts event data 60 associated with an event to which an event name "event2" has been given.

According to this example, it is assumed that the event data 60 contains prior setting information 61, an imaging and editing information table 62, and tendency information 63.

Figure 2:
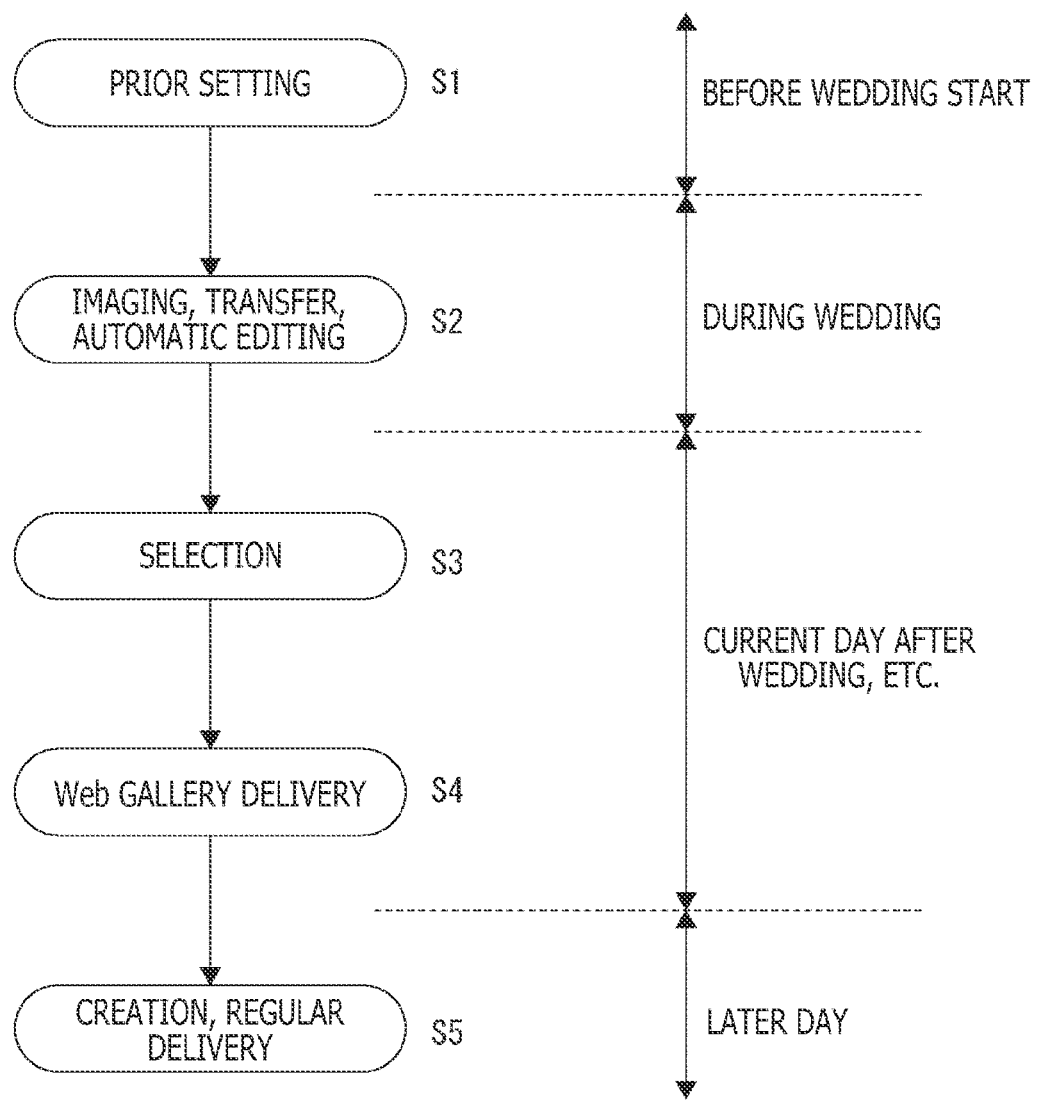
FIG. 2 is an explanatory diagram of a work procedure for providing the service of the embodiment.

The prior setting information 61 is information set by the camera staff as the prior setting provided in step S1 in FIG. 2. For example, the prior setting information 61 contains editing information such as retouch parameters.

The imaging and editing information table 62 is a table subjected to sequential addition and update of information according to processing performed in steps S2 and S3 in FIG. 2.

Various types of information are described in the imaging and editing information table 62 in correspondence with the image file transferred from the imaging device 2.

The image file transferred from the imaging device 2 contains image data and metadata (MT1, MT2, and others). This image data is managed as original image data, and the added metadata is also managed.

The image data includes raw (RAW) data, data compressed in JPEG format, or the like, for example, as data in any data format. However, the image data presented here by way of example is data compressed in JPEG format, such as "DSC0001.jpg."

The metadata (MT1, MT2, and others) contains a date of imaging of the image data, camera information, a data format, a data size, angle of view information, focus point information, and other various types of information added by the imaging device 2.

The imaging and editing information table 62 stores rating information corresponding to the image data. The rating information is information indicating an evaluation value of evaluation given by the photographer or the like to each image, such as evaluation information indicating six levels expressed by the number of stars, such as "no star," "one star," "two stars," "three stars," "four stars," and "five stars." For example, it is assumed that the evaluation rises as the number of the stars increases. Needless to say, such evaluation information is presented only by way of example. Such rating information is a reference for image selection made by the camera staff. Accordingly, at the time of setting of a selection flag (setting of use image information) described below, for example, an image given a high evaluation from the rating information is also considered as an image highly likely to be adopted for the web gallery or regular delivery.

When capturing an image, the photographer can check the captured image and give the foregoing rating information to the captured image. The imaging device 2 includes a user interface through which the rating information is input. This rating information may be contained in the metadata corresponding to the image data, for example, and transferred to the staff terminal 1 together with the image data. Alternatively, the rating information may be written to XMP region of Exif within the image file.

The staff terminal 1 extracts the rating information from the metadata (or Exif data), and manages the rating information.

This rating information is allowed to be added or updated in correspondence with the image data by an operation on the staff terminal 1 side.

The imaging and editing information table 62 stores selection information corresponding to the image data.

One of items included in the selection information is use image information indicating whether or not an image is to be posted on the web gallery. This information is a "selection flag" (also simply referred to as a "flag") described later. In this case, a flag-off image is an image selected as an image that is not to be used in the web gallery, while a flag-on image is an image selected as an image that is to be used in the web gallery.

Moreover, one of the items included in the selection information is cover image information indicating selection as a cover image to be disposed at a top of the web gallery as a cover.

Further, one of the items included in the selection information is emphasis display image information indicating selection as an image for emphasized display (highlight display) in the web gallery. It is assumed that the highlight display is display in a size larger than other images. Alternatively, an ordinary image may be a monochrome image, while a highlight image may be displayed as a color image. Conversely, from a viewpoint of emphasis, it is also possible that an ordinary image is expressed as a color image and that a highlight image is expressed as a monochrome image. Instead, a distinction may be made by expressing an ordinary image as a frameless image and a highlight image as a framed image, for example. Various methods are applicable to the emphasized display.

The editing information contains various types of image processing parameters, such as retouch parameters and inclination correction parameters. The retouch parameters include image quality adjustment parameters, such as a luminance adjustment value, a color adjustment value, a contrast adjustment value, and a sharpness adjustment value.

The retouch parameters may be set by prior setting, or may individually be set for respective images. Moreover, the inclination correction parameters are individually set. Considering these points, the editing information corresponding to the image data is stored in such a manner as to allow storage of parameters set for each of the individual images.

Note that the imaging and editing information table 62 may store editing information corresponding to the image data as depicted in the figure.

The editing image data is image data obtained by editing original image data in reference to editing information determined by prior setting or editing information individually set. Moreover, the editing image data not only includes image data retouched in reference to the editing information, but may also include image data subjected to an image quality change. The quality change includes a change of an image size, a change of resolution, a cutout, and a frame rate change of a video, for example.

In the figure, "E" is given to a file name of the editing image data, such as "DSC0001E.jpg," to distinguish the editing image data from the original image data. This editing image data is used for display on the user interface of the staff terminal 1, for example.

Such editing image data is not required to be generated and stored beforehand. Instead, the editing information may be applied for each display at the time of image display, for example. Accordingly, the imaging and editing information table 62 is only required to update and manage the editing information without the necessity of storing the editing image data. However, it is of course effective to generate and store the editing image data as needed as depicted in the figure from a viewpoint of reducing a processing load during display processing, for example.

The tendency information 63 is stored in the event data 60 in addition to the prior setting information 61 and the imaging and editing information table 62 described above depending on circumstances. The tendency information is characteristic information indicating a selection tendency of the camera staff, a tendency of preferred images of the client (e.g., bride), and the like, for example. An example applying the tendency information 63 will be described later.

The CPU 71 of the information processing device 10 constituting the staff terminal 1 executes additional storage and update of the foregoing information included in the event data 60, by using the function of the event data management unit 30 depicted in FIG. 4.

Note that the format of the event data 60 and the format of the imaging and editing information table 62 are presented only by way of example. Any format may be adopted as long as the above contents are managed at least for each event.

For example, the original image data, the metadata, the rating information, the selection information, the editing information, and the editing image data contained in the imaging and editing information table 62 are not required to collectively be stored as a table. Any format and mode may be adopted for storage as long as the metadata, the rating information, the selection information, the editing information, and the editing image data are associated with at least each one of the original image data.

The UI control unit 31 in FIG. 4 is a function which performs a process for controlling presentation of images, rating information, and the like associated with the event data 60 of a specific event, and detecting operation input. Accordingly, the UI control unit 31 is a function for performing a user interface process.

The user interface process includes presentation of various types of information, supply of an environment allowing operation input, a process for detecting an operation performed by the user, a process for detecting or estimating an intention of the user, and others.

Specifically, for example, the UI control unit 31 performs a control process for causing the display unit 77 and the audio output unit 78 to execute output to the user, such as display output and audio output, and supply an operation input environment or present information to the user.

Alternatively, for example, the UI control unit 31 performs a process for detecting an operation performed by the user.

Instead, for example, the UI control unit 31 performs both the process for supplying the operation input environment to the user and the process for detecting the operation performed by the user.

Needless to say, the UI control unit 31 may perform other user interface processes.

The communication control unit 32 is a function which controls communication with the server device 4 disposed outside, for synchronizing event data according to storage or update of the event data 60.

For example, when receiving image transfer from the imaging device 2, the communication control unit 32 controls a process for transferring image data from the communication unit 80 to the server device 4, or controls issue of a notification of update contents to the server device 4 according to update of the contents of the event data 60.

The automatic setting unit 33 is a function for providing automatic setting of the rating information, the selection information, or the editing information by using the tendency information 63 described above. This process performed by the automatic setting unit 33 will be described later together with the tendency information 63.

The foregoing functions depicted in FIG. 4 are presented only by way of example. By the configuration of the information processing device 10 including at least the event data management unit 30, the UI control unit 31, and the communication control unit 32, the information processing device 10 is allowed to perform the processes to function as the staff terminal 1 of the present embodiment.

For example, the respective functions described above are achieved under an application program installed in the information processing device 10 to create image collection content.

Figure 6:
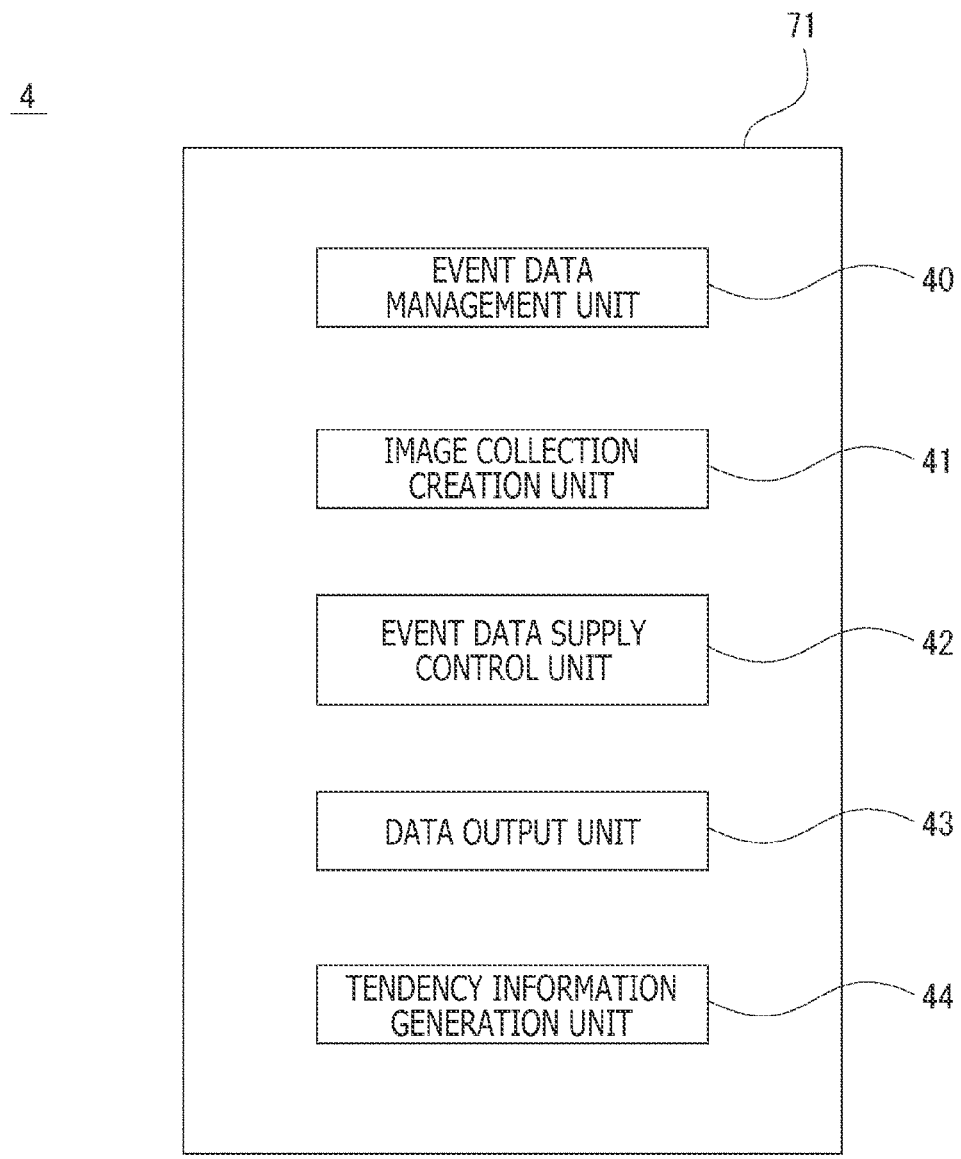
FIG. 6 is an explanatory diagram of a functional configuration of the server device of the embodiment.

Next, in a case where the information processing device 10 is assumed to constitute the server device 4, the information processing device 10 has a functional configuration depicted in FIG. 6 and constructed in the CPU 71 under software (application program).

FIG. 6 depicts an event data management unit 40, an image collection creation unit 41, an event data supply control unit 42, a data output unit 43, and a tendency information generation unit 44 as functions included in the information processing device 10 constituting the server device 4.

The event data management unit 40 is a processing function which achieves storage and update management of event data in the server device 4.

Figure 7:
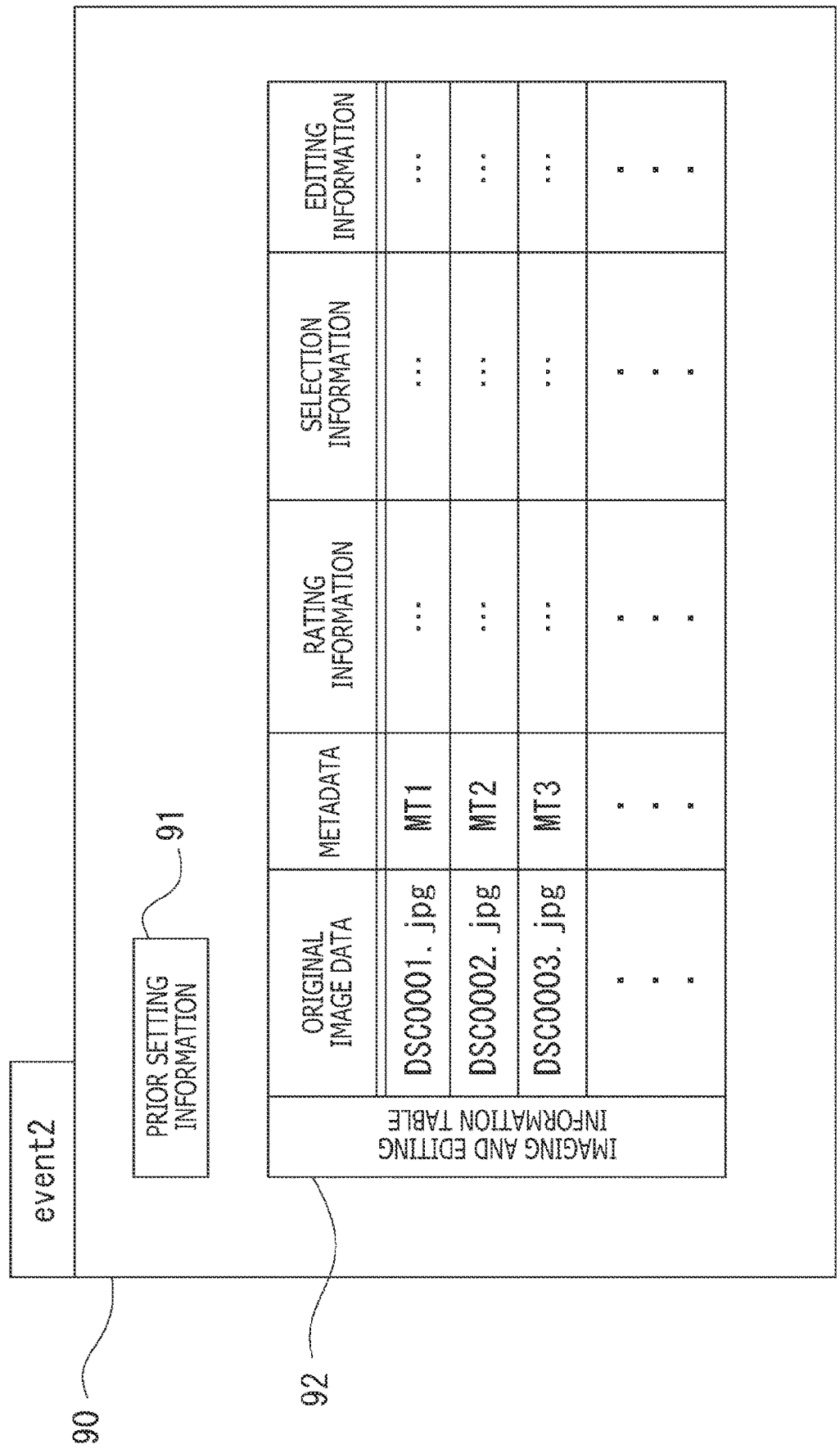
FIG. 7 is an explanatory diagram of event data on the server device side of the embodiment.

FIG. 7 schematically depicts contents of event data 90 on the server device 4 side. As in FIG. 5, the event data 90 is data associated with an event to which an event name "event2" has been given.

According to this example, it is assumed that the event data 90 contains prior setting information 91 and an imaging and editing information table 92.

The prior setting information 91 is information similar to the prior setting information 61 set for the staff terminal 1. For example, the contents set by the prior setting in step S1 in FIG. 2 are similarly managed in the server device 4.

The imaging and editing information table 92 is a table which contains information indicating contents substantially similar to the contents of the imaging and editing information table 62. Specifically, original image data, metadata, rating information, selection information, and editing information are managed for each image.

Note that editing image data is not associated with the imaging and editing information table 92 for such a reason that editing images are formed at the time of creation of a web gallery. Needless to say, the server device 4 may also sequentially generate editing image data, and associate the editing image data with original image data in the imaging and editing information table 92.

The CPU 71 of the information processing device 10 constituting the server device 4 executes additional storage and update of the foregoing information contained in the event data 90, by using the function of the event data management unit 40 depicted in FIG. 6.

The image collection creation unit 41 in FIG. 6 is a function which creates image collection content corresponding to a web gallery of a specific event. Particularly, the image collection creation unit 41 generates image collection data, i.e., web page data constituting the web gallery, with reference to selection information and editing information included in the event data 90.

Figure 8:
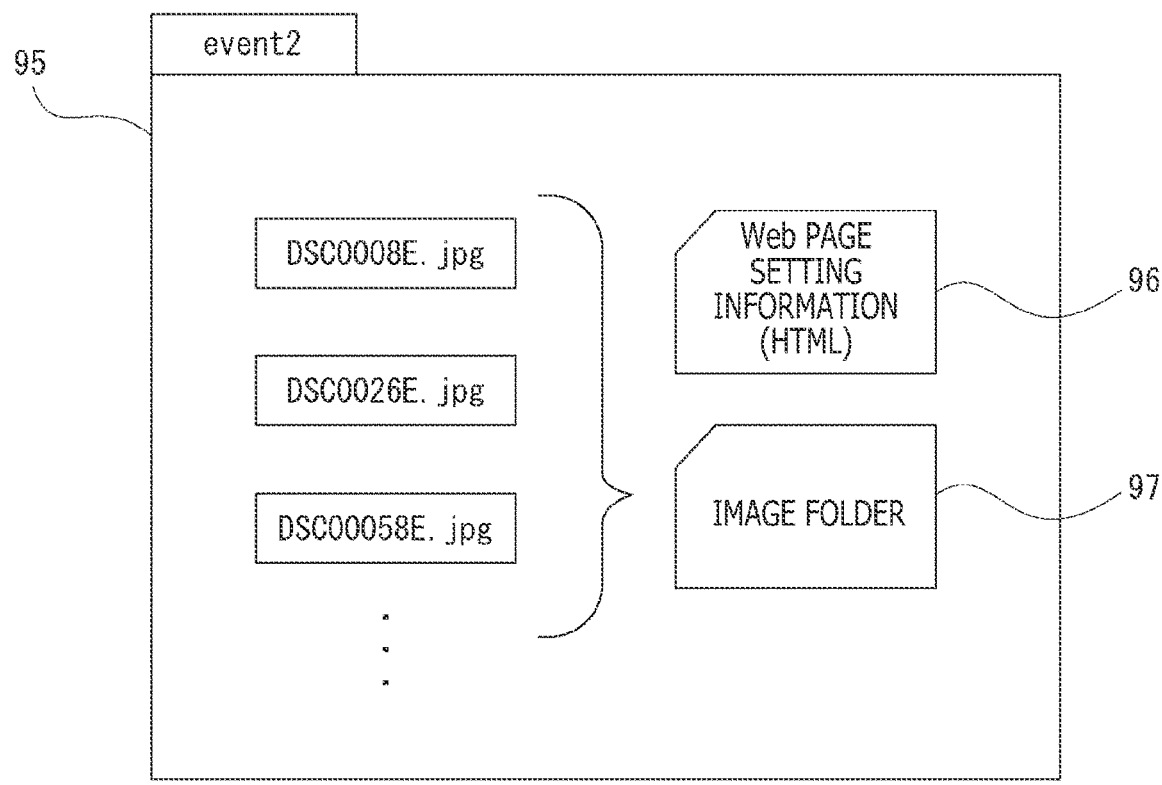
FIG. 8 is an explanatory diagram of web gallery information generated by the server device of the embodiment.

FIG. 8 depicts an example of the web gallery data to be generated.

For example, the server device 4 generates, as the web gallery data, for example, as web page setting information 96, page information in HTML (HyperText Markup Language) format or XML (Extensible Markup language) format, and also generates an image folder 97 which is a collection of images called from the web page setting information 96 and displayed within a page.

The image folder 97 contains editing image data which indicates images adopted as the web gallery.

The event data supply control unit 42 in FIG. 6 is a function for controlling transmission for supply of the event data 90 to the staff terminal 1.

For example, in response to login of the staff terminal 1 to the server device 4 and designation of an event, all or a part of the event data 90 of this event is transmitted to the staff terminal 1. The staff terminal 1 designates the received contents as the event data 60 under management by the staff terminal 1. As a result, the assistant is allowed to perform operations by using the event data 60 on the terminal device 1B side, for example.

Needless to say, also assumable is such a case where the event data supply control unit 42 performs event data supply control for the terminal device 1A and the personal computer 3.

The data output unit 43 performs control for transmitting a part or the whole of data contained in the event data, such as metadata, rating information, selection information, editing information, and image data (e.g., original image data) to the terminal device (e.g., personal computer 3) as a file in a predetermined format.

Accordingly, the data output unit 43 is a processing function which supplies data necessary for creating image collection content for regular delivery to the camera staff side.

The tendency information generation unit 44 is a function which learns a tendency of image selection by the camera staff and a tendency of image evaluation by the user as the client, and generates characteristic information associated with these tendencies.

Processing performed by the tendency information generation unit 44 will be described later together with processing performed by the automatic setting unit 33 of the staff terminal 1.

The foregoing functions depicted in FIG. 6 are presented only by way of example. By the configuration of the information processing device 10 including the event data management unit 40, synchronization of the event data is achievable between the staff terminal 1 and the server device 4. Moreover, by the configuration of the server device 4 including the image collection creation unit 41, prompt creation of the web gallery is achievable.

For example, the respective functions depicted in FIG. 6 are achieved under an application program installed in the information processing device 10 to create image collection content.

3. Prior Setting Process

A specific processing example will hereinafter be described.

First described with reference to FIGS. 9 and 10 will be a processing example of the prior setting performed by the staff terminal 1 and presented as step S1 in FIG. 2.

Note that the process performed by the staff terminal 1 described below refers to a process performed by the CPU 71 of the information processing device 10 having the functions depicted in FIG. 4.

Moreover, each of screen examples described below with reference to a flowchart is an example of display contents on a display formed on a housing of a smartphone, for example, on an assumption that the information processing device 10 constituting the staff terminal 1 is this smartphone.

Figure 9:
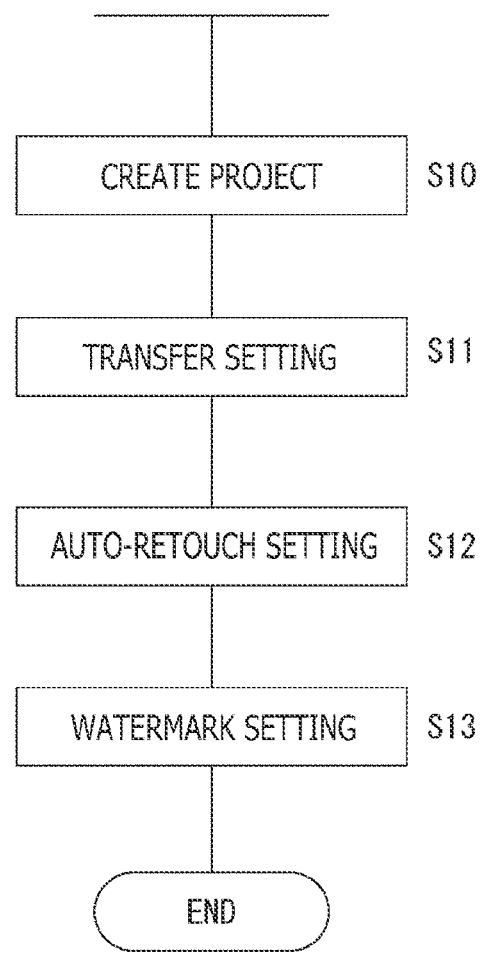
FIG. 9 is a flowchart of a prior setting process performed by the terminal device of the embodiment.
Figure 10:
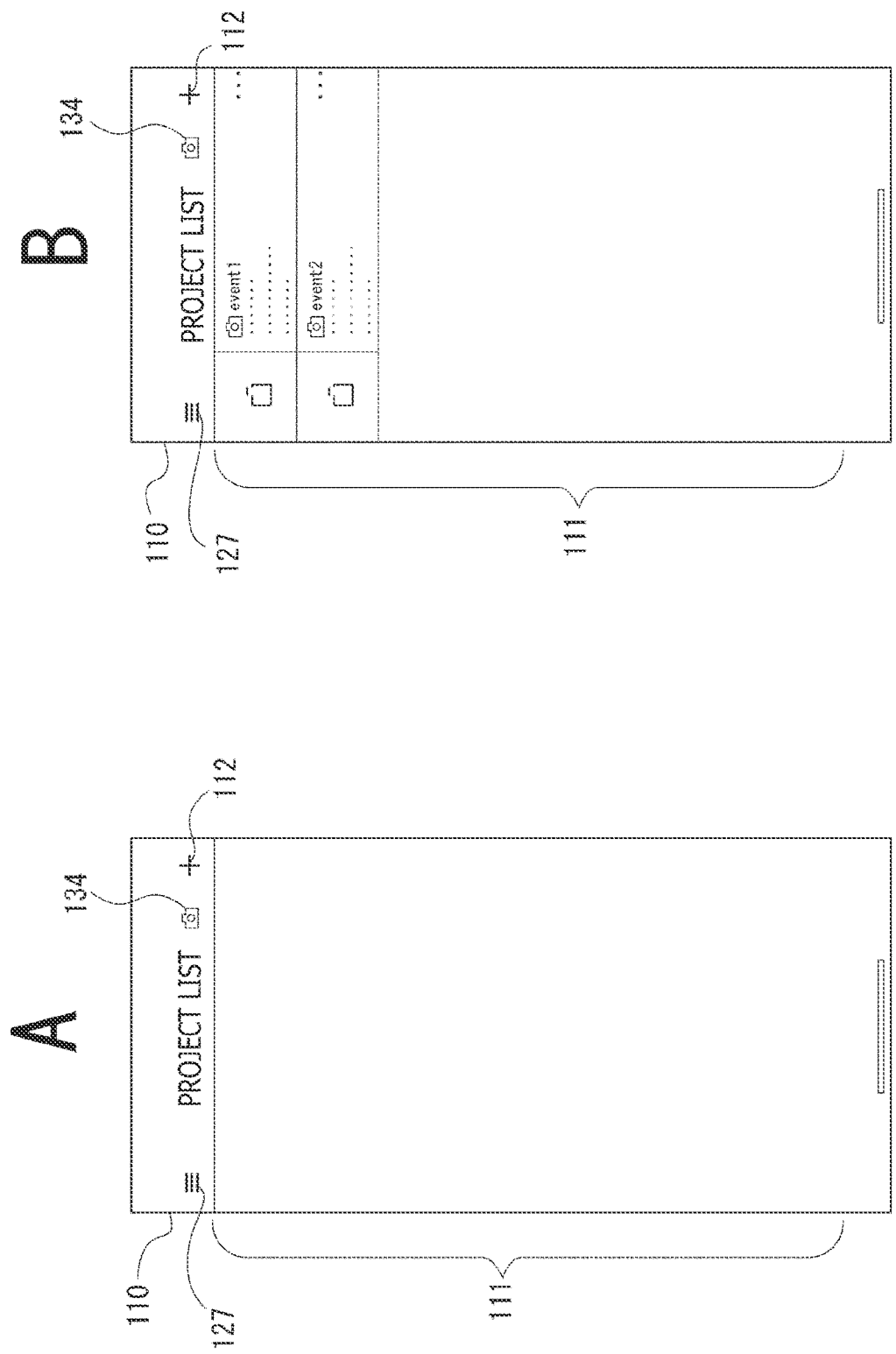
FIG. 10 depicts explanatory diagrams of a project list screen of the embodiment.

FIG. 9 presents a process performed by the staff terminal 1.

For example, the camera staff starts an application program by using the staff terminal 1 to perform an operation for a preparation process. The staff terminal 1 executes processing in step S10 and following steps by using the CPU 71 according to this operation.

In step S10, the staff terminal 1 performs a process for project creation. This is a process for setting an event for which an image collection is to be created.

For example, a project list screen 110 is displayed on the display unit 77 of the staff terminal 1 having started the application program as depicted in FIG. 10A.

The project list screen 110 includes a list region 111 where a list of event names corresponding to individual project targets is displayed. The project list screen 110 further displays an addition icon 112, a camera icon 134, a menu icon 127, and others.

The camera staff creates a target project for which an image collection is to be created, on the project list screen 110 thus configured. For example, the camera staff performs an operation for creating one project by inputting an event name or the like.

For example, an unillustrated project setting screen is displayed by operation of the addition icon 112. A title of the project (e.g., event name), time and date of the event, a place of the event, whether or not to apply auto-retouch setting, and the like are settable in this screen.

The camera staff inputs items appropriately to perform an operation for setting project contents. The staff terminal 1 creates one project according to this operation, and displays the created project in the list region 111.

FIG. 10B depicts an example where two projects named "event1" and "event2" are displayed. For example, information indicating an event name, time and date, a place, and the like is presented for each project.

In step S10 in FIG. 9, the staff terminal 1 performs control for providing a user interface having the above screen by using the function of the UI control unit 31, to execute a project creation process according to an operation performed by the camera staff.

Note that this project creation process is performed in an on-line connection state between the staff terminal 1 and the server device 4, for example. In this case, the staff terminal 1 transmits information used for a synchronization process to the server device 4 according to contents of the operation performed by the user, by using the function of the communication control unit 32.

As a result, the entry state of the information as one project is also synchronously achieved in the server device 4.

In step S11 in FIG. 9, the staff terminal 1 provides transfer setting. This transfer setting is setting of FTP transfer between the staff terminal 1 and the imaging device 2, such as setting of a file format for transfer and an FTP connection server, for example.

The staff terminal 1 executes display of a transfer setting screen for the camera staff, by using the function of the UI control unit 31, to provide necessary transfer setting according to an operation performed by the camera staff.

In step S12, the staff terminal 1 provides auto-retouch setting. The auto-retouch setting is a process for setting parameters for an image editing process applied in common to respective images.

The staff terminal 1 executes display of an auto-retouch setting screen for the camera staff, by using the function of the UI control unit 31, to provide necessary auto-retouch setting according to an operation performed by the camera staff. The parameters of the auto-retouch setting are described in the event data 60 of the created project, as the prior setting information 61.

Moreover, this auto-retouch setting is also provided in the on-line connection state between the staff terminal 1 and the server device 4, for example. The staff terminal 1 transmits parameter information indicating the auto-retouch setting to the server device 4 to achieve the synchronization process.

As a result, the server device 4 can also store the prior setting information 91 having the same contents as the prior setting information 61 included in the event data 60, as the event data 90 of the corresponding project.

In step S13, the staff terminal 1 provides watermark setting. For example, a photographer name or the like can be inserted into an image of the web gallery, as a watermark (digital watermark). The watermark setting is a process for setting the presence or absence and contents of the watermark.

The staff terminal 1 executes display of a watermark setting screen for the camera staff, by using the function of the UI control unit 31, to provide necessary watermark setting according to an operation performed by the camera staff. Information indicating the watermark setting is also described in the event data 60 of the created project, as the prior setting information 61.

Moreover, this watermark setting is also provided in the on-line connection state between the staff terminal 1 and the server device 4. The staff terminal 1 transmits the information indicating the watermark setting to the server device 4 to achieve the synchronization process.

As a result, the server device 4 can also store the prior setting information 91 in the event data 90 of the corresponding project, as information synchronized with the prior setting information 61.

Note that steps S11, S12, and S13 described above may be carried out in a different order. Moreover, the processing in the respective steps is not required to be performed as a series of processes. For example, the processing may be executed for each operation performed by the user during operation.

Further, the processing in the respective steps may be skipped when unnecessary. For example, the transfer setting in step S11 may be provided every time a project is created in step S10. However, when no change of setting is particularly needed after FTP transfer setting is performed once, the process may proceed to step S12 while skipping step S11 after completion of project creation in step S10. Needless to say, this is applicable to the processing in steps S12 and S13. In a case where no change is particularly needed after setting, these steps may be skipped.

Moreover, communication with the server device 4 for synchronization may be achieved at a timing of each processing. Alternatively, synchronization between the prior setting information 61 and the prior setting information 91 may be achieved by collectively transmitting such pieces of information indicating several settings at the time of completion of these settings.

Furthermore, in a case where any contents have been set in an environment where on-line connection with the server device 4 is disabled, it is sufficient if the set information is transmitted for synchronization between the prior setting information 61 and the prior setting information 91 at the time when an on-line connection state is achieved.

4. Transfer/Editing Process

Next described with reference to FIG. 11 will be a specific processing example of the staff terminal 1 in step S2 in FIG. 2. Specifically, this processing example is a process executed by the staff terminal 1 by mainly using the functions of the event data management unit 30 and the communication control unit 32 in FIG. 4 while a wedding is being held.

Figure 11:
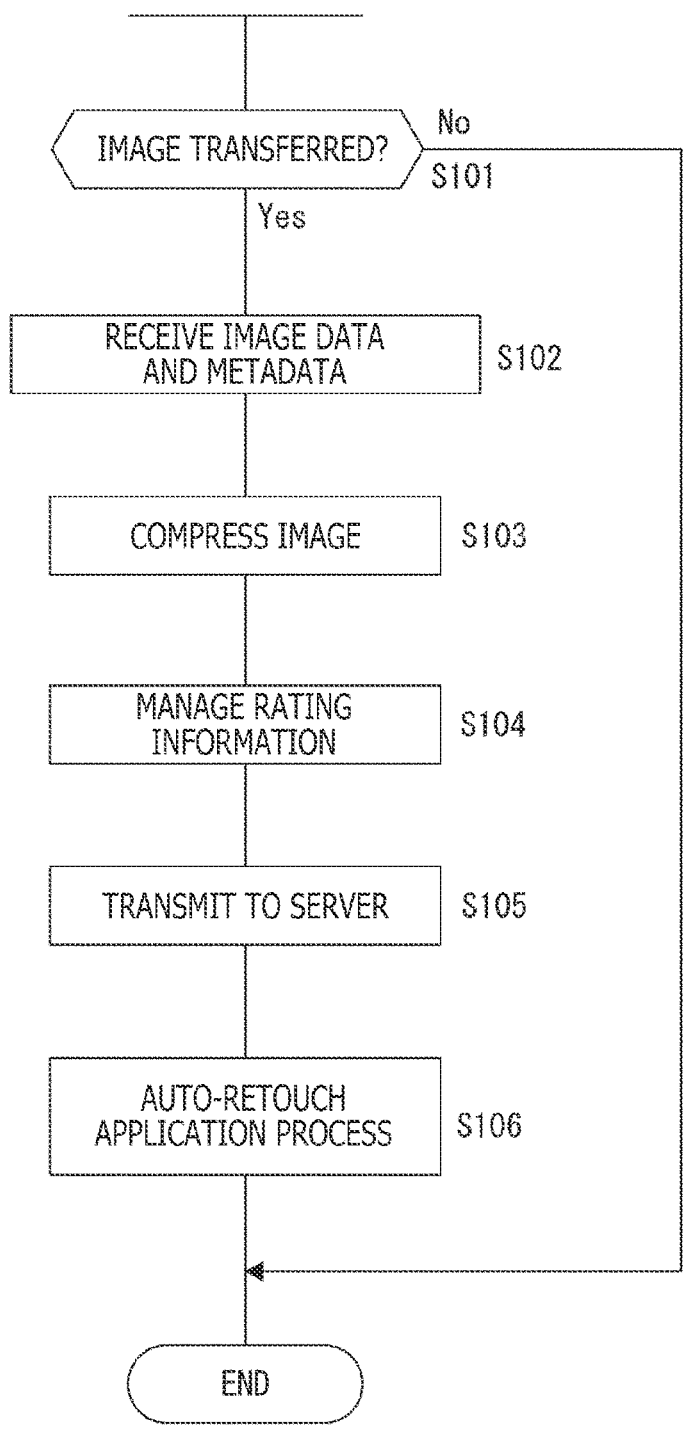
FIG. 11 is a flowchart of a transfer/editing process performed by the terminal device of the embodiment.

The staff terminal 1 checks whether or not image file transfer from the imaging device 2 has been started in step S101 in FIG. 11. The process in FIG. 11 is not particularly performed during a period of no image transfer.

For example, during the wedding, the photographer captures images of scenes of a ceremony and a reception by using the imaging device 2. For example, the imaging device 2 sequentially transfers image files to the staff terminal 1 automatically or according to an operation performed by the photographer after capturing still images, for example. Note that this transfer timing is only an example. This transfer may be performed for each capturing of one image, or multiple images may collectively be transferred.

Moreover, in a case of video taking, transfer may be achieved during a period of no recording for each recording start and stop, or may be achieved during a recording period after a recording start. All the recorded pictures may be transferred, or pictures of only a predetermined initial period may be transferred.

Moreover, the photographer may add rating information to the captured images by operating the imaging device 2. For example, rating information is input by checking of an image immediately after the image is captured. This rating information is described in metadata.

Transfer of an image file containing image data and metadata may be executed in response to checking of the captured image and input of rating information by the photographer, for example.

When detecting a start of transfer of the image file described above, the staff terminal 1 advances the process from step S101 to step S102 to perform a reception process for receiving the image data and the metadata. In this case, the received image data is managed in the imaging and editing information table 62 of the event data 60 as original image data. In addition, the received metadata is also managed in association with the image data.

In step S103, the staff terminal 1 performs an image compression process. For example, the staff terminal 1 performs the compression process in such a manner as to increase a compression rate of the received image data. This is a process for generating image data to be transmitted to the server device 4.

In step S104, the staff terminal 1 manages rating information. This is a process for checking the metadata of the received image file, extracting rating information given from the imaging device 2 side, and managing the rating information in such a manner as to be updatable in the imaging and editing information table 62 of the event data 60.

In step S105, the staff terminal 1 transmits information to the server device 4 for synchronization between the event data 60 and the event data 90. In this case, the staff terminal 1 transmits the image data, the metadata, and the rating information compressed in step S103 to the server device 4.

The server device 4 side updates the event data 90 in response to reception of these pieces of data and information, to maintain a synchronous state with the event data 60.

In step S106, the staff terminal 1 performs an auto-retouch application process. Specifically, the staff terminal 1 performs image processing for the original image data by using retouch parameters automatically set by prior setting, to generate editing image data, and manages the generated editing image data in the imaging and editing information table 62.

This editing image data is generated for UI display by the staff terminal 1.

While the auto-retouch application process is performed as processing at the time of reception of the image file in this example, the auto-retouch application process may be executed as necessary on other occasions, such as a time when display of one image is required.

Moreover, it is also possible that the image processing is performed for the compressed image data generated in step S103. In that case, the order of processing of step S105 and step S106 may be switched, for example, to transmit the compressed image data to the server after completion of image processing for applying auto-retouch to the compression image data.

After the processes in FIG. 11 described above are performed, the staff terminal 1 is brought into such a state as to import images according to imaging by the photographer and manage information corresponding to the images in the event data 60. For example, all of captured images are brought into a state managed in the event data 60 at the time of the end of the wedding.

Moreover, after transmission for sequential synchronization, the event data 90 on the server device 4 side comes into a state synchronized with the event data 60 on the staff terminal 1 side in the middle of or at the end of the wedding.

In addition, even in this stage of the process in FIG. 11, the camera staff can check a status of importing images to the staff terminal 1 and the like by display of a list of images transferred from the imaging device 2 and a communication status on an event screen 120 described later or the like.

5. Selection Process

Next, a detailed processing example of the selection in step S3 in FIG. 2 will be described with reference to flowcharts illustrated in FIG. 12 to FIG. 17 and screen examples depicted in FIG. 18 to FIG. 23.

Note that FIGS. 12 to 17 present a series of flowcharts as divisions of one continuous flowchart. Each of "c1," "c2," "c3," "c4," "c5," "c6," and "c7" represents a connection relation between these flowcharts.

Processes performed in these flowcharts are processes achieved by the functions of the event data management unit 30, the UI control unit 31, and the communication control unit 32 illustrated in FIG. 4.

Figure 12:
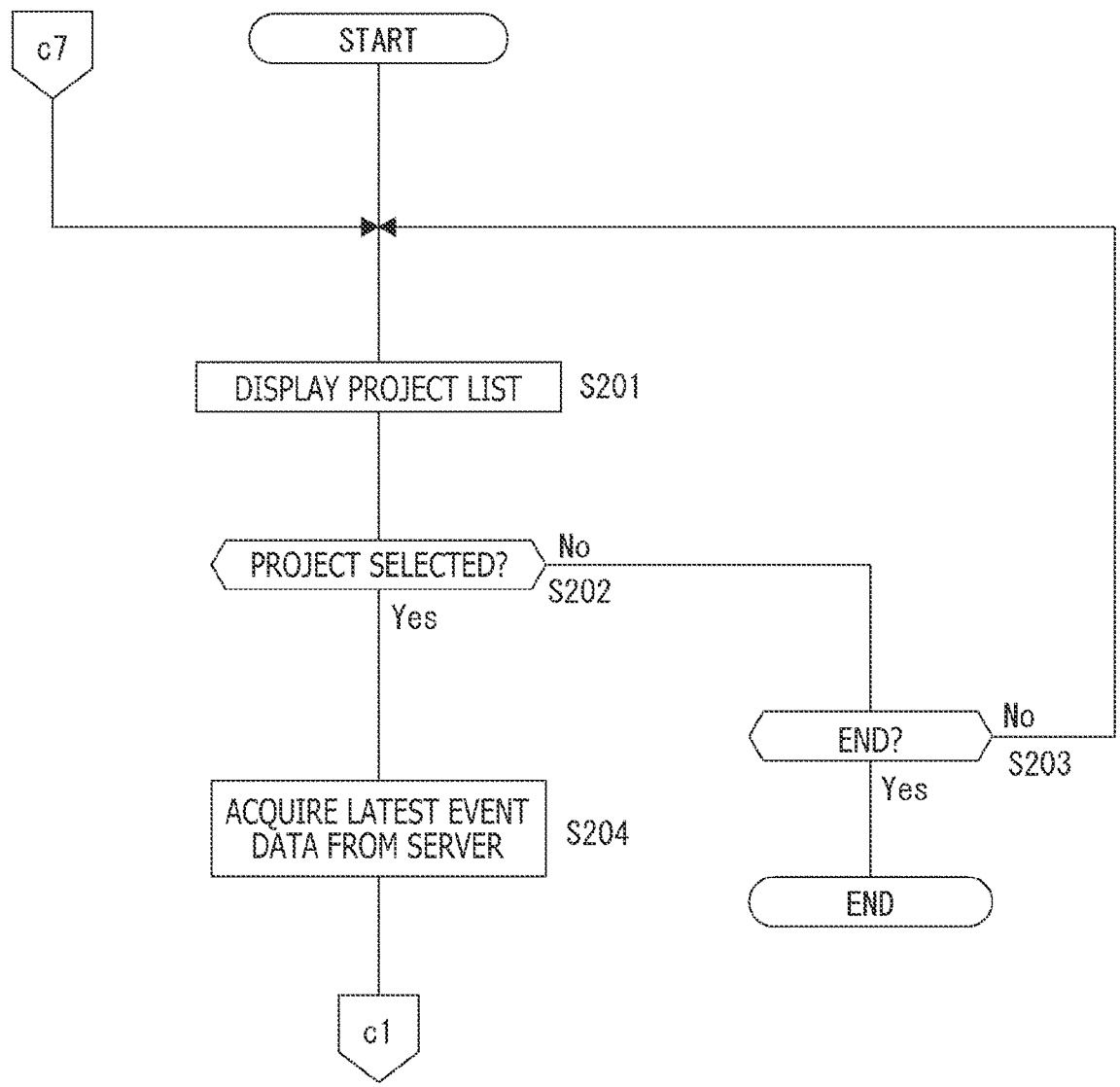
FIG. 12 is a flowchart of a selection assistance process performed by the terminal device of the embodiment.

Step S201 in FIG. 12 represents a process for displaying a list of projects (e.g., event names) on the project list screen 110 depicted in FIG. 10B.

In step S202, the staff terminal 1 monitors whether or not a project selection operation has been performed on the project list screen 110. Moreover, in step S203, the staff terminal 1 monitors an ending operation of an application program.

After completion of the ending operation of the application program, the application program is closed to end the process.

In a case where the selection is to be made immediately after the wedding, for example, the camera staff performs an operation for selecting a target project on the project list screen 110. For example, the camera staff performs such an operation as tapping one of projects displayed in the list region 111.

When detecting such an operation, the staff terminal 1 advances the process from step S202 to step S204 to acquire latest event data of the selected project. For example, the staff terminal 1 requests the server device 4 to transmit the event data 90 of the selected project, and imports the transmitted event data 90. Thereafter, the staff terminal 1 compares the event data 90 with the event data 60 retained in the staff terminal 1, and updates the event data 60 to latest information contents. For example, the staff terminal 1 makes a comparison between the event data 60 and the event data 90 with respect to any information as a reference for determining newness of information, such as update time-date information and version management information, and updates the event data 60 to latest information contents if any difference is recognized.

For example, assuming that the staff terminal 1 is the terminal device 1A carried by the photographer, rating information or selection information input from the assistant on the terminal device 1B side during the wedding may not be reflected in the event data 60 of the terminal device 1A.

Moreover, in a case of inputting the rating information and the selection information from the terminal device 1B carried by the assistant, it is appropriate for the assistant to input the rating information and the selection information with reference to the latest information on the terminal device 1A side.

Accordingly, the staff terminal 1 is configured to receive the event data 90 of the server device 4 to which the latest information has been transmitted from both the terminal devices 1A and 1B, and update the information included in the event data 60 retained by the staff terminal 1 if the event data 60 is not the latest information.

However, there is a case where only one staff terminal 1 is present, in which situation the information retained in the staff terminal 1 is always the latest information. In such a case, the processing in step S204 may be eliminated.

Figure 18:
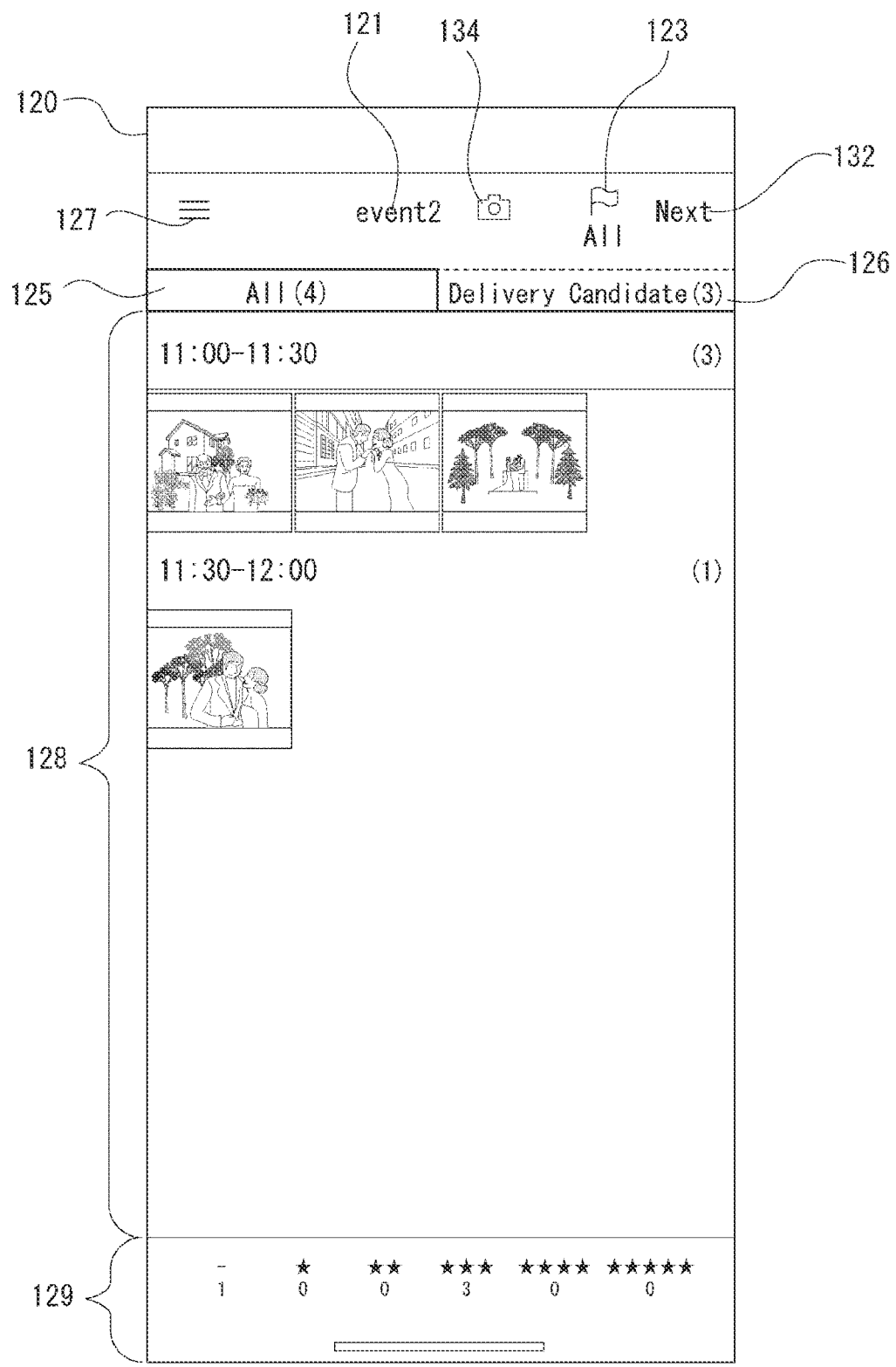
FIG. 18 is an explanatory diagram of an event screen of the embodiment.

Subsequently, the staff terminal 1 proceeds to step S211 in FIG. 13 to display a list of event images. For example, an event screen 120 depicted in FIG. 18 is displayed.

An event title 121 as well as an all flag icon 123, a next icon 132, a camera icon 134, a menu icon 127, and others are displayed in the event screen 120.

The menu icon 127 is an operator for displaying various types of menu items.

The camera icon 134 is an icon for displaying a state of FTP communication with the imaging device 2, for example.

The all flag icon 123 is an operator for providing on/off setting for a flag (selection flag) corresponding to use image information for all images.

The next icon 132 is an operator for transition to a next screen.

Moreover, the event screen 120 includes an image region 128 where a list of images transferred from the imaging device 2 is displayed as a thumbnail. For example, images are displayed in chronological order according to imaging time.

Further, an all tab 125 and a candidate tab 126 are provided with respect to display of the image region 128.

When the all tab 125 is selected, the images transferred from the imaging device 2 are displayed in the image region 128 regardless of an on-state or an off-state of the flag corresponding to the use image information. For example, it is assumed that FIG. 18 presents display of a list when the all tab 125 is selected.

Figure 19:
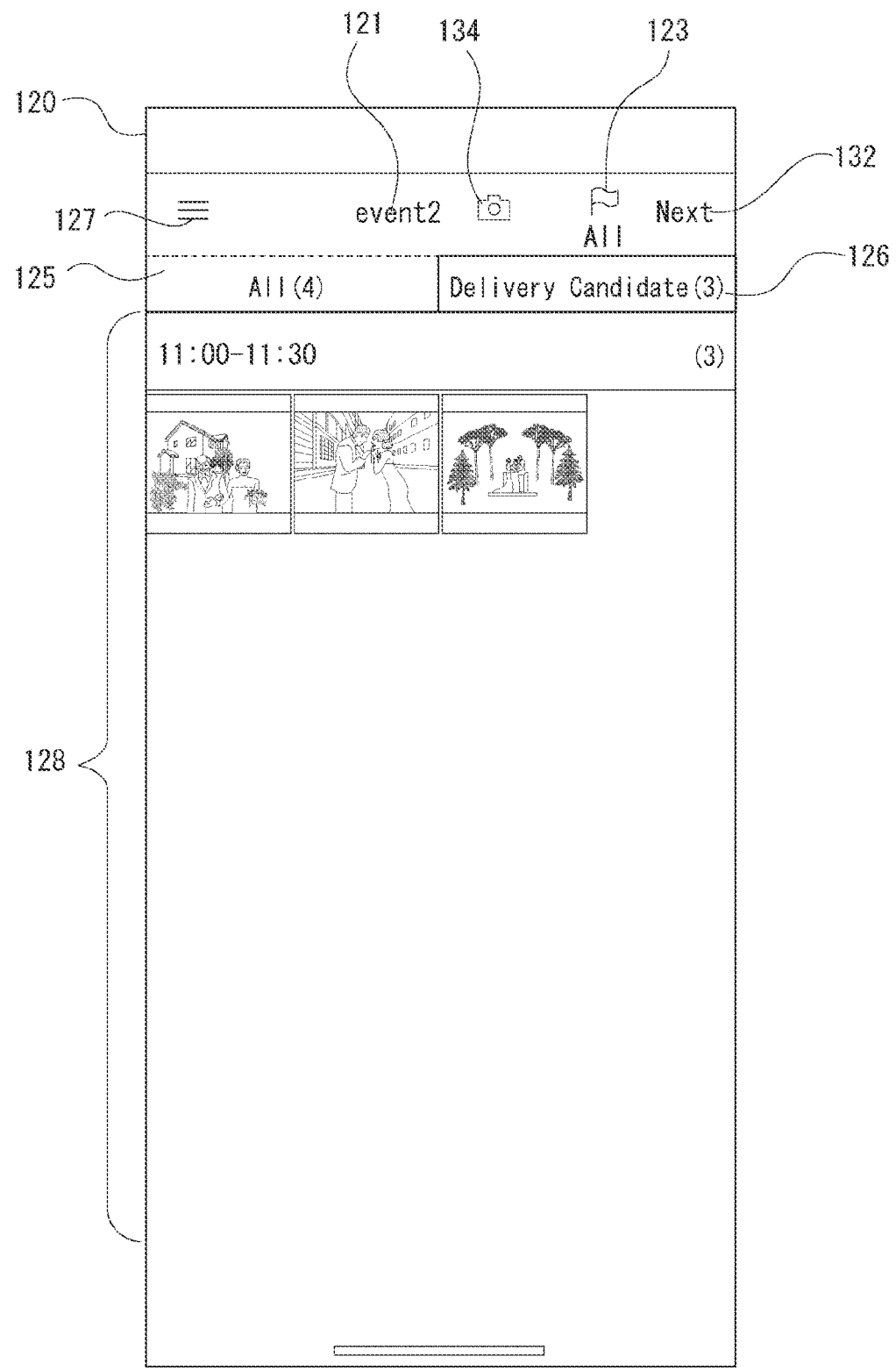
FIG. 19 is an explanatory diagram of tab transition of the event screen of the embodiment.

On the other hand, when the candidate tab 126 is selected, displayed in the image region 128 is a list of only the images corresponding to flag-on setting among all the images transferred from the imaging device 2. For example, FIG. 19 presents an example of display of a list when the candidate tab 126 is selected.

The on/off of the flag is set for each image by an operation performed by the camera staff according to whether or not the corresponding image is to be included in the web gallery.

In addition, the event screen 120 includes a filter designation region 129. Images can be narrowed down by six-level rating, for example, using the filter designation region 129. For example, operators indicating the number of stars are provided, and filtering is performed according to the designated operator to display a list of extracted images in the image region 128.

For example, in a case where the operator corresponding to three stars is operated, images corresponding to rating information indicating three stars or more (i.e., images corresponding to any one of "three stars," "four stars," and "five stars") are extracted, and a list of the extracted images is displayed. Alternatively, in this case, only the images corresponding to the rating information indicating "three stars" may be extracted, and a list of these images may be displayed.

Moreover, the filter designation region 129 indicates the number of images for which corresponding rating has been set, together with the operator expressed by the number of stars.

Figure 14:
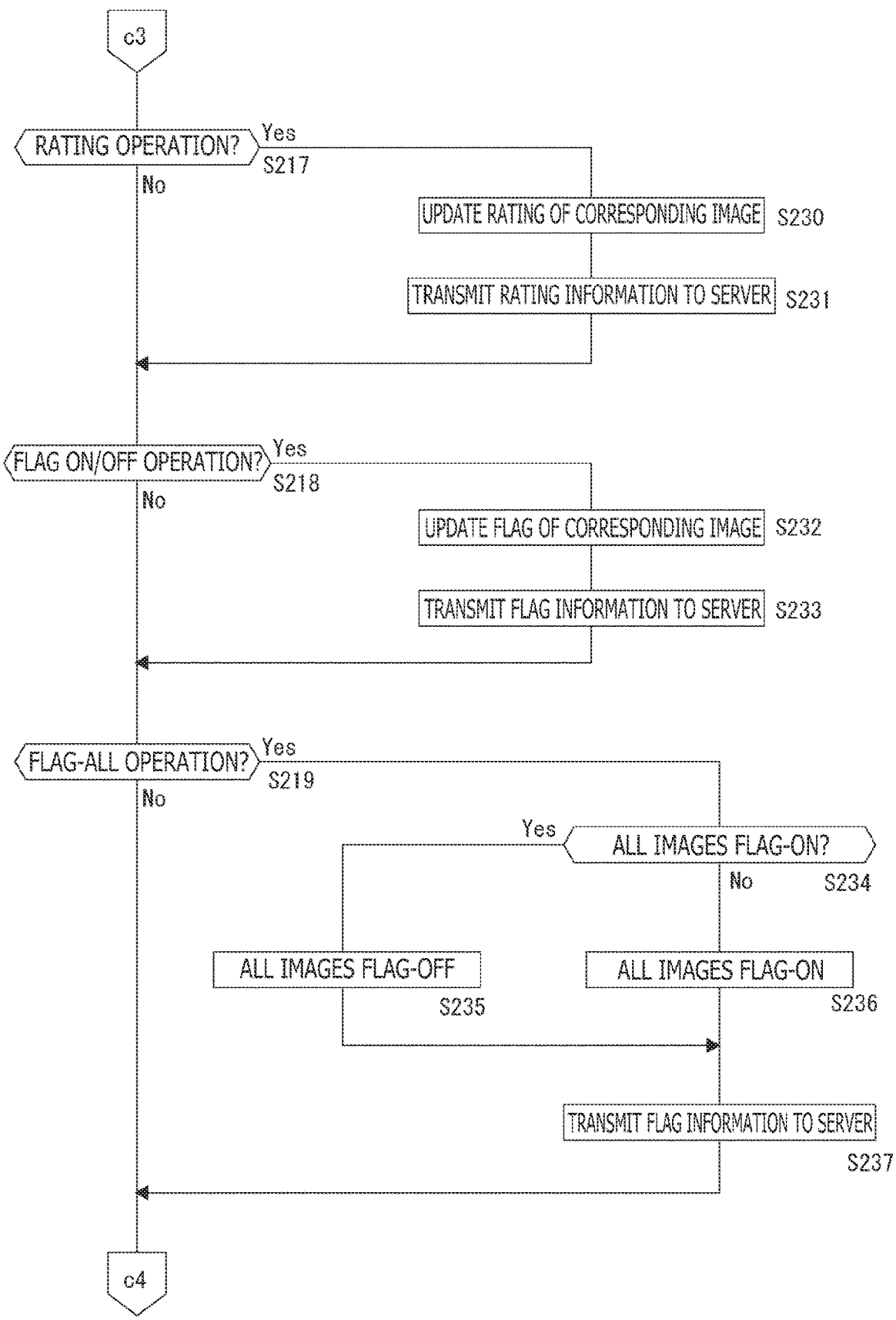
FIG. 14 is a flowchart of the selection assistance process performed by the terminal device of the embodiment.

In the state where the event screen 120 thus configured is displayed in step S211, the staff terminal 1 performs a monitoring loop from step S212 to step S219 in FIG. 14.

Figure 13:
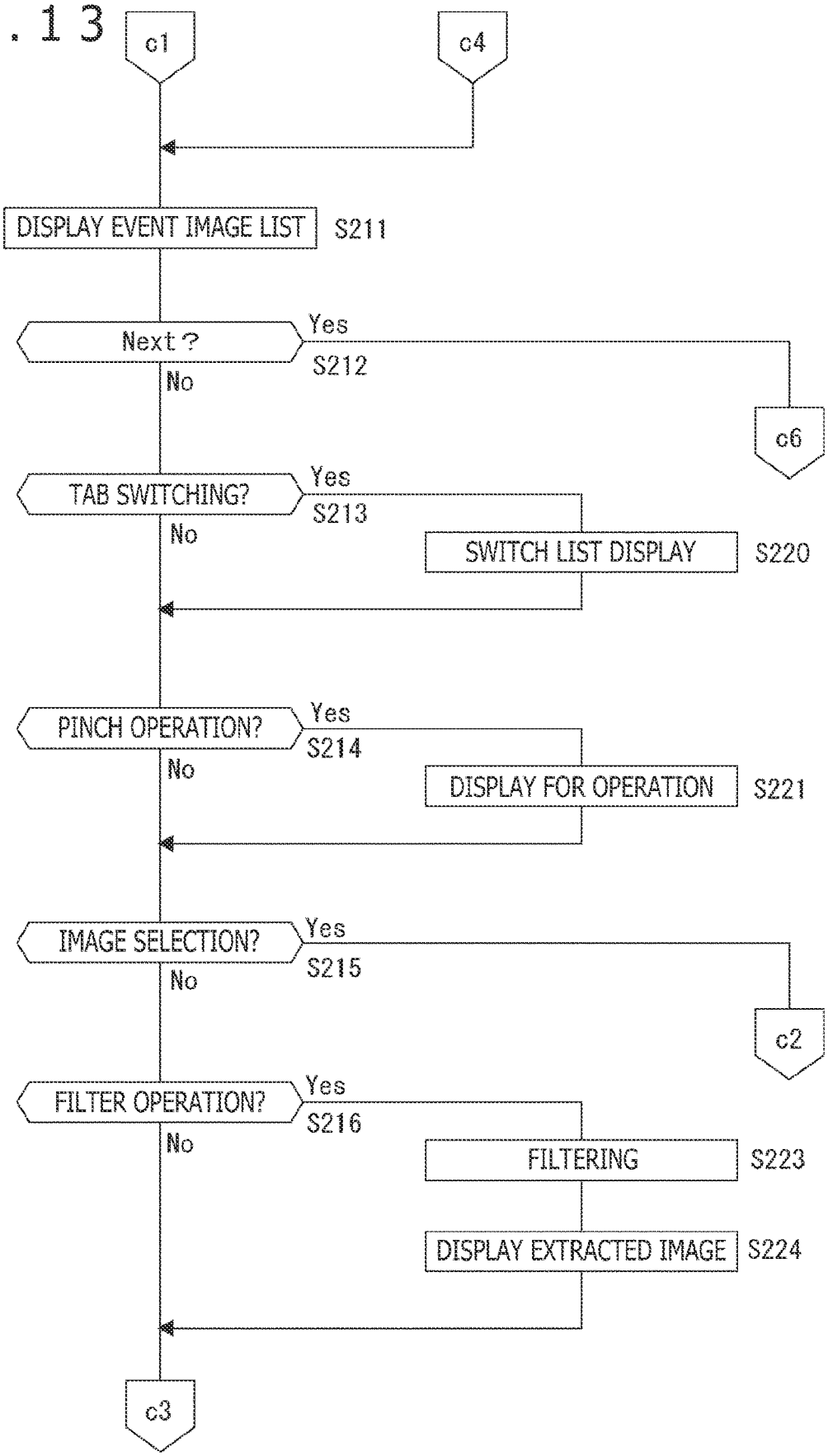
FIG. 13 is a flowchart of the selection assistance process performed by the terminal device of the embodiment.

In step S212 in FIG. 13, the staff terminal 1 monitors an operation of the next icon 132. A process performed in a case of detection of the operation of the next icon 132 will be described later.

In step S213, the staff terminal 1 monitors a tab switching operation. The tab switching operation is an operation of the candidate tab 126 during display of the list corresponding to the all tab 125, or an operation of the all tab 125 during display of the list corresponding to the candidate tab 126.

When detecting the tab switching operation, the staff terminal 1 performs a switching process for switching the contents in the display of the list in the image region 128 according to the selected tab in step S220.

In step S214, the staff terminal 1 monitors a pinch operation performed by the camera staff in the image region 128. The pinch operation referred to here is a pinch-out operation for image enlargement and a pinch-in operation for image reduction.

When detecting the pinch operation, the staff terminal 1 enlarges or reduces a display state in the image region 128 as the display for operation in step S221.

FIGS. 20A, 20B, and 20C each depict an example of a display change in the image region 128 according to pinch-in or pinch-out.

FIG. 20A depicts a normal display state similar to the display state in FIG. 18. When the pinch-out operation is performed, the images displayed in a list are enlarged as depicted in FIG. 20B. Further enlargement is achieved as depicted in FIG. 20C by the further pinch-out operation.

In addition, when the pinch-in operation is performed, the state in FIG. 2C is reduced to the state depicted in FIG. 20B, and returns to the state depicted in FIG. 20A by the further pinch-in operation.

Further, while not displayed in the normal display state in FIG. 20A, a rating icon 130 and a flag setting icon 131 are displayed in correspondence with images in this example as depicted in FIG. 20B and FIG. 20C in a stage of enlargement achieved by the pinch-out operation. In other words, when each of the images has a size easily viewable or a size easily operable, the rating icon 130 and the flag setting icon 131 are displayed in correspondence with the images.

In addition, needless to say, the rating icon 130 and the flag setting icon 131 may be displayed in correspondence with the images even in the state depicted in FIG. 20A.

In step S221 in FIG. 13, the staff terminal 1 performs a process for changing the display state in the image region 128 in association with the pinch operation as in the example described above.

The rating icon 130 is an operator operated not only to display rating information set as the number of stars, but also to change rating. For example, the number of stars can be changed by tapping or sliding a portion corresponding to the rating icon 130. This operation is defined as a rating change operation.

Moreover, for example, the flag setting icon 131 expresses on/off of the flag by changing the color, the luminance, or the like of the icon, for example. Furthermore, the flag setting icon 131 also functions as an operator for switching between on and off of the flag. For example, switching between on and off of the flag is achieved by a tap operation.

In step S215, the staff terminal 1 monitors whether or not an operation for selecting one of the images displayed in the image region 128 has been performed. For example, this operation is an operation for tapping one thumbnail image. A process performed in a case of detection of this selection operation will be described later.

In step S216, the staff terminal 1 monitors a filtering operation. Specifically, this operation is an operation of an operator indicating rating of the filter designation region 129.

In a case of detection of an operation of any one of operators in the filter designation region 129, the staff terminal 1 proceeds to step S223 to perform filtering according to the detected operator and extract corresponding images. Thereafter, in step S224, a list of the extracted images is displayed in the image region 128.

In step S217 in FIG. 14, the staff terminal 1 monitors a rating operation. For example, this operation is an operation performed for the rating icon 130 as depicted in each of FIG. 20B and FIG. 20C.

In a case of detection of the operation for the rating icon 130, the staff terminal 1 proceeds to step S230 to update the event data 60 such that rating information associated with images corresponding to the rating icon 130 has a value corresponding to the operation.

Moreover, in step S231, the staff terminal 1 transmits the updated rating information to the server device 4 to update the event data 90 on the server device 4 side. In other words, a synchronous state is maintained.

In step S218, the staff terminal 1 monitors a flag on/off operation. For example, this operation is an operation performed for the flag setting icon 131 as depicted in each of FIG. 20B and FIG. 20C.

In a case of detection of the operation for the flag setting icon 131, the staff terminal 1 proceeds to step S232 to update the event data 60 such that switching is achievable between on and off of the flag of the selection information associated with images corresponding to the flag setting icon 131.

Moreover, in step S233, the staff terminal 1 transmits the updated flag information to the server device 4 to update the event data 90 on the server device 4 side. In other words, the synchronous state is maintained.

In step S219, the staff terminal 1 monitors an operation of the all flag icon 123.

In a case of detection of an operation performed for the all flag icon 123, the staff terminal 1 proceeds to step S234 to branch the process according to whether or not all the images are flag-on images. When all the images are not flag-on images, i.e., when some of the images are flag-on images or when all of the images are flag-off images, the staff terminal 1 proceeds to step S236 to update the event data 60 such that all the images become flag-on images.

On the other hand, when the all flag icon 123 is operated in a state where all the images are flag-on images, the staff terminal 1 proceeds to step S235 to update the event data 60 such that all the images become flag-off images.

Moreover, in step S237, the staff terminal 1 transmits the updated flag information to the server device 4 to update the event data 90 on the server device 4 side. In other words, the synchronous state is maintained.

Subsequently described will be a process performed in a case of detection of the image selection operation in step S215 in FIG. 13. In this case, the process performed by the staff terminal 1 proceeds to step S250 in FIG. 15 to display one display screen 140 depicted in FIG. 21.

One display region 142 is provided in the one display screen 140 to display a selected image in a larger size in the one display region 142.

An image displayed in the one display region 142 is an image formed from editing image data managed in the event data 60, for example. Specifically, this image is a reproduction image formed from editing image data generated by the auto-retouch processing in step S106 in FIG. 11, and from image data reflecting retouch parameters included in the prior setting information 61.

Moreover, a focus point mark 149 indicating a focal position within the image is displayed in the image depending on circumstances.

Further, a return icon 133, which is an operator for turning display back to the event screen 120, and the rating icon 130 and the flag setting icon 131 for the displayed image are displayed in the one display screen 140.

In addition, an editing icon 145, a focus point operation icon 146, an export icon 147, and an original icon 148 for operations associated with the displayed image are displayed in the one display screen 140.

Figure 15:
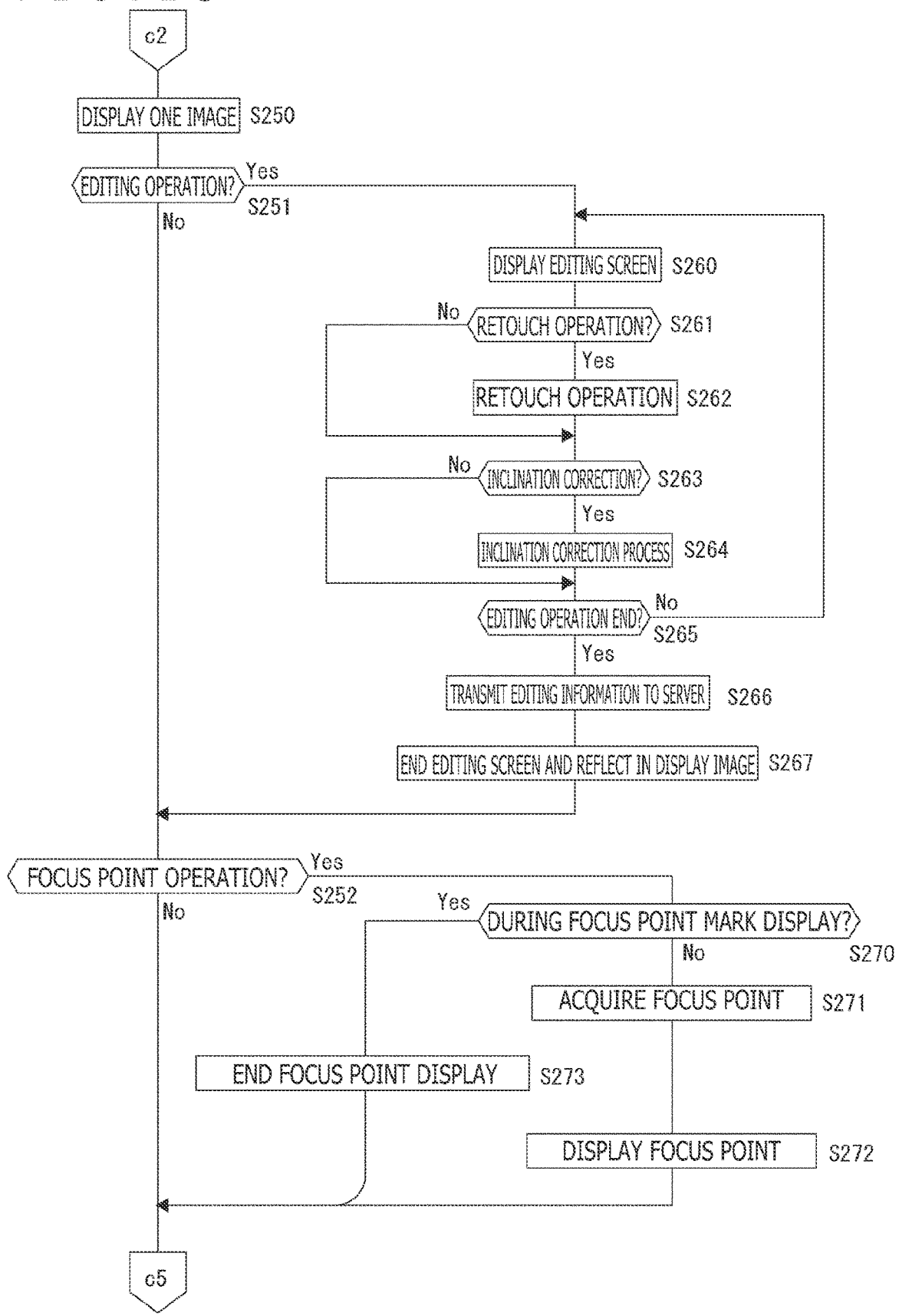
FIG. 15 is a flowchart of the selection assistance process performed by the terminal device of the embodiment.
Figure 16:
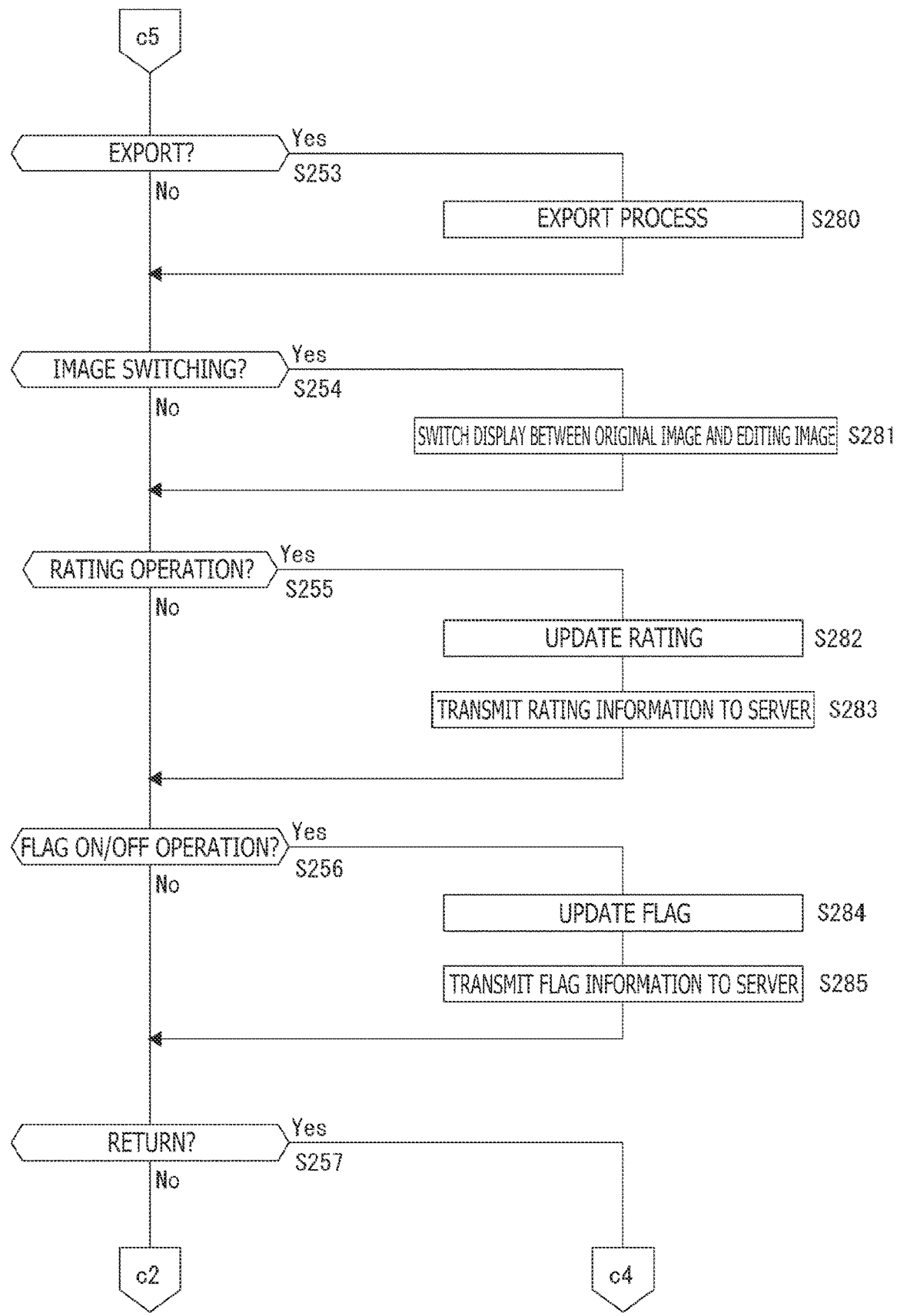
FIG. 16 is a flowchart of the selection assistance process performed by the terminal device of the embodiment.

The staff terminal 1 performs a monitoring loop process from step S251 to step S257 in FIGS. 15 and 16 in a state where the one display screen 140 thus configured is displayed.

In step S251, the staff terminal 1 monitors an operation of the editing icon 145.

In a case of detection of the operation of an operator of the editing icon 145, the staff terminal 1 proceeds to step S260 to display an unillustrated editing screen. For example, a user interface allowing such operations as a retouch operation and an inclination correction operation is provided in the editing screen. The camera staff is allowed to perform an image editing operation by using this user interface.

For example, a luminance adjustment value, a color adjustment value, a contrast adjustment value, a sharpness adjustment value, and the like can be set as retouch parameters for the retouch operation.

For example, an operator for adjusting an angle of each image is provided in the inclination correction operation.

Note that the editing screen may be a screen different from the one display screen 140, or may be a screen superimposed on the one display screen 140 to display various operators on the screen.

In a case of detection of the retouch operation, the staff terminal 1 proceeds from step S261 to step S262 to perform a retouch process. This process is a process for further editing the editing image data by using the retouch parameters input by an operation performed by the camera staff. Moreover, the retouch parameters input in this case are stored in the event data 60 as editing information associated with individual image data.

In a case of detection of the inclination correction operation, the staff terminal 1 proceeds from step S263 to step S264 to perform an image inclination correction process. This process is a process for editing the editing image data by using inclination correction parameters input according to an operation performed by the camera staff. Moreover, the inclination correction parameters input in this case are stored in the event data 60 as editing information associated with individual image data.

When detecting an end of the editing operation in step S265, the staff terminal 1 in step S266 transmits the editing information included in the event data 60 and updated according to the editing process to the server device 4 to update the event data 90 on the server device 4 side. In other words, the synchronous state is maintained.

In step S267, the staff terminal 1 ends the editing screen, and returns to the normal one display screen 140. At this time, an editing result is reflected in the displayed image.

In such a manner, the camera staff is allowed to perform any image retouch and inclination correction according to an operation performed by using the editing icon 145.

In step S252, the staff terminal 1 monitors an operation of the focus point operation icon 146 in the display state of the one display screen 140.

In a case of detection of the operation of the focus point operation icon 146, the staff terminal 1 proceeds to step S270 to branch the process according to whether or not the focus point mark 149 is currently being displayed in the image in the one display region 142.

If the focus point mark 149 is not currently being displayed, the staff terminal 1 proceeds to step S271 to acquire information associated with the focus point of the displayed image. The focus point is information which indicates a position corresponding to a focused state produced by the imaging device 2 within the image during imaging, and is described in metadata. For example, the focus point is described as coordinate information indicating one point within the image.

Figure 21:
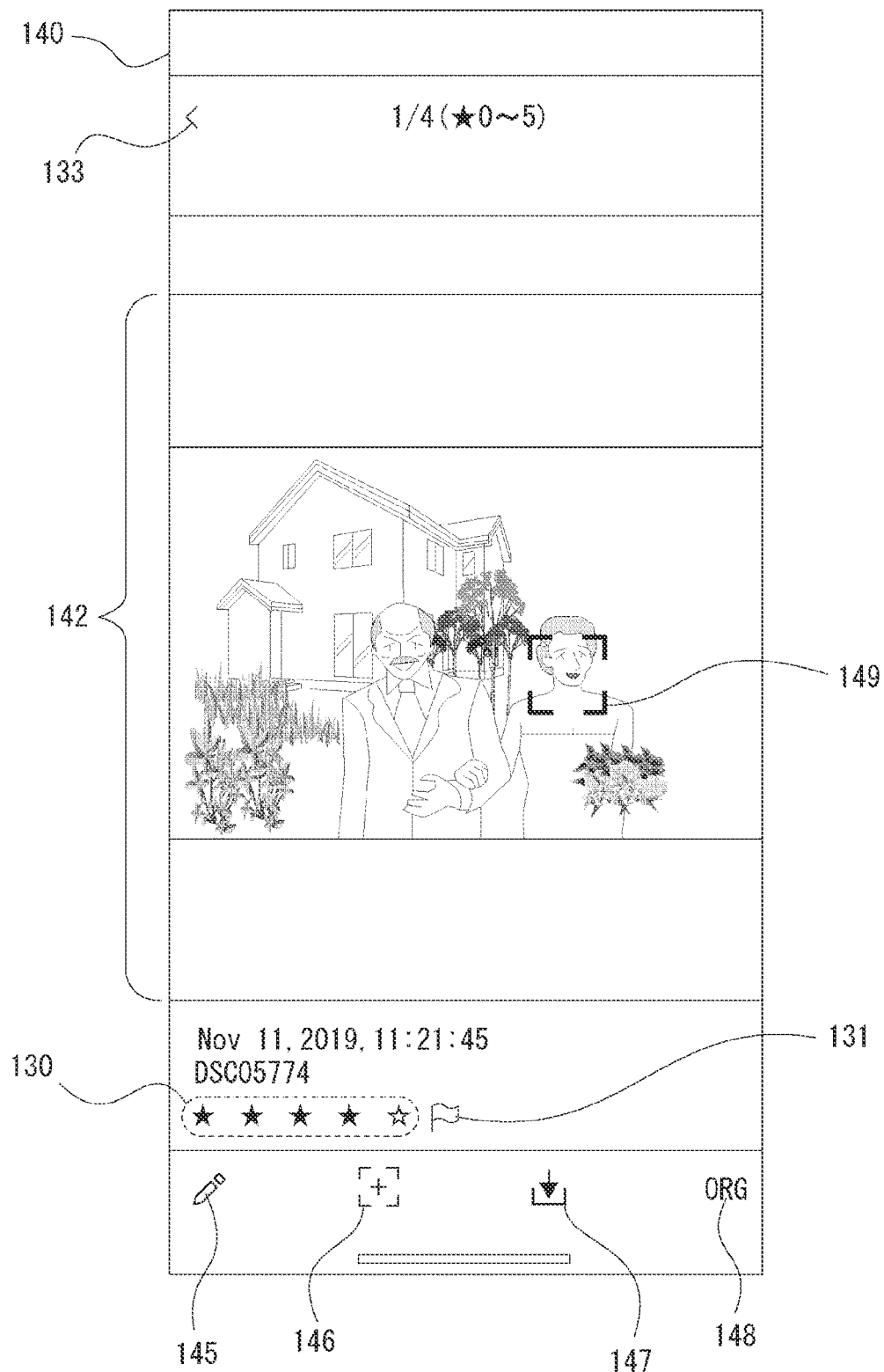
FIG. 21 is an explanatory diagram of one display screen of the embodiment.

The staff terminal 1 acquires information associated with the focus point from the metadata of the displayed image, and displays the focus point mark 149 in the displayed image according to this information as depicted in FIG. 21. For example, the focus point mark 149 is displayed as a region having predetermined expansion around the coordinate information that indicates one point within the image and that is stored as the focus point. As a result, the user can check an object in a focused state during imaging.

Note that the "expansion" described above as the region indicated by the focus point mark 149 may be variable. For example, a volume of expansion may be varied according to the position in the image or an object obtained by object recognition. For example, at the time of focus on the pupil of a person in FIG. 21, the focus point mark 149 may be displayed in a narrow region corresponding to the pupil. At the time of focus on a bouquet, the focus point mark 149 may be a wide region displayed in such a manner as to contain the whole bouquet.

Moreover, the focus point mark 149 is displayed in a form of a mark indicating four corners (a quadrangle expressed by brackets) in FIG. 21. However, other display forms such as a quadrangular frame and a circular frame may be adopted.

Further, while FIG. 21 depicts a case where only one focus point is produced, also possible is such a case where multiple focus points are produced, such as a case of focus on multiple portions of an object (e.g., bride) in an image and a case of focus on a part of each of multiple objects (e.g., bride and bridegroom). Accordingly, the metadata as the focus point may include description of multiple coordinate positions. In that case, multiple focus point marks 149 are displayed in correspondence with these positions.

Moreover, while the focus point mark 149 is displayed in the one display screen as depicted in FIG. 21, the focus point mark 149 may be displayed in the image included in the list of images in the image region of the event screen depicted in FIG. 18, for example.

In a case of detection of an operation of the focus point operation icon 146 in step S252 during display of the focus point operation icon 146, the staff terminal 1 proceeds from step S270 to step S273 to end display of the focus point operation icon 146.

Accordingly, the camera staff is allowed to turn on or off the display of the focus point mark 149 by using the focus point operation icon 146.

In step S253 in FIG. 16, the staff terminal 1 monitors an operation of the export icon 147 in the display state of the one display screen 140.

In a case of detection of the operation of the export icon 147, the staff terminal 1 proceeds to step S280 to perform an export process. Specifically, the export process for exporting information associated with displayed image data is performed.

In step S254, the staff terminal 1 monitors an image switching operation. The image switching operation in this case is an operation of the original icon 148.

In a case of detection of the operation of the original icon 148, the staff terminal 1 proceeds to step S281 to switch between images based on original image data and images based on editing image data. Specifically, when reproduction images based on the editing image data are currently being displayed, display is switched to reproduction images based on the original image data. Meanwhile, when reproduction images based on the original image data are currently being displayed, display is switched to reproduction images based on the editing image data.

Accordingly, the camera staff is allowed to visually compare edited images and original images in any manner by the operation of the original icon 148.

The rating icon 130 of the currently displayed image is displayed in the one display screen 140.

In step S255, the staff terminal 1 monitors a rating operation.

In a case of detection of the operation for the rating icon 130, the staff terminal 1 proceeds to step S282 to update the event data 60 such that rating information associated with the displayed image has a value corresponding to the operation.

Moreover, in step S283, the staff terminal 1 transmits the updated rating information to the server device 4 to update the event data 90 on the server device 4 side. In other words, the synchronous state is maintained.

The flag setting icon 131 of the currently displayed image is displayed in the one display screen 140.

In step S256, the staff terminal 1 monitors a flag on/off operation, i.e., an operation of the flag setting icon 131.

In a case of detection of the operation for the flag setting icon 131, the staff terminal 1 proceeds to step S284 to update the event data 60 such that switching is achievable between on and off of the flag of the selection information associated with the displayed image.

Moreover, in step S285, the staff terminal 1 transmits the updated flag information to the server device 4 to update the event data 90 on the server device 4 side. In other words, the synchronous state is maintained.

In step S257, the staff terminal 1 monitors an operation of the return icon 133.

In a case of detection of the operation of the return icon 133, the staff terminal 1 proceeds to step S211 in FIG. 13 to end the one display screen 140 and return to a state of display of the event screen 120.

Subsequently described will be a process performed in a case of detection of an operation of the next icon 132 in step S212 in FIG. 13.

Figure 17:
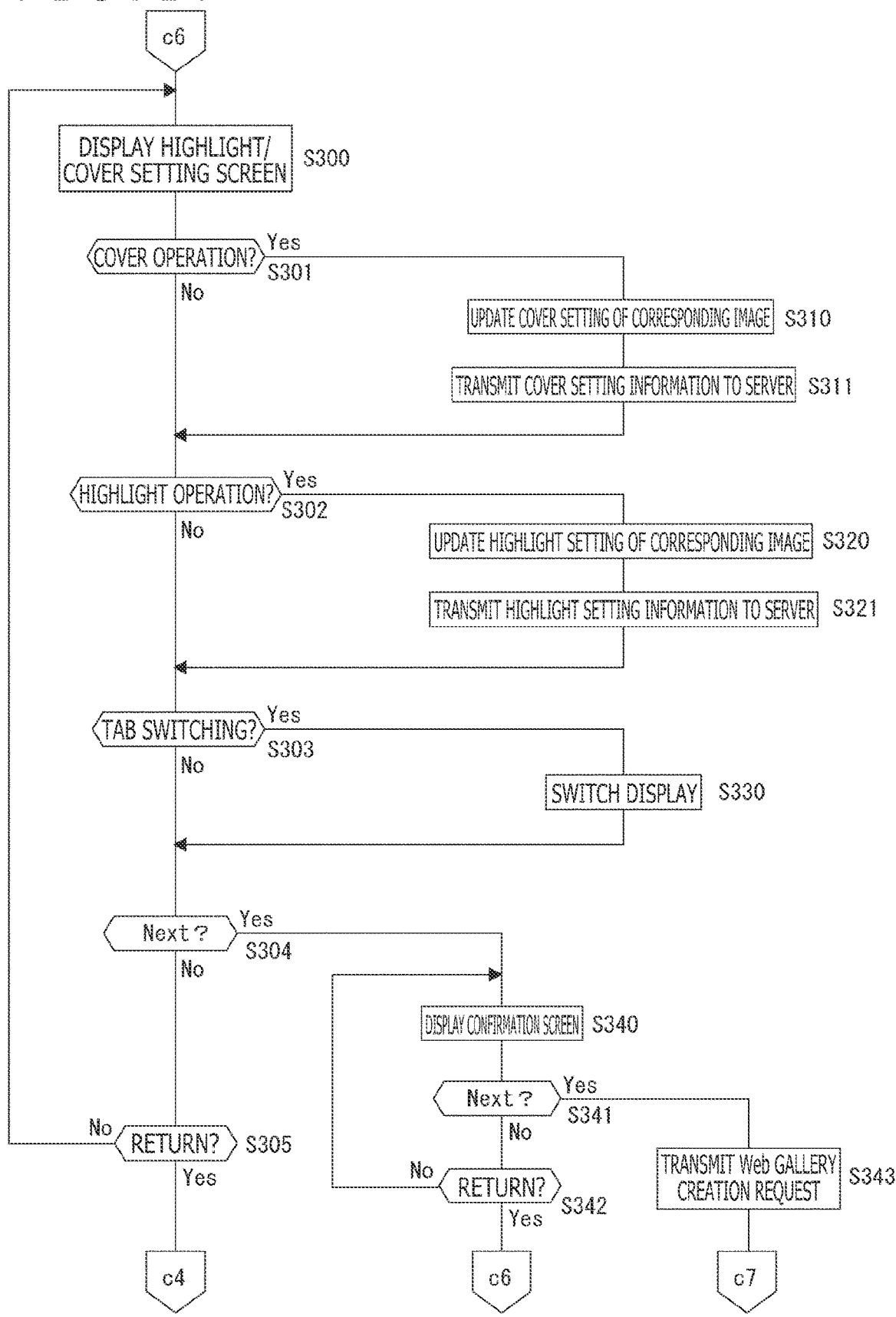
FIG. 17 is a flowchart of the selection assistance process performed by the terminal device of the embodiment.
Figure 22:
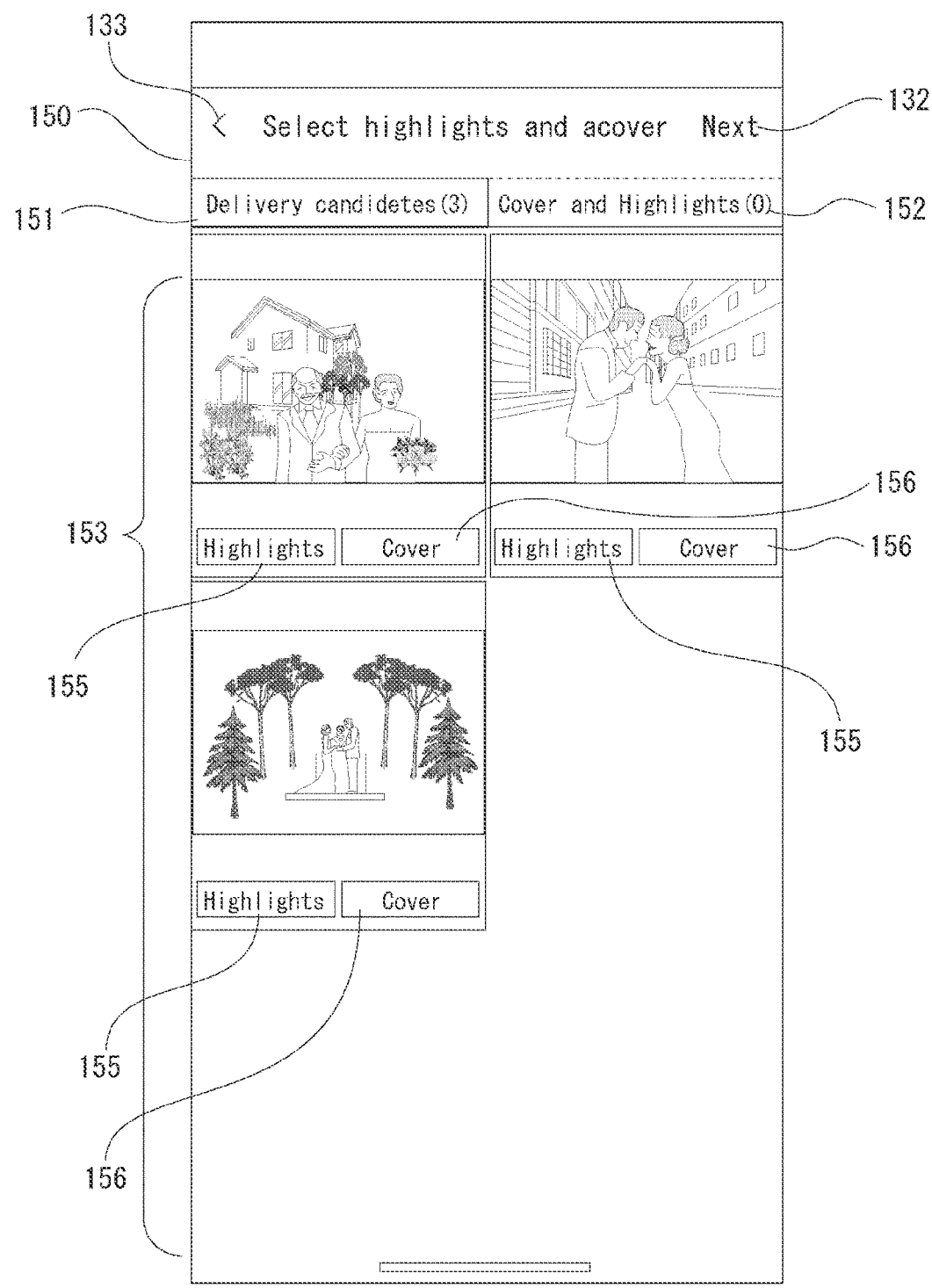
FIG. 22 is an explanatory diagram of a cover-highlight selection screen of the embodiment.

In this case, the process performed by the staff terminal 1 advances to step S300 in FIG. 17 to display a cover-highlight selection screen 150 depicted in FIG. 22.

The cover-highlight selection screen 150 is a screen used by the camera staff to perform an operation of selecting an image as a cover (front cover) of a web gallery or an image for highlight (emphasized display).

The return icon 133 and the next icon 132 are displayed in the cover-highlight selection screen 150.

Moreover, in the cover-highlight selection screen 150, a list designation region 153 is provided, and a candidate tab 151 and a selection tab 152 are provided.

When the candidate tab 151 is selected, a list of images corresponding to flag-on images (i.e., images selected to be included in the web gallery) is displayed in the list designation region 153.

Moreover, a highlight button 155 and a cover button 156 are displayed for each image. The highlight button 155 is an operator for designating a highlight image, while the cover button 156 is an operator for designating a cover image.

Note that the highlight button 155 may express the presence or absence of current highlight setting by a display mode of the highlight button 155, and that the cover button 156 may express a current cover setting state by a display mode of the cover button 156.

When the selection tab 152 is selected, a list of images each designated as a cover image or a highlight image is displayed in the list designation region 153.

The camera staff operates the cover-highlight selection screen 150 thus configured, to select a cover image or a highlight image.

In the state where the cover-highlight selection screen 150 is displayed in step S300 in FIG. 17, the staff terminal 1 performs a process of a monitoring loop from step S301 to step S305.

In step S301, the staff terminal 1 monitors an operation of the cover button 156.

In a case of detection of the operation for the cover button 156, the staff terminal 1 proceeds to step S310 to set cover image information included in the selection information, in such a manner as to set a corresponding image as a cover image, and to update the event data 60.

Moreover, in step S311, the staff terminal 1 transmits the updated selection information to the server device 4 to update the event data 90 on the server device 4 side. In other words, the synchronous state is maintained.

In step S302, the staff terminal 1 monitors an operation of the highlight button 155.

In a case of detection of the operation for the highlight button 155, the staff terminal 1 proceeds to step S320 to set emphasis display image information included in the selection information, in such a manner as to set a corresponding image as a highlight image, and to update the event data 60.

Moreover, in step S321, the staff terminal 1 transmits the updated selection information to the server device 4 to update the event data 90 on the server device 4 side. In other words, the synchronous state is maintained.

In step S303, the staff terminal 1 monitors a tab switching operation. The tab switching operation in this case is an operation of the selection tab 152 during display of the list corresponding to the candidate tab 151, or an operation of the candidate tab 151 during display of the list corresponding to the selection tab 152.

When detecting the tab switching operation, the staff terminal 1 performs a switching process for switching the contents of the list in the list designation region 153 according to the selected tab in step S330.

In step S305, the staff terminal 1 monitors an operation of the return icon 133. When detecting an operation of the return icon 133, the staff terminal 1 proceeds to step S211 in FIG. 13 to return to a state of display of the event screen 120.

As a result, the camera staff can interrupt cover-highlight designation, or resume selection from the flag setting.

When the operation in the cover-highlight selection screen 150 is completed, the camera staff operates the next icon 132.

In step S304 in FIG. 17, the staff terminal 1 monitors an operation of the next icon 132. When detecting the operation of the next icon 132, the staff terminal 1 proceeds to step S340 to display a confirmation screen.

Figure 23:
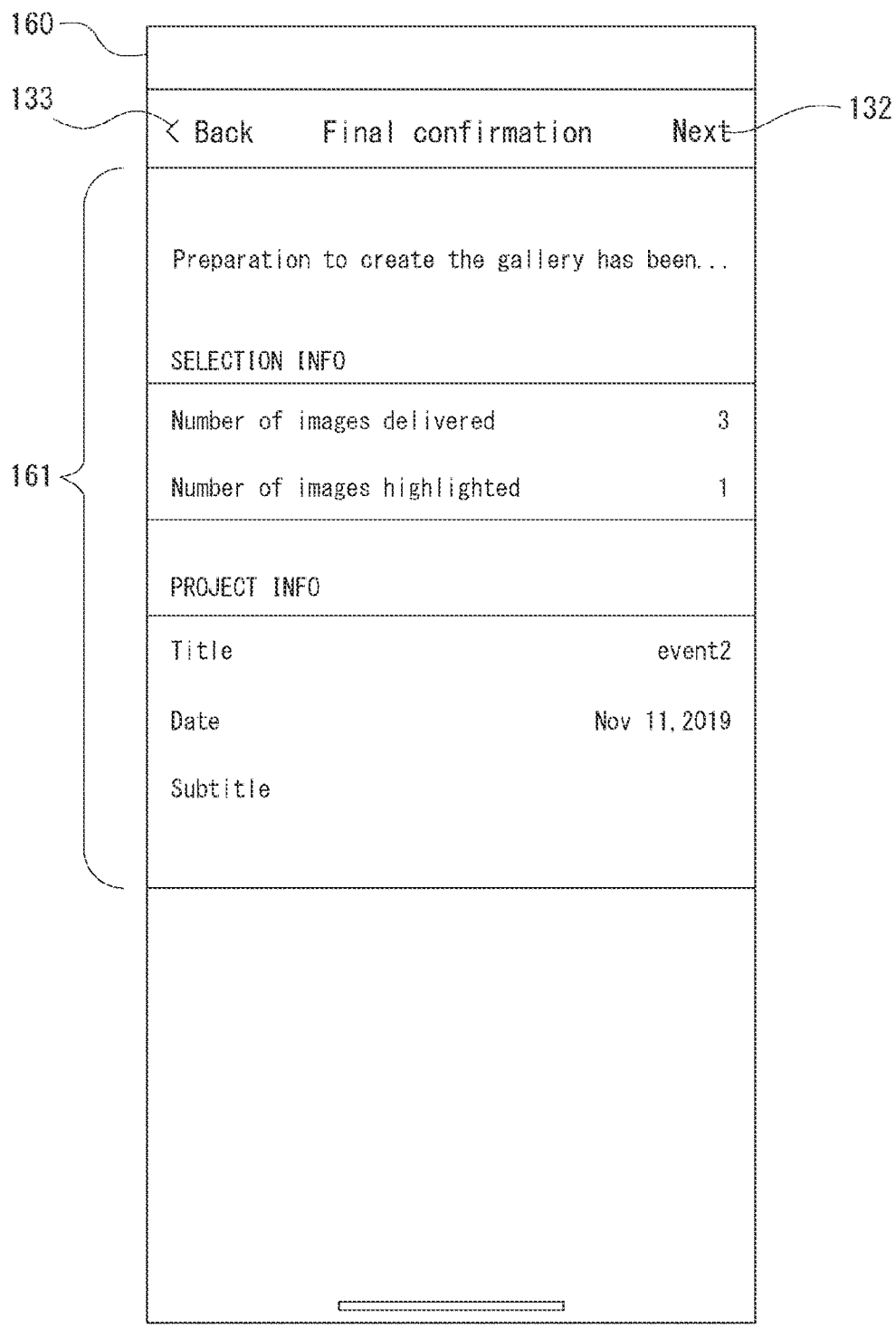
FIG. 23 is an explanatory diagram of a confirmation screen of the embodiment.

FIG. 23 depicts an example of a confirmation screen 160. The return icon 133 and the next icon 132 as well as a detailed region 161 are prepared for the confirmation screen 160 to display final confirmation contents in the confirmation screen 160. For example, such detailed information as the number of images which are to be included in a web gallery and to which a flag is given, the number of images for highlight display, a title, and time and date is displayed.

The staff terminal 1 monitors an operation of the next icon 132 in step S341 in FIG. 17, and monitors an operation of the return icon 133 in step S342.

When detecting the operation of the return icon 133, the staff terminal 1 returns to step S300 to return to the state of display of the cover-highlight selection screen 150.

When detecting the operation of the next icon 132, the staff terminal 1 proceeds to step S343 to transmit a web gallery creation request to the server device 4.

Thereafter, the staff terminal 1 proceeds to step S201 in FIG. 12 to return to the state of display of the project list screen 110. Note that the staff terminal 1 in this case may proceed to step S211 in FIG. 13 to return to the event screen 120.

Meanwhile, in the selection process described above, the camera staff is required to sequentially repeat determination as to whether or not an image is to be selected as an image to be included in the web gallery (flag on/off). Accordingly, even in a case where multiple similar images (images of a similar object or of an object having a similar pose or a similar angle of view, or the like) are successively captured (i.e., also referred to as a case where an identical scene is captured), determination of flag on/off needs to be made after browsing similar images one by one at the time of browsing.

For example, in a case where images of an identical scene continue, it is efficient to perform a display process in such a manner as to display images of a next scene for browsing instead of displaying remaining images of the identical scene after determination of a predetermined number of flag-on images as images to be included in the web gallery.

A flow of a specific process will hereinafter be described. It is preferable, as a premise of this description, to recognize an imaging scene of images in reference to information indicating a type of an object of each of captured images, a pose, an angle of view, and an imaging time of the object, and the like. For example, in a case where the imaging device 2 has a function of recognizing scene information, multiple captured images can be grouped for each scene by adding scene information associated with the respective images to metadata of an image file transferred to the staff terminal 1. Alternatively, in a case where the staff terminal 1 has the function of recognition, the images can be grouped for each scene by the staff terminal 1. In either of these cases, the scene information associated with the respective images can be retained within the event data 60 in FIG. 5.

Another processing example of the selection in step S3 in FIG. 2 will hereinafter be described with reference to a flowchart in FIG. 31 and a screen example in FIG. 32.

Figure 31:
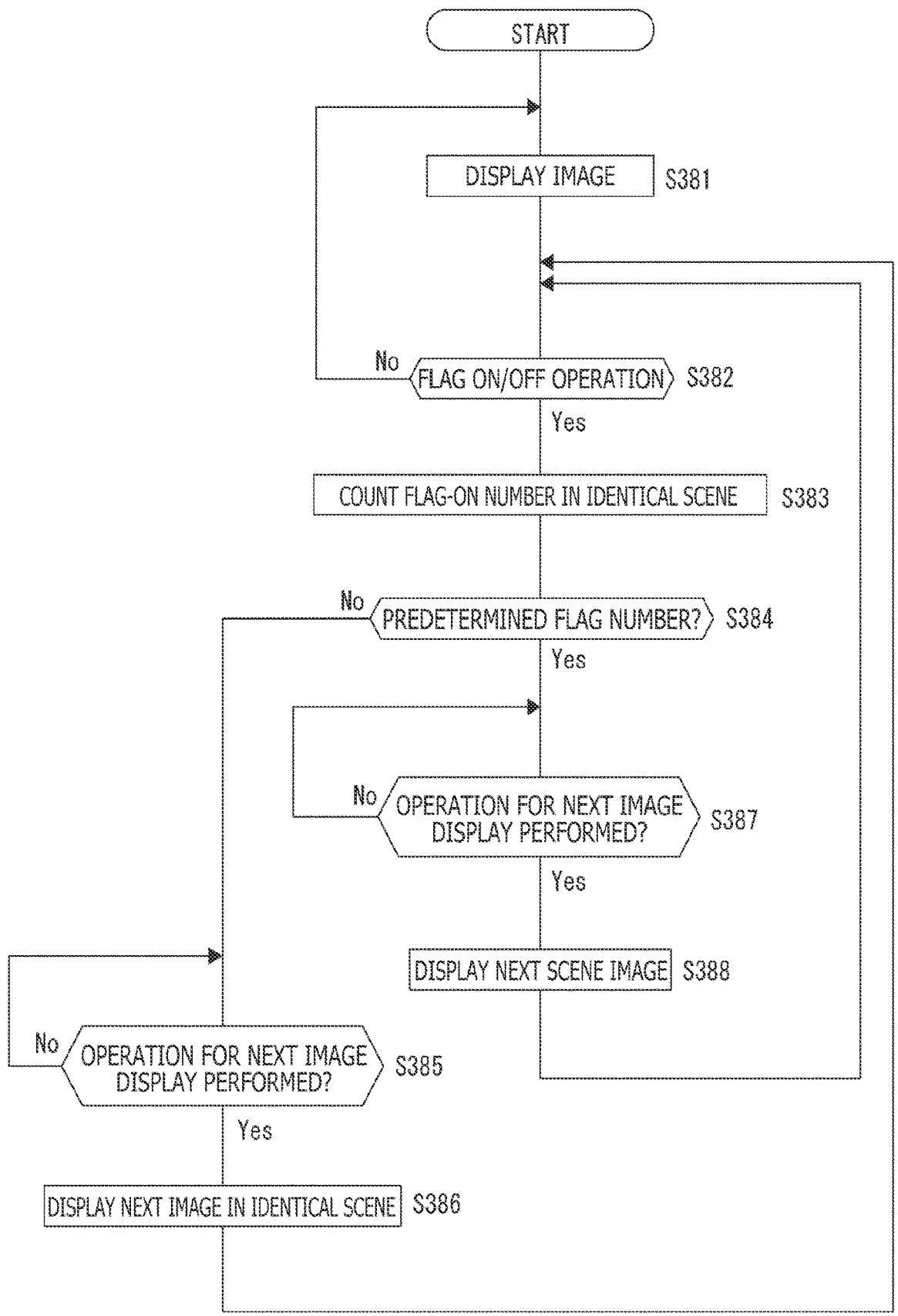
FIG. 31 is a flowchart of a display control process example according to a flag-on number of the embodiment.

The process of the flowchart in FIG. 31 is a process performed by the function of the UI control unit 31 in FIG. 4. Note that the present processing example is also considered as an example of a case where the processing in steps S218, S232, and/or S233 in FIG. 14 is repeatedly performed for all images.

Step S381 in FIG. 31 is processing performed by the staff terminal 1 for displaying each of the images depicted in FIG. 20A, FIG. 20B, and FIG. 20C by way of example. In step S382, the staff terminal 1 monitors a flag on/off operation for the displayed image. For example, this operation is an operation performed for the flag setting icon 131 as depicted in each of FIG. 20B, and FIG. 20C.

In a case of detection of the operation for the flag setting icon 131, the staff terminal 1 updates the event data 60 such that switching is achievable between on and off of the flag of the selection information associated with images corresponding to the flag setting icon 131.

In step S383, the staff terminal 1 receives a result of the flag operation performed in step S382, and counts the flag-on number corresponding to the number of images determined as flag-on images in a grouped identical scene. In step S384, the staff terminal 1 compares a predetermined flag-on number determined beforehand for each scene with the flag-on number counted in step S383, to determine whether the flag-on number has reached the predetermined number. Note that the predetermined flag-on number may be determined beforehand by the camera staff for each scene, or may be determined according to the number of images in a group designated as an identical scene.

In a case of such a determination that the flag-on number has not yet reached the predetermined number, the staff terminal 1 proceeds to step S385 to monitor whether an operation for displaying the next image has been performed. In a case where this operation has been performed, the staff terminal 1 proceeds to step S386 to perform control for continuously displaying the next image in the identical scene. On the other hand, in a case of such a determination that the flag-on number has reached the predetermined number in step S384, the staff terminal 1 proceeds to step S387 to monitor whether an operation for displaying the next image has been performed. In a case where this operation has been performed, the staff terminal 1 proceeds to step S388 to perform control for displaying an image in a scene of the next group different from the scene of the current group. This process may be repeated until completion of processing for scenes of all groups.

FIG. 32A and FIG. 32B each depict a screen example of a state of a display order of images. FIG. 32A is an example which sequentially displays all images (images A to E) regardless of scenes of the images. FIG. 32B is an example a case which does not display some of the images (skips display) according to scenes and the flag-on number.

For example, in a case where the image A is brought into flag-off in a scene SN1 where the predetermined flag-on number is designated as "1," the flag-on number becomes "0 (zero)" and does not reach the predetermined flag-on number. Accordingly, display control is performed to display the next image B in the scene SN1 as the identical scene as depicted in FIG. 32B. Subsequently, in a case where the image B is brought into flag-on, the flag-on number becomes "1." In this case, the flag-on number has reached the predetermined number. Accordingly, display control is performed to display the image D corresponding to an image of a next scene SN2 without the next image C in the identical scene being displayed, as depicted in the figure. Furthermore, in a case where the image D is brought into flag-on in the scene SN2 where the predetermined flag-on number is designated as "1", the flag-on number becomes "1," and reaches the predetermined number. Accordingly, an image in the next scene is displayed without the next image E in the identical scene being displayed.

Subsequently described will be a process for switching rating information and selection information between images as a further processing example of the selection process.

In the selection in step S3 in FIG. 2, there is sometimes a case where the camera staff intends to review again and replace the rating information and the selection information that have once been set. In such a case, these items of information may be changed by operating again the rating icon 130 and the flag setting icon 131. However, the selection process is more efficiently achievable if the rating information and the selection information given to two images are switchable to each other.

A further processing example of the selection in step S3 in FIG. 2 will hereinafter be described with reference to a flowchart in FIG. 33 and screen examples in FIGS. 34, 35, and 36. The process of the flowchart in FIG. 33 is a process performed by the function of the UI control unit 31 in FIG. 4.

Figure 33:
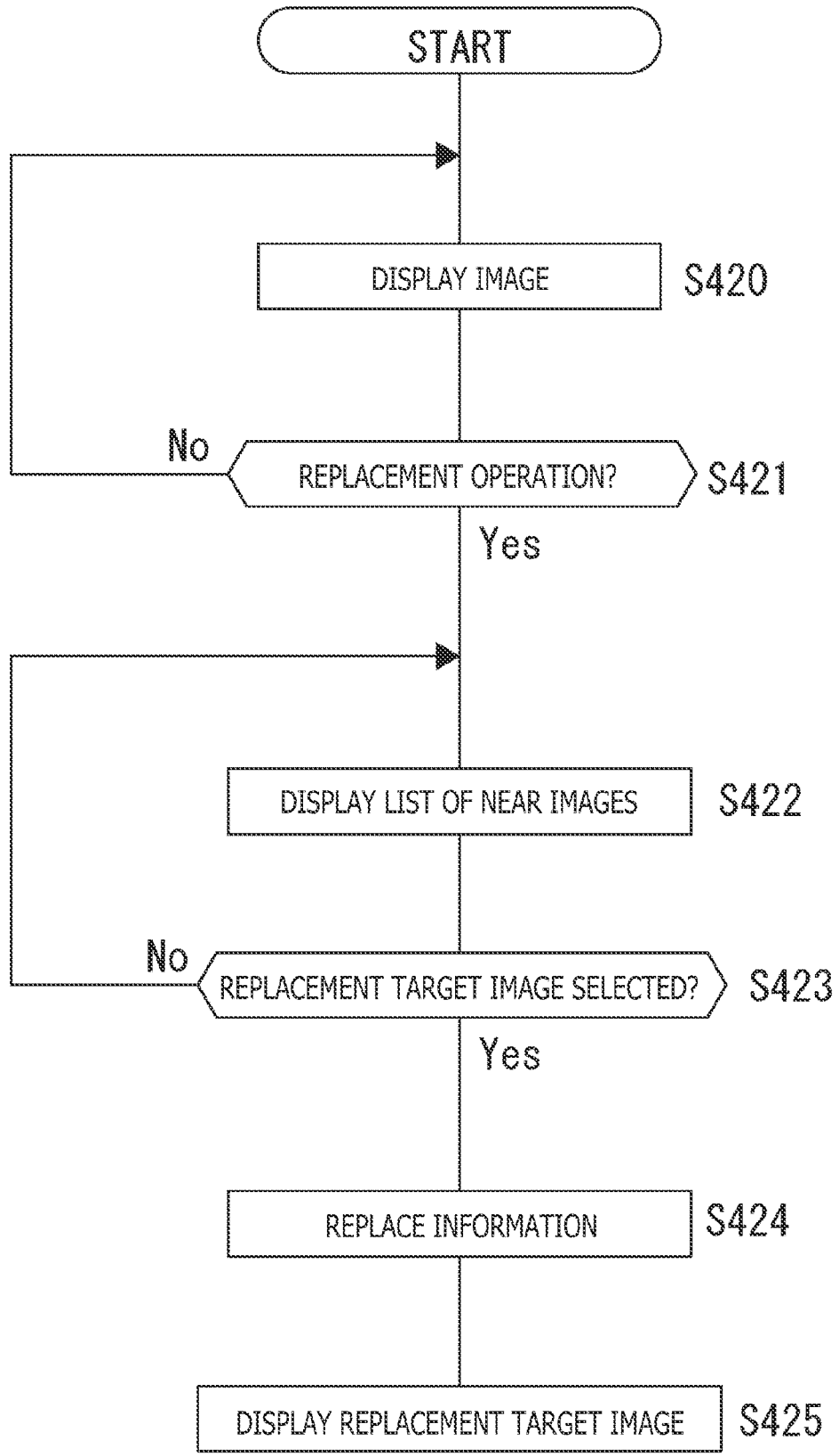
FIG. 33 is a flowchart of an information replacement process example of the embodiment.
Figure 34:
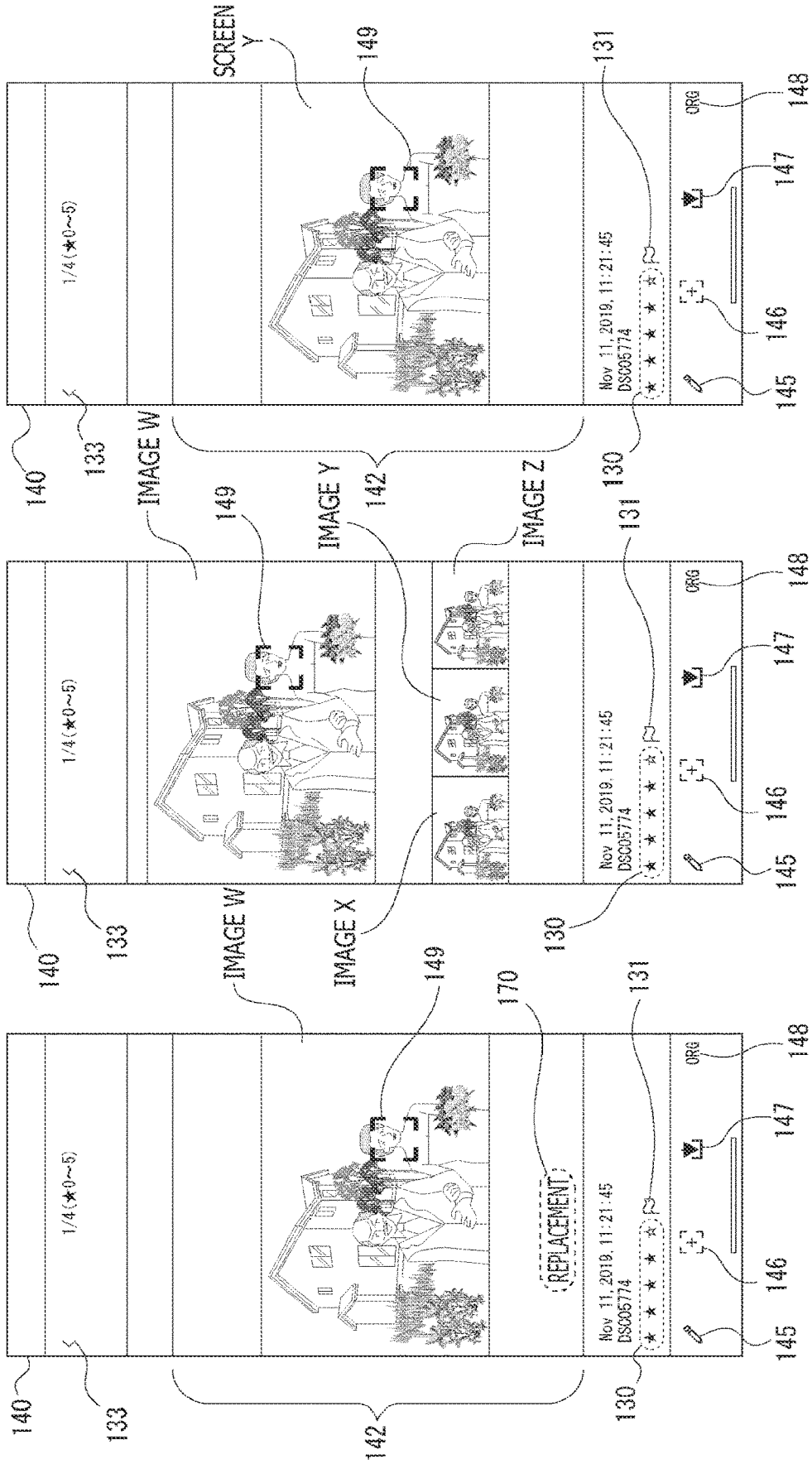
FIG. 34 depicts explanatory diagrams of a display example concerning information replacement of the embodiment.

Step S420 in FIG. 33 is a step performed by the staff terminal 1 to display the one display screen 140 as depicted in FIG. 34A. In FIG. 34A, parts identical to the corresponding parts in FIG. 21 are given identical numbers. However, a replacement icon 170 for issuing an instruction of replacement of information is newly added, and an image currently being displayed is designated as an image W. In step S421, the staff terminal 1 monitors an operation of the replacement icon 170. In a case of determination that the replacement icon 170 has been operated, the staff terminal 1 displays an image list containing images located near the currently displayed image, in step S422. The "near" images here may be images located nearby in terms of an imaging order, images located nearby in terms of a file name of image data, or images in an identical scene. FIG. 34B depicts a state where a list of an image X, an image Y, and an image Z is displayed below the image W as images near the image W.

In step S423, the staff terminal 1 monitors an operation for selecting an image from the image list. In a case where an image is selected from the list, the staff terminal 1 replaces information added to the original image with information indicating the selected image, in step S424, and displays the selected image in subsequent step S425. FIG. 34C depicts a state where the image Y is displayed with the rating information and the selection information associated with the original image W being replaced with the rating information and the selection information associated with the selected image Y according to selection of the image Y included in the near images in FIG. 34B.

Note that the processing in step S424 and the processing in step S425 may be switched, that is, step S425 may be performed before step S424.

The information replacement process in the foregoing example may be either a process for replacing both the rating information and the selection information, or may be a process for replacing only one of the rating information and the selection information. In such a case, an operation step for designating which information is to be replaced may be added.

FIG. 35 depicts conceptual diagrams illustrating a state where the rating information has been replaced. The rating information associated with the image W is "three stars," while the rating information associated with the image Y is "no star" as depicted in FIG. 35A. After the process of FIG. 33 corresponding to a replacement operation by the user, the rating information associated with the image W is replaced with "no star," and the rating information associated with the image Y is replaced with "three stars" as depicted in FIG. 35B.

FIG. 36 depicts conceptual diagrams illustrating a state where a flag corresponding to the selection information has been replaced. The image W is a flag-off image, while the image Y is a flag-on image as depicted in FIG. 36A. After the process of FIG. 33 corresponding to a replacement operation by the user, the image W is changed to a flag-on image, and the image Y is changed to a flag-off image as depicted in FIG. 36B.

6. Server Process

The process performed by the staff terminal 1 up to the selection stage in step S3 in FIG. 2 has been described. A process performed on the server device 4 side will be described here.

Figure 24:
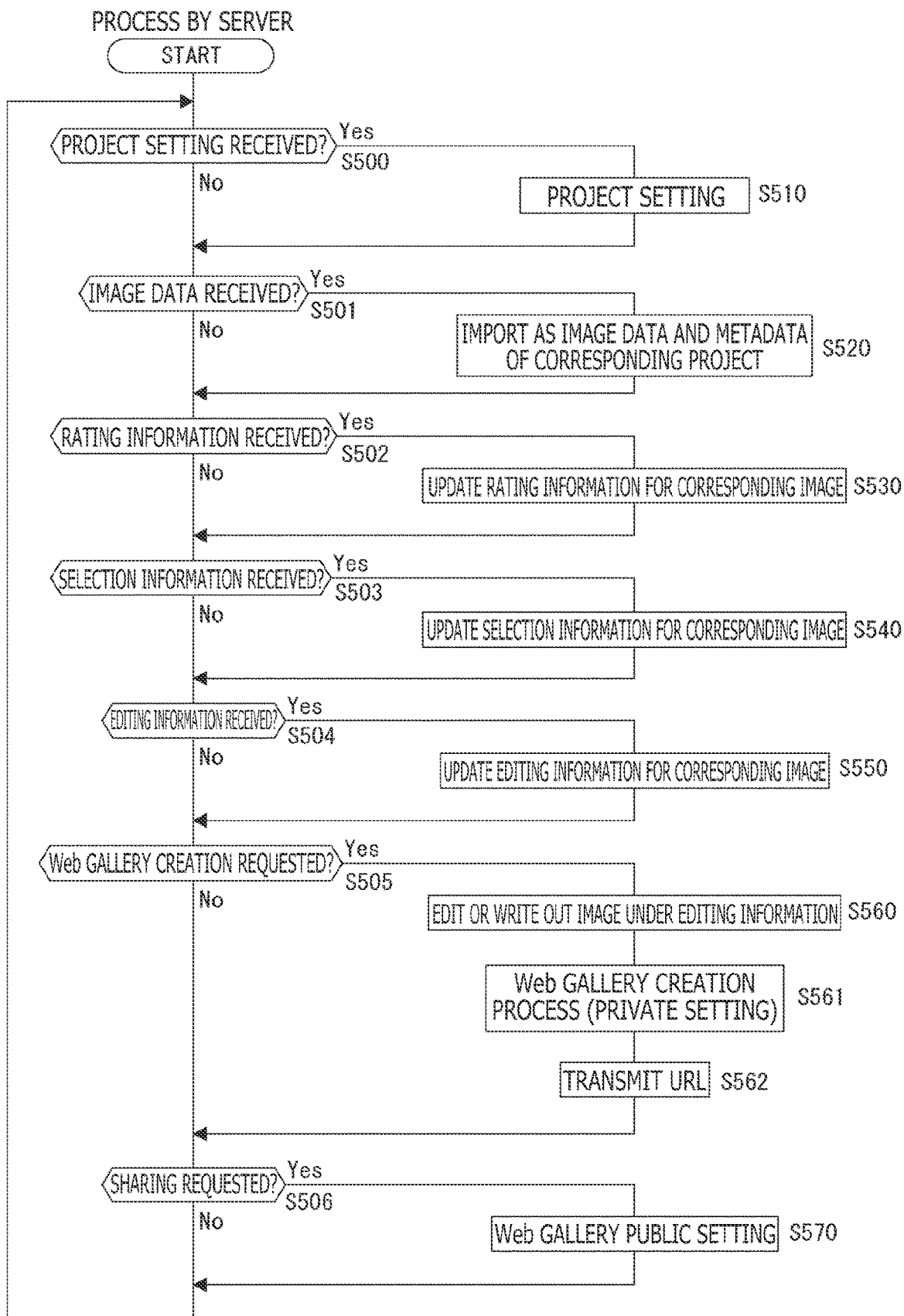
FIG. 24 is a flowchart of a process performed by the server device of the embodiment.

FIG. 24 presents a process performed by the server device 4 in correspondence with communication received from the staff terminal 1. Note that the process performed by the server device 4 described hereinafter refers to a process performed by the CPU 71 of the information processing device 10 having the functions depicted in FIG. 6. The process in FIG. 24 is a process executed mainly by the functions of the event data management unit 40 and the image collection creation unit 41.

In the stage of step S1 in FIG. 2, information indicating prior setting from the staff terminal 1 is transmitted to the server device 4.

When receiving information associated with project setting from the staff terminal 1, the server device 4 proceeds from step S500 to step S510 to perform a project setting process in the server device 4.

The communication for project setting received from the staff terminal 1 refers to communication provided for the server by the processing performed by the staff terminal 1 from step S10 to step S13 in FIG. 9. For example, information indicating an event name, time and date, a place, and the like of a created project is transmitted. The server device 4 sets a new project in reference to these items of information, and sets the event data 90 of the new project.

Moreover, the staff terminal 1 side provides not only the setting of the project itself, but also auto-retouch setting, water mark setting, and the like, and sequentially transmits the setting information to the server device 4. The server device 4 describes these items of information as prior setting information 91 included in the event data 90, to synchronize the event data 60 with the event data 60 in the prior setting state.

In the stage of step S2 in FIG. 2, images transferred from the imaging device 2, metadata containing rating information, and the like are transmitted to the server device 4 by the processing performed by the staff terminal 1 in step S105 in FIG. 11.

When receiving the images and the metadata from the staff terminal 1, the server device 4 proceeds from step S501 to step S520 in FIG. 24 to import the images and the metadata as information associated with the event data 90 of the corresponding project. The rating information contained in the metadata is extracted from the metadata, and managed in the event data 90 in a later updatable state.

In the stage of step S3 in FIG. 2, various types of information for maintaining synchronization with the imaging device 2 is transmitted from the staff terminal 1 to the server device 4 in the course of the processing of the staff terminal 1 from FIG. 12 to FIG. 17.

When receiving rating information from the staff terminal 1, the server device 4 proceeds from step S502 to step S530 in FIG. 24 to update rating information associated with corresponding images in the event data 90 of the corresponding project.

When receiving selection information from the staff terminal 1, the server device 4 proceeds from step S503 to step S540 to update selection information associated with the corresponding images in the event data 90 of the corresponding project.

Specifically, use image information provided by flag setting, cover image information indicating a cover, emphasis display image information provided by highlight setting, and the like are sequentially updated also on the server device 4 side.

When receiving editing information from the staff terminal 1, the server device 4 proceeds from step S504 to step S550 to update editing information associated with the corresponding images in the event data 90 of the corresponding project.

When receiving web gallery editing information from the staff terminal 1, the server device 4 proceeds from step S505 to step S560. This information is information transmitted from the staff terminal 1 in step S343 in FIG. 17.

In step S560 in FIG. 24, the server device 4 first performs an image editing process using parameters as editing information (containing editing information provided by the prior setting information 61) for the respective images designated as flag-on images as use image information to write out images for a web gallery. Specifically, respective editing images to be stored in the image folder 97 in FIG. 8 are formed.

In step S561 in FIG. 24, the server device 4 performs a web gallery creation process. Specifically, for example, the server device 4 generates the web page setting information 96 in FIG. 8 as HTML data or the like, and enters the web page setting information 96 as a web page. As a result, a web gallery is created.

In step S562 in FIG. 24, the server device 4 transmits a URL (uniform resource locator) of the corresponding web gallery to the staff terminal 1. As a result, the staff terminal 1 is enabled to browse the web gallery.

Note that the web gallery is still in a state of private setting at this time. Only the staff terminal 1 corresponding to the URL transmission destination is in a browsable state.

The process described above is the process performed by the server device 4 in correspondence with the process performed by the staff terminal 1 up to step S3 in FIG. 2.

While not depicted in FIG. 24, the server device 4 performs a process for providing the event data 90 to the staff terminal 1 having logged in to the server device 4, as necessary (see description of step S201 in FIG. 12).

After the web gallery is created, a sharing request is transmitted from the staff terminal 1 to the server device 4 as the stage in step S4 in FIG. 2 (described below with reference to FIG. 25).

In that case, the staff terminal 1 proceeds from step 3506 to step S570 in FIG. 24 to provide public setting for the corresponding web gallery. For example, the client terminal 5 is also enabled to browse the web gallery.

7. Web Gallery Delivery Process

Described with reference to FIG. 25 will be a process performed by the staff terminal 1 in the stage of the web gallery delivery process in step S4 in FIG. 2.

When a web gallery creation request is transmitted to the server device 4 as described above, a web gallery is created by the server device 4 in reference to the event data 90. Thereafter, a URL of a web page of this web gallery is transmitted. FIG. 25 presents a process performed by the staff terminal 1 after acquisition of the URL.

The staff terminal 1 accesses the web page by using the URL acquired in step S350. As a result, the staff terminal 1 is enabled to browse a preview of the web gallery.

Figure 26:
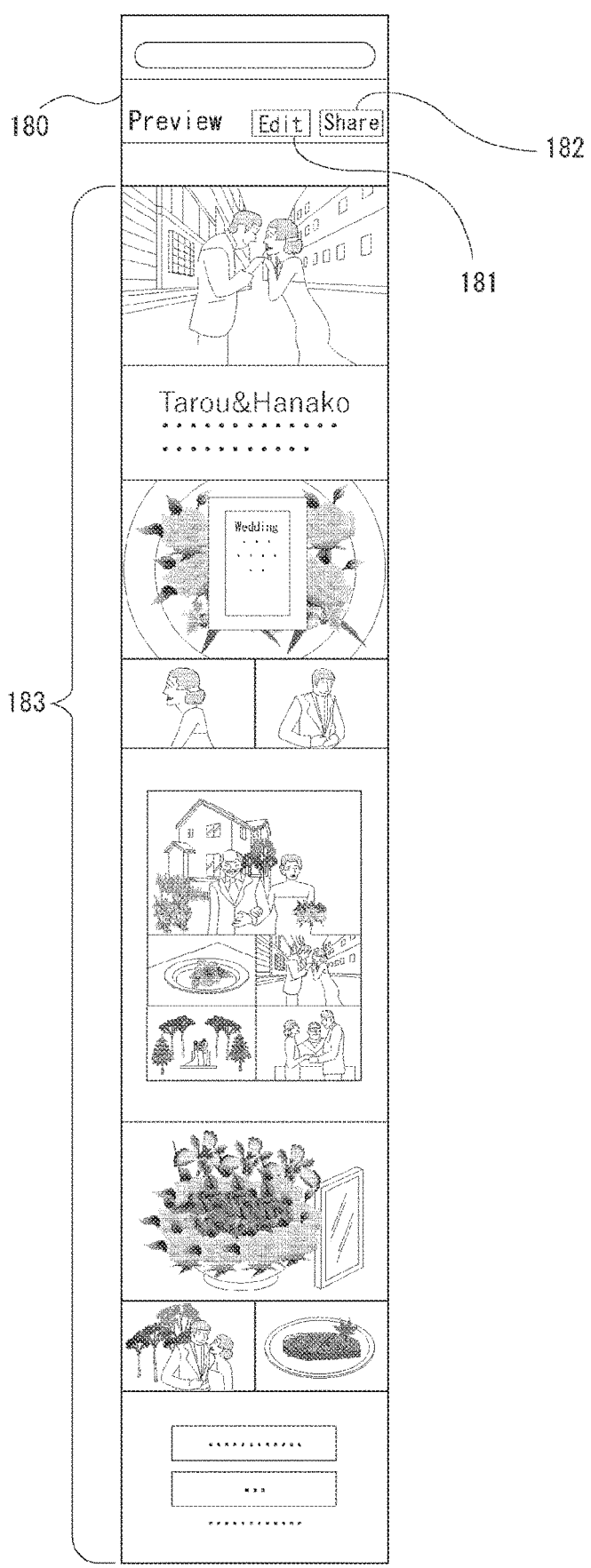
FIG. 26 is an explanatory diagram of a preview screen of a web gallery of the embodiment.

This is browsing for a preview by the camera staff for checking. A preview screen 180 in FIG. 26 is an example of a web gallery for this previewing.

For example, a web gallery created in a preview region 183 is displayed, and an edit button 181 and a share button 182 are provided.

Web gallery contents displayed in the preview region 183, i.e., the web gallery created by the server device 4, are configured such that images for which flag-on has been set are arranged in time series, for example. Moreover, an image for which cover image information has been set is displayed at the top as a cover. Further, an image for which highlight setting has been made according to emphasis display image information is displayed in a size larger than the size of images for which highlight setting is not made. Note that even each image for which highlight setting is not made may be automatically arranged in a large size. This arrangement is made for a purpose of balancing or sharpening the entire gallery.

Figure 25:
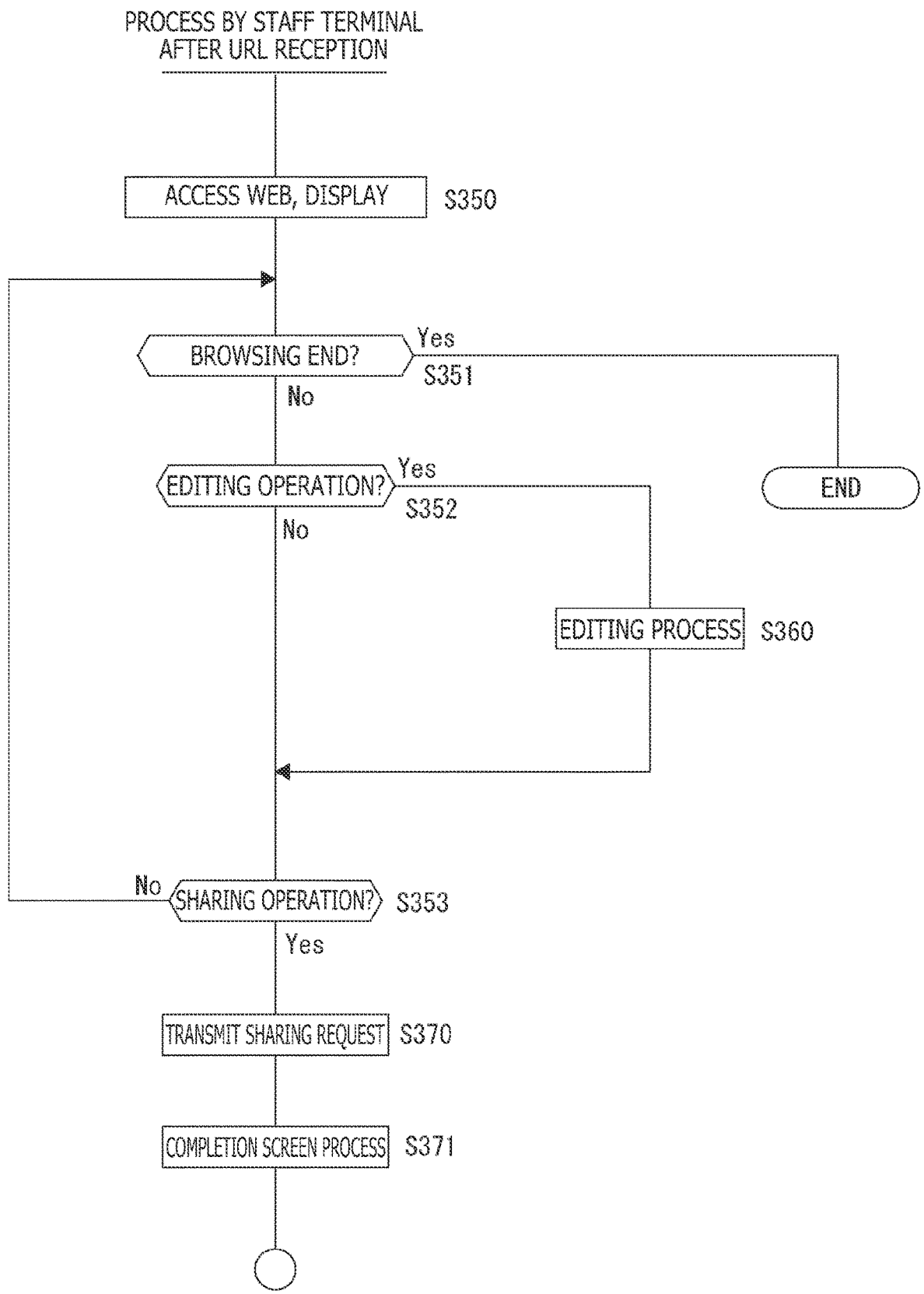
FIG. 25 is a flowchart of a process performed after URL reception by the terminal device of the embodiment.

The staff terminal 1 monitors a browsing end operation in step S351 in FIG. 25, monitors an operation of the edit button 181 in step S352, and monitors an operation of the share button 182 in step S353.

At the time of detection of the browsing end operation, browsing of the web page is ended.

When detecting the operation of the edit button 181, the staff terminal 1 proceeds to step S360 to perform an editing process.

The camera staff checks the web gallery contents in the preview region 183, and operates the edit button 181 as necessary to further edit the web gallery.

The staff terminal 1 displays an interface image for editing in the editing process in step S360, to receive an operation by the camera staff and edit the preview image according to the received operation. For example, a background color, a title font, a title color, a title position, music for a slideshow, and the like are editable.

Thereafter, editing information is transmitted to the server device 4 according to an editing completion operation to reflect the editing operation in the web gallery.

After completing the editing operation, the camera staff operates the share button 182 as necessary. In this case, the staff terminal 1 proceeds to step S370 to transmit a share request to the server device 4. As described above, the server device 4 provides public setting for the web gallery in response to the share request in step S570 in FIG. 24.

The staff terminal 1 performs a process corresponding to screen display and a screen operation of delivery completion of the web gallery in step S371 in FIG. 25.

Figure 27:
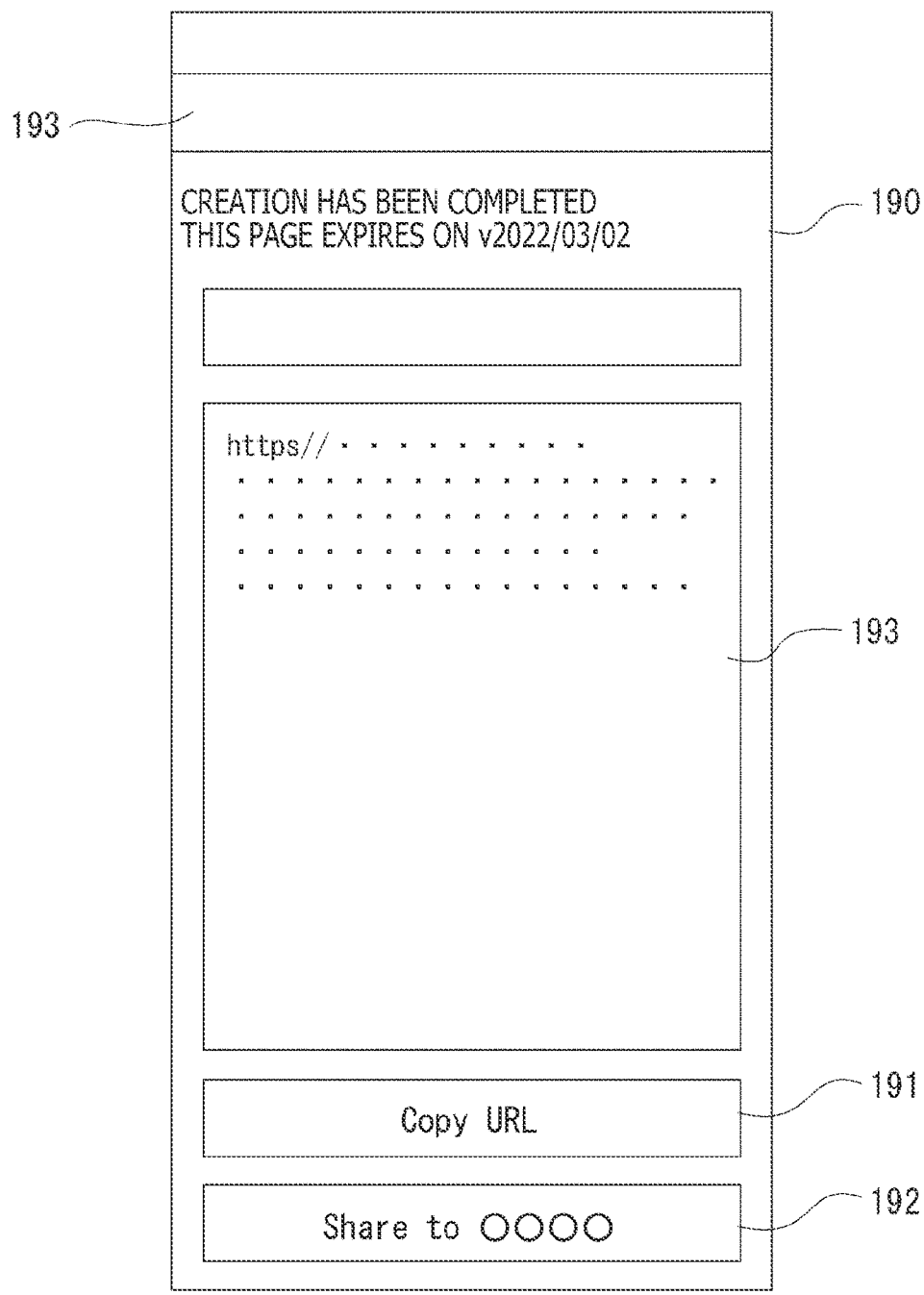
FIG. 27 is an explanatory diagram of a web gallery delivery screen of the embodiment.

For example, the staff terminal 1 displays a web gallery delivery screen 190 in FIG. 27. A notification of creation completion of the web gallery, an expiration date, and further, a URL 193 of the web gallery are displayed in the web gallery delivery screen 190. Moreover, a copy button 191 and a share button 192 are displayed.

The camera staff operates the copy button 191 to copy the URL, and transmits the URL to the client terminal 5 by attaching the URL to an e-mail or the like. Moreover, the camera staff operates the share button 192 to provide the URL for social media or the like and allow the client to browse the web gallery via the social media.

As a result, the client is enabled to browse the web gallery at an extremely early time point such as the current day after the end of the wedding.

Note that distribution of a URL to the client to allow browsing of an image collection as a web gallery is presented only by way of example. For example, image collection content corresponding to the above web gallery may be created, and distributed to the client as a content file.

8. Regular Delivery Process

A regular delivery process is performed in the stage of step S5 in FIG. 2.

Figure 28:
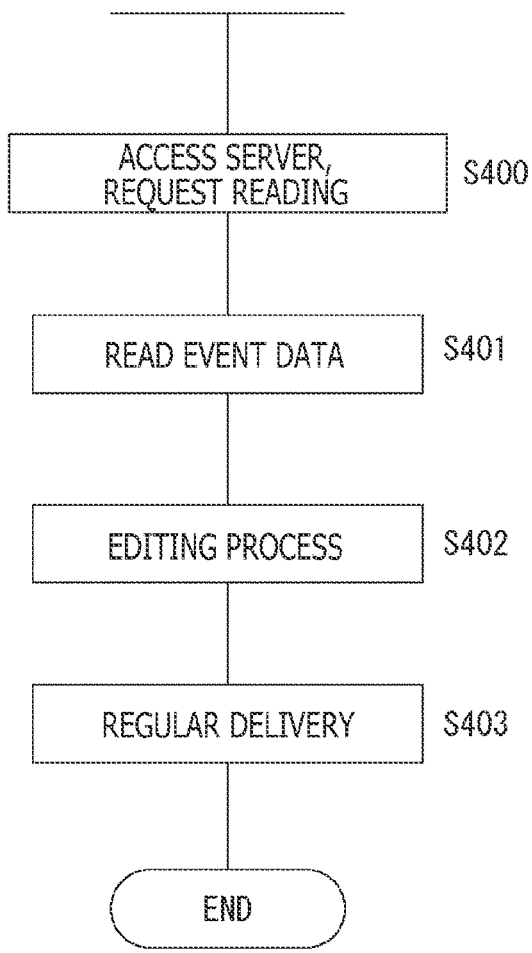
FIG. 28 is a flowchart of a regular delivery process performed by the terminal device of the embodiment.

FIG. 28 depicts a process of the regular delivery stage. This is a process performed by the personal computer 3 or the staff terminal 1, for example. Hereinafter described will be a process performed by the personal computer 3.

The camera staff performs an operation by using the personal computer 3 to access the server device 4 and issue an information reading request for regular delivery in step S400.

Thereafter, the event data 90 is acquired from the server device 4 in step S401.

In this case, for example, the server device 4 may download rating information, selection information, or editing information as an XMP file, to apply the XMP file to a RAW image file in the personal computer 3.

Specifically, the rating information, use image information which indicates flag setting, cover image information which indicates designation as a cover image, emphasis display image information which indicates highlight setting, and the like are transferred to the personal computer 3.

Note that every event data 90 may be provided to the personal computer 3.

The camera staff imports the RAW image data that is image data captured by the imaging device 2 to the personal computer 3, and creates an image collection for regular delivery by using this RAW image data. In this case, creation work is efficiently achievable by acquisition of an XMP file based on the event data 90 from the server device 4.

The personal computer 3 performs a necessary editing process in step S402 to complete the image collection for regular delivery.

Subsequently, a process for regular delivery is performed in step S403. For example, processing to be performed includes creating content data corresponding to image collection content and electronically transmitting the created content data, recording the content data in a recording medium, or printing the content data to generate printing data.

Thereafter, the image collection including the created content data, the recording medium in which the content data is recorded, or the printed paper medium is delivered to the client.

9. Automatic Setting Process

A series of processes from prior setting to regular delivery has been described above. Described here will be an automatic setting process capable of further increasing efficiency of the selection in FIG. 2 as a modified example.

Figure 29:
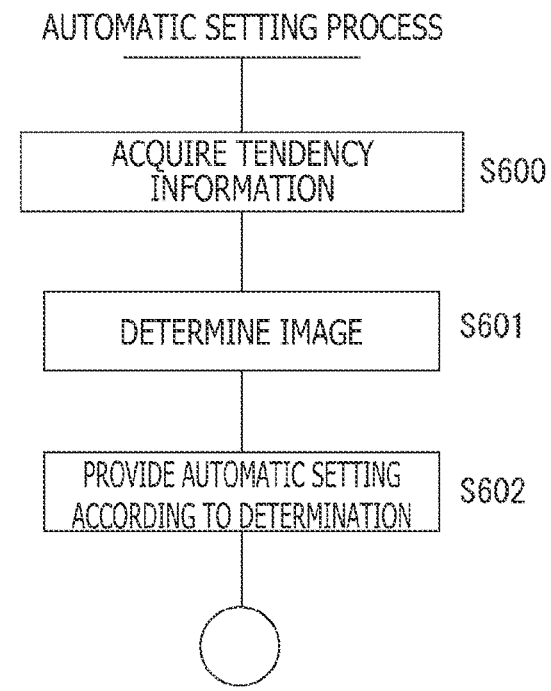
FIG. 29 is a flowchart of an automatic setting process performed by the terminal device of the embodiment.

FIG. 29 depicts an example of a process which automatically sets selection information by using the function of the automatic setting unit 33 in FIG. 4, in reference to tendency information generated according to previous selection information indicating selection by the camera staff who is a user of the staff terminal 1.

For example, the server device 4 manages the event data 90 associated with multiple projects of a certain camera staff. In this case, the server device 4 can generate tendency information indicating a selection tendency of this camera staff by performing a learning process for the event data 90 associated with the camera staff, with the function of the tendency information generation unit 44 in FIG. 6.

For example, the machine learning generates tendency information containing characteristic information associated with flag-on setting images, characteristic information associated with highlight setting images, characteristic information associated with a cover setting image, and the like by using learning data including the flag-on setting images, the highlight setting images, the cover setting image, and the like.

The staff terminal 1 side performs a process in FIG. 29 at a timing for displaying the event screen 120 in step S211 or other steps in FIG. 13 or at a timing before that timing, for example.

In step S600, the staff terminal 1 acquires the tendency information associated with this camera staff and generated by the server device 4.

In step S601, the staff terminal 1 makes determination for each of the images transferred from the imaging device 2, in reference to the tendency information, to determine whether each of the images has a characteristic of flag-on setting, a characteristic of highlight setting, a characteristic of cover setting, or the like.

In step S602, the staff terminal 1 automatically provides flag setting, highlight setting, or cover setting for each of the images according to a result of the above determination.

The camera staff is allowed to perform the selection operation described in FIGS. 13 to 17 in the state of the automatic setting described above. As a result, efficiency of the work performed by the camera staff is likely to improve.

Note that the foregoing process is also applicable to rating to achieve automatic rating information setting. Specifically, the server device 4 analyzes images of each rating level by using the event data 90 of previous projects of the camera staff with the function of the tendency information generation unit 44, to generate characteristic information associated with "no-star" images, characteristic information associated with "one-star" images, characteristic information associated with "two-star" images, characteristic information associated with "three-star" images, characteristic information associated with "four-star" images, and characteristic information associated with "five-star" images. Needless to say, it is also possible to generate only characteristic information associated with "five-star" images, for example, rather than generate all of these information.

Thereafter, the staff terminal 1 acquires tendency information containing the above information, and determines agreement with the characteristic information associated with the respective images to automatically set rating information for all or some of the images.

This automatic setting can also increase efficiency of the operation performed at the time of selection by the camera staff.

Figure 30:
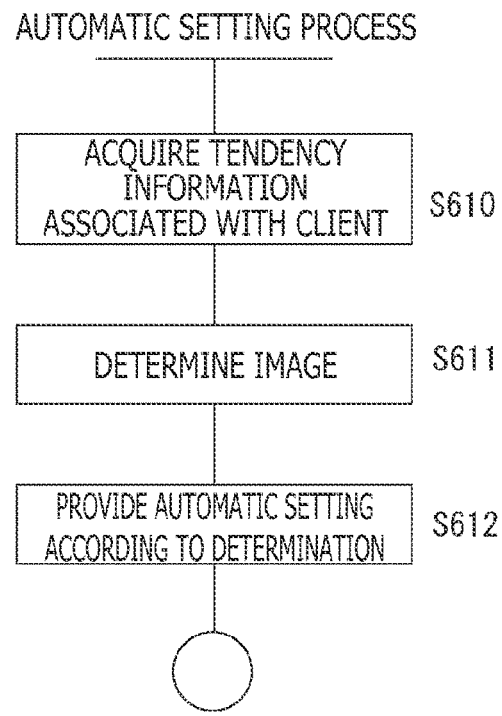
FIG. 30 is a flowchart of the automatic setting process performed by the terminal device of the embodiment.

Next, FIG. 30 depicts an example where the staff terminal 1 performs a process for automatically setting selection information by using the function of the automatic setting unit 33, in reference to tendency information generated according to preference of the client user.

For example, the server device 4 determines preference from previous behaviors of the client (the bride who has ordered the image collection), and sets tendency information beforehand. For example, a tendency of preferred images is determined from behaviors of the client on social media (e.g., giving "like" to an image), images posted by the client on social media, and the like, and the tendency information is set according to this determination.

The staff terminal 1 side performs the process in FIG. 30 at a timing for displaying the event screen 120 in step S211 or other steps in FIG. 13 or at a timing before that timing, for example.

In step S610, the staff terminal 1 acquires the tendency information associated with the client of this project (e.g., bride) and generated by the server device 4.

In step S611, the staff terminal 1 makes determination for each of the images transferred from the imaging device 2, in reference to the tendency information, to determine whether each of the images has a characteristic agreeing with the preference of the client.

In step S612, the staff terminal 1 automatically provides flag setting for each of the images according to a result of the above determination. Specifically, images agreeing with the preference of the client are included the web gallery. Needless to say, highlight setting and cover setting may be provided.

The camera staff is allowed to perform the selection operation described in FIGS. 13 to 17 in the state of the automatic setting described above. As a result, it becomes more likely that efficiency of the work performed by the camera staff is increased and an image collection increasing satisfaction of the client is created.

Note that the foregoing process is also applicable to rating to achieve automatic rating information setting. Specifically, the server device 4 generates tendency information containing characteristic information associated with preferred images of the client, by using the function of the tendency information generation unit 44.

The staff terminal 1 acquires tendency information containing such characteristic information, and determines agreement with characteristic information associated with the respective images, to automatically set rating information.

This automatic setting of the rating information can also increase not only efficiency of the operation performed at the time of selection by the camera staff, but also satisfaction of the client.

10. Selection Speedup Assistance Process

Various types of further processing examples of the embodiment will hereinafter be described.

Assuming that an image collection is created using images captured during a wedding ceremony, a wedding reception, or the like as described above, for example, the photographer may take several thousand to ten thousand or more pictures in one day of an event related to marriage.

Selection according to rating is adopted as an effective method for selecting pictures to be included in the image collection for the web gallery or regular delivery described above from an enormous number of images thus captured.

As described above, rating information is managed in association with images. For example, this rating information is evaluation information at six levels ranging from "no star" to "five stars," and set by the camera staff in reference to evaluations given to the respective images.

FIG. 37A depicts a state where rating information indicating "three stars" has been given to a certain image.

For example, the camera staff can extract high evaluation images and select images to be included in the image collection from the extracted images by viewing and evaluating all captured images and setting rating information according to evaluations. Accordingly, rating information is effective in view of selection of images to be included in the image collection from a large number of images.

For example, FIG. 37B depicts an example of a case where images are extracted on a condition that the rating information indicates "three stars or more." In this case, only high-evaluation images corresponding to three stars or more are extracted. Accordingly, the camera staff can select images to be included in the image collection from the extracted images. This selection is extremely efficient in comparison with selection of images to be included in the image collection from all the captured images.

However, this method requires setting of rating information for all the captured images, and hence may be time-consuming and troublesome work in that regard.

Moreover, criteria of evaluation for rating may vary depending on time, or a difference in evaluation such as a generous evaluation and a harsh evaluation may be produced by the camera staff. It is thus also difficult to evaluate all the images by uniform criteria.

According to the processing example described hereinafter, therefore, in a case where an image group including multiple images captured during an event related to marriage is a processing target, the respective images are evaluated efficiently by uniform criteria to the extent possible, and also rating information itself is set efficiently. Moreover, also assumed depending on situations is such a case where setting of the rating information is not required for every image.

For this purpose, image extraction is achieved using scene analysis results for the respective images and metadata added by the imaging device 2.

For example, icons corresponding to the scene analysis results are provided to extract images meeting an extraction condition by an operation using the icon corresponding to this condition, and to set rating information for the extracted images.

Consequently, assistance for speeding up image selection by the camera staff is achieved.

Note that allowing rating setting for the extracted images is presented only by way of example. A process for selecting images to be included in the image collection from the extracted images may be adopted.

Specifically, an extraction process using icons in reference to scene analysis or the like as described later will be presented as image extraction for rating setting. However, this extraction process is not necessarily limited to the process aimed at rating setting.

Moreover, the event related to marriage is a wedding ceremony, a wedding reception, a wedding after party, an engagement ceremony, a meeting, a matchmaking, or the like, for example, and refers to an event in which multiple persons including a bridal pair participate. Setting appropriate extraction conditions is enabled as selection speedup assistance specialized for these types of events.

An example of main processing will be described with reference to FIG. 38A, FIG. 38B, and FIG. 38C.

A process performed for achieving selection speedup according to scene analysis or the like basically analyzes captured images, sets an extraction condition, and extracts images with reference to a scene analysis result or the like according to the extraction condition.

Such a process can be executed using any one of the imaging device 2, the staff terminal 1, and the server device 4 depicted in FIG. 1.

FIG. 38A depicts a case where the imaging device 2 executes this process.

For example, the imaging device 2 is capable of displaying images, icons, and others on a display unit 2a. Moreover, various types of operators are provided.

The imaging device 2 thus configured performs an analysis process for each of images of an image group captured and recorded at a certain event, to obtain analysis result data. The imaging device 2 further determines whether each of the images meets an extraction condition by using analysis result data according to an extraction operation, and displays extracted images corresponding to a result of the determination on the display unit 2a. The camera staff is allowed to provide rating setting and the like for the extracted images.

Note that the server device 4 may receive the respective images captured by and transmitted from the imaging device 2, analyze the respective images of the image group, and transmit analysis result data to the imaging device 2. In this case, the imaging device 2 may similarly extract images by using analysis result data according to an extraction operation performed by the camera staff, and display the extracted images corresponding to a result of the extraction on the display unit 2a.

FIG. 38B depicts a case where the staff terminal 1 executes the selection speedup assistance process described above.

Images captured by the imaging device 2 are transferred to the staff terminal 1. For example, the staff terminal 1 transmits the respective images of the image group received from the imaging device 2 to the server device 4 in a cloud 7 as reduced images. The server device 4 analyzes the respective images of the image group, and transmits analysis result data to the staff terminal 1. The staff terminal 1 is allowed to extract images by using the analysis result data according to an extraction operation performed by the camera staff, and display the extracted images on a display unit 1a.

Note that image analysis may be performed in the staff terminal 1. Specifically, the staff terminal 1 analyzes the respective images of the image group received from the imaging device 2, and obtains analysis result data. The staff terminal 1 further extracts images by using the analysis result data according to a designation operation performed by the camera staff for designating an extraction condition, and displays the extracted images on the display unit 1a.

FIG. 38C depicts a case where the server device 4 in the cloud 7 executes the process described above.

Images captured by the imaging device 2 are transmitted to the server device 4. The server device 4 analyzes the respective image of the image group received from the imaging device 2, and obtains analysis result data. Thereafter, the server device 4 provides an interface for the staff terminal 1 by using a browser, an application program, or others, for example.

On the staff terminal 1 side, the camera staff is allowed to perform an extraction operation for a web page screen or the like viewed using a browser. The server device 4 extracts images by using analysis result data according to this extraction operation, and supplies the extracted images corresponding to a result of the extraction to the display unit 1a of the staff terminal 1 via a browser or the like.

Note that the images captured by the imaging device 2 may temporarily be transferred to the staff terminal 1, and transmitted from the staff terminal 1 to the server device 4. Thereafter, the server device 4 may analyze the images and provide an interface via a browser or the like.

Moreover, if the imaging device 2 has a web browsing function or the like, the camera staff is allowed to designate the extraction condition or browse the extracted images by using the imaging device 2.

In any of the foregoing cases, the camera staff can obtain an image extraction result for achieving selection speedup. Such a selection speedup assistance process can assist work for rating setting provided by the camera staff for a large number of images and work for selecting images included in an image collection.

The configuration example of the information processing device 10 constituting the staff terminal 1 or the server device 4 has been described with reference to FIG. 3. Moreover, the imaging device 2 which includes built-in components such as a microcomputer also has a configuration constituting the information processing device 10 in FIG. 3.

In addition, the process for achieving selection speedup is implemented by the CPU 71 in FIG. 3 having functions depicted in FIG. 39A, for example.

FIG. 39A depicts the UI control unit 31, an extraction processing unit 34, a rating information management unit 35, an analysis result data reception unit 36, an analysis unit 37, and a video editing unit 38 as the functions included in the CPU 71 of the information processing device 10 constituting the imaging device 2, the staff terminal 1, or the server device 4.

For performing the selection speedup assistance process, at least the UI control unit 31 and the extraction processing unit 34 are provided, and either only the analysis result data reception unit 36 or the analysis unit 37 is required to be provided.

As described with reference to FIG. 4, the UI control unit 31 is a function of performing a process for controlling presentation of images, rating information, and the like, and detecting operation input.

Particularly concerning the selection speedup process, the UI control unit 31 performs a UI process for enabling designation of an extraction condition allowing classification of an image group including multiple images captured during an event related to marriage. Specifically, the UI control unit 31 also performs a process for displaying icons described later, detecting operations corresponding to the icons, and others.

The extraction processing unit 34 is a function of extracting one or multiple images from an image group associated with a certain event, according to a designated extraction condition.

For example, the extraction processing unit 34 extracts images with reference to analysis result data of the images according to an extraction condition designated by an icon. Various types of specific examples will be described later.

The rating information management unit 35 is a function of performing a process for updating rating information associated with extracted images in a case where rating is set for the extracted images. In the case of the staff terminal 1, the rating information management unit 35 may also be included in the function of the event data management unit 30 described with reference to FIG. 4.

The analysis result data reception unit 36 is a function of receiving analysis result data.

The analysis unit 37 is a function of analyzing respective images and generating analysis result data.

Either only the analysis result data reception unit 36 or the analysis unit 37 is required to be provided.

For example, in a case where the selection speedup process is performed using only the imaging device 2 as depicted in FIG. 38A, the CPU 71 of the imaging device 2 obtains analysis result data by using the analysis unit 37. In this case, the function of the analysis result data reception unit 36 is unnecessary.

Moreover, in a case where the imaging device 2 which causes the server device 4 to execute analysis and receives analysis result data from the server device 4, for example, the CPU 71 of the imaging device 2 is not required to have the function of the analysis unit 37 and is only required to have the function of the analysis result data reception unit 36.

In that case, the CPU 71 of the server device 4 includes the analysis unit 37 as depicted in FIG. 39B.

Further, in a case where the staff terminal 1 receives analysis result data from the server device 4 as depicted in FIG. 38B, the CPU 71 of the staff terminal 1 is not required to have the function of the analysis unit 37 and is only required to have the function of the analysis result data reception unit 36. In that case, the CPU 71 of the server device 4 includes the analysis unit 37 as depicted in FIG. 39B.

In addition, in a case where image analysis is performed in the staff terminal 1, the CPU 71 of the staff terminal 1 has the function of the analysis unit 37. The analysis result data reception unit 36 is unnecessary.

In a case where the server device 4 performs image analysis, the UI process via a browser or the like, and the extraction process as depicted in FIG. 38C, the analysis result data reception unit 36 is unnecessary.

The video editing unit 38 has a function of performing an editing process particularly for an extracted video. This is a function provided in a case where a highlight video is created as will be described later.

Scene analysis performed by the analysis unit 37 will be described.

The analysis unit 37 analyzes images captured by the camera staff or the like, to recognize scenes and persons.

Machine learning is a typical method employed for this purpose.

For example, images are analyzed by machine learning to acquire the following items of information associated with a person or an object (scene).

person information
    gender determination, face information, eye closing information, face size in screen, type of emotion, smile, facial expression, and others
scene information
    cake, bridegroom, bride, bouquet, church, and others FIG. 40A depicts an example where a certain image is analyzed, and determined to contain an object recognized as a "bouquet" as a result of the analysis. A recognition rate is a value of reliability of an analysis result.

FIG. 40B depicts an example where a certain image is analyzed, and determined to contain persons recognized as a "bride" and a "bridegroom" and an object recognized as a "cake" as a result of the analysis.

Analysis result data indicating that the image contains the "bouquet" and analysis result data indicating that the image contains the "bride," the "bridegroom," and the "cake" are associated with the corresponding images as results obtained by the foregoing image analysis.

Thereafter, image extraction is achieved with reference to such pieces of analysis result data.

For example, in a case where an extraction condition indicating the "bouquet" is designated by the user, the image associated with the "bouquet" as the analysis result data is extracted.

Specifically, the user is allowed to selectively browse images in a desired scene by having images extracted on an AND condition or an OR condition with use of information designated as the analysis result data. Accordingly, rating setting and selection of images to be included in the image collection can be achieved for the images in the desired scene without the necessity of viewing all the captured images. Consequently, efficiency of selection work performed by the camera staff improves.

FIG. 41A and FIG. 41B depict specific examples of this method.

FIG. 41A depicts an example of display on the display unit 1a of the staff terminal 1 or the display unit 2a of the imaging device 2, for example.

An icon region 200 is set for the display unit 1a (or 2a) in addition to the image region 128. For example, a list of images of an image group corresponding to a processing target, i.e., a series of images captured at a certain wedding event, is displayed in the image region 128 in a state prior to extraction.

Icons IC each designating an extraction condition for extracting a desired scene or a desired person from such a list of images are displayed in the icon region 200.

While details will be described later, each of the icons IC can designate an extraction condition with reference to analysis result data of each of the images included in the foregoing image group.

The user such as the camera staff can designate an extraction condition by designating any of the icons IC. For example, when an icon indicating the "bride" is designated, the "bride" becomes an extraction condition. In this case, images containing the bride are extracted.

Moreover, as depicted in FIG. 41B, the user may also freely designate multiple icons IC to set an extraction condition such as an extraction expression containing what is generally called an AND condition, what is generally called an OR condition, or the like.

For example, in a case where an image containing a cake cut scene is desired to be extracted, the user performs an operation for designating the icons IC indicating the "bride," the "bridegroom," and the "cake" as AND conditions.

In addition, in a case where a scene containing an impressive close-up of the bride is desired to be extracted, the user performs an operation for designating the icons IC indicating the "bride," a "single object," a "close-up (up)," and the "bouquet," or the icon IC indicating "time designation" for designating a particular time zone, for example, to easily narrow down desired images.

An example of a selection speedup assistance process for extracting images by using the foregoing method will be described. It is assumed in the following example that image extraction is executed according to an operation performed in reference to the icon IC after image analysis, and that the user sets rating for the extracted image.

Accordingly, the selection speedup assistance in this case achieves efficiency improvement of rating setting. However, as described above, the selection speedup assistance process is not limited to a process applied to efficient improvement of rating setting.

For example, the selection speedup assistance process may be executed to select images posted on a web gallery, select cover images and highlight images, and select images desired to be edited as described above. Accordingly, a rating setting process performed in each of following processes may be replaceable with a process for selecting these images.

Figure 42:
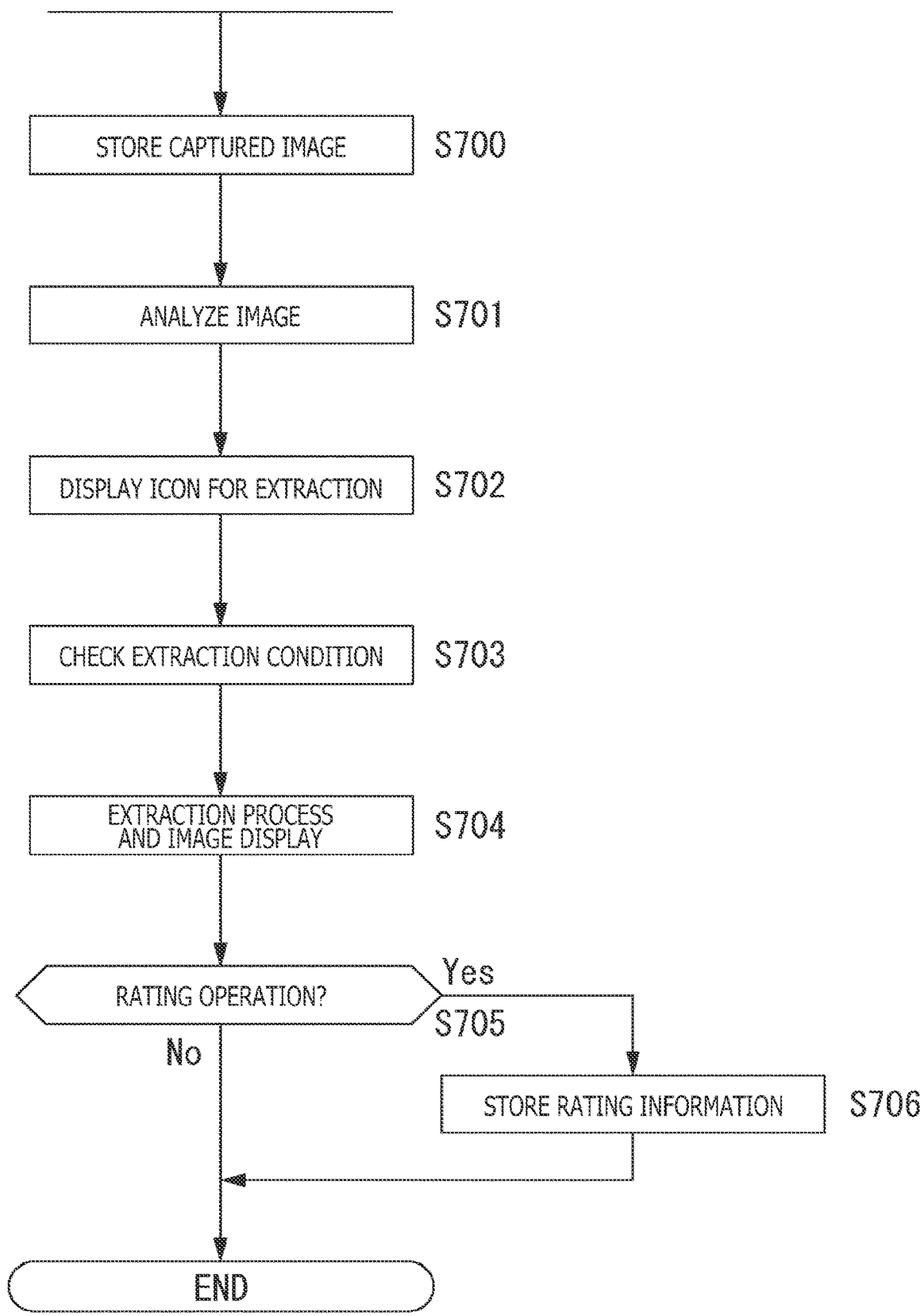
FIG. 42 is a flowchart illustrating an example of processing performed by an imaging device of the embodiment.

FIG. 42 presents an example where the imaging device 2 performs the selection speedup assistance process as described in FIG. 38A.

In step S700, the CPU 71 of the imaging device 2 stores image data obtained by imaging. This process inclusively represents a process for sequentially storing the captured image data in the storage unit 79 disposed inside. A large number of images are stored in the storage unit 79 by a series of imaging processes performed by the photographer.

In step S701, the CPU 71 analyzes each of the stored images. As described above, person information and scene information are obtained by analysis of the respective images, and analysis result data is generated with reference to these items of information. The analysis result data is recorded as information associated with the images, i.e., metadata.

This image analysis process may be sequentially executed every time one image is captured, or regularly performed for newly captured images. Alternatively, the image analysis process may collectively be executed for the stored images when the photographer performs a predetermined operation, such as an operation for executing image extraction.

In step S702, the CPU 71 displays the icons IC in the icon region 200 of the display unit 2a.

Types of the displayed icons IC may be those set beforehand for the event related to marriage. For example, icons such as the "bride," the "bridegroom," the "cake," and the "bouquet" are prepared.

Moreover, the icons IC thus prepared are preferably selected and displayed in reference to analysis result data rather than being displayed in a fixed manner. Specifically, the icon IC corresponding to an existing thing is selected and displayed as person information or scene information obtained by analysis of the respective images in step S701. Alternatively, the corresponding icon IC may be produced and displayed according to a person or an object obtained as analysis result data.

In such a manner, only the icons IC enabling image extraction are allowed to be displayed. For example, if an image containing the "cake" is absent in all the images of the image group corresponding to the processing target, the icon IC for the "cake" is considered to be unnecessary. This is because no image is extracted even by designation of the icon IC for the "cake" by the user. Meaningless designation of the icon IC (for which no image is extracted) can be eliminated by presenting to the user only the icon IC corresponding to a person or an article obtained as analysis result data.

In step S703, the CPU 71 checks an extraction condition. Specifically, an operation performed by the user for designating the icon IC is detected by a UI process.

In step S704, the CPU 71 performs an image extraction process according to the designated extraction condition, and controls display of extracted images. Specifically, images meeting the extraction condition are extracted with reference to the analysis result data associated with each of the images in the image group corresponding to the processing target. Thereafter, the extracted images are displayed in the image region 128 of the display unit 2a.

Subsequently, in a case where the user performs a rating operation for the images displayed in the image region 128, the CPU 71 proceeds from step S705 to step S706 to store rating information. In the case of the CPU 71 of the imaging device 2, the rating information is stored as metadata associated with the images.

Figure 43:
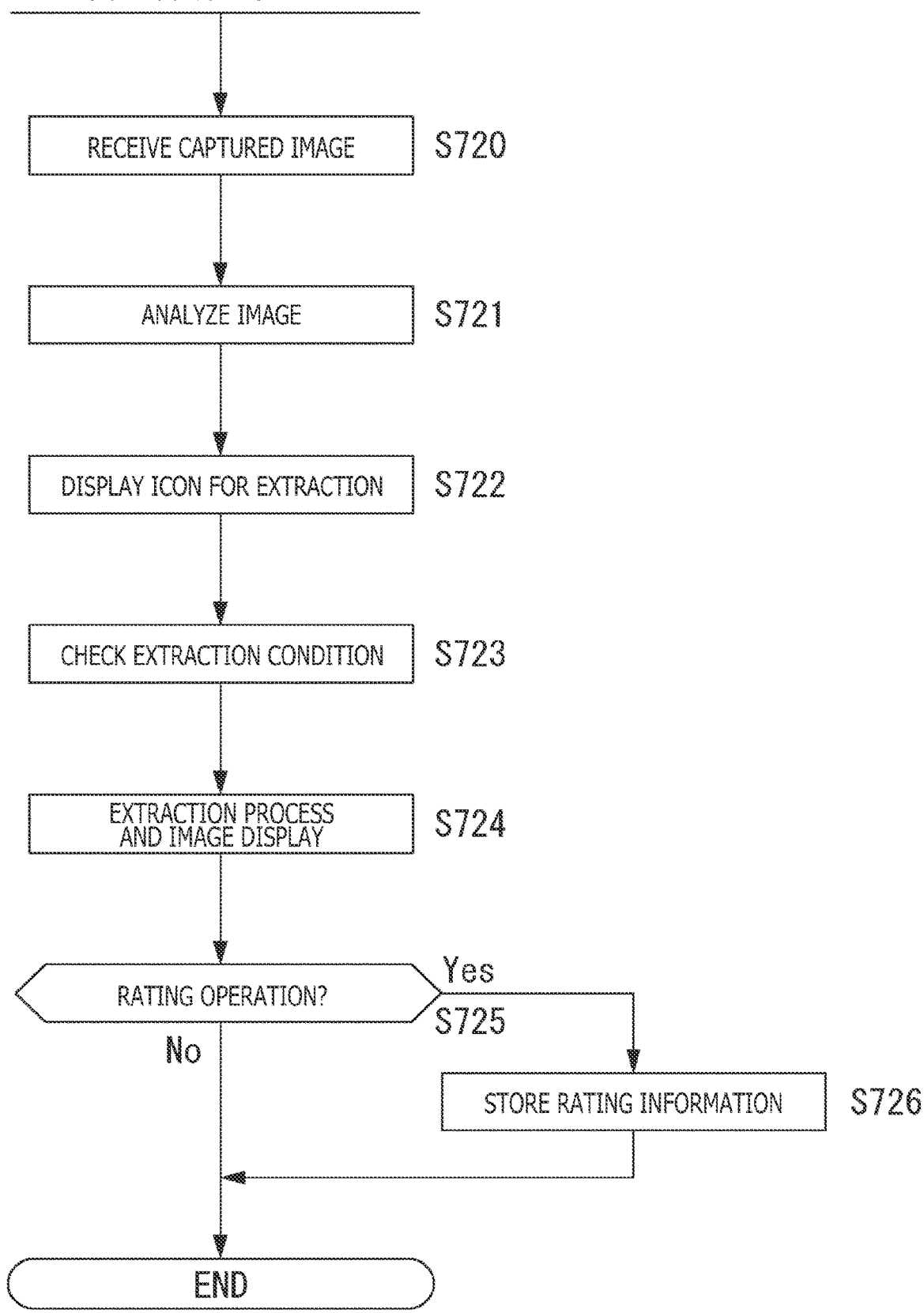
FIG. 43 is a flowchart illustrating an example of processing performed by the server device of the embodiment.

Next, FIG. 43 presents an example where the staff terminal 1 performs the selection speedup assistance process as described in FIG. 38B. Note that this example is a case where image analysis is also performed in the staff terminal 1.

In step S720, the CPU 71 of the staff terminal 1 receives images from the imaging device 2. This process is a process for importing images that have been stored in the imaging device 2 by a series of imaging processes performed by the photographer, for example, to the storage unit 79 in the staff terminal 1 via short-range wireless communication or wired communication, transfer using a recording medium, or the like.

In step S721, the CPU 71 of the staff terminal 1 analyzes each of the stored images received from the imaging device 2. Person information or scene information is obtained by analysis of each of the images as described above, to generate analysis result data. The analysis result data is stored as information associated with images.

In this case, the analysis result data may be stored in the event data 60 depicted in FIG. 5, for example, as information associated with each of the images. Specifically, the analysis result data corresponding to each of the images is stored in the imaging and editing information table 62 of the event data 60. For example, the analysis result data may be added to the metadata MT1, MT2, and others in the event data 60 in FIG. 5, or may be stored in correspondence with the respective images in the imaging and editing information table 62 separately from the metadata MT1, MT2, and others. Any storing modes may be adopted as long as the analysis result data can be stored in a state associated with the images.

It is assumed that this image analysis process is performed for each of transferred images at the time of image transfer from the imaging device 2, for example. Alternatively, the image analysis process may collectively be executed for the stored images when the camera staff performs a predetermined operation, such as an operation for executing image extraction.

In step S722, the CPU 71 displays the icons IC in the icon region 200 of the display unit 1*a*. Types of the displayed icons IC may be those set beforehand for the event related to marriage, as in the case of the imaging device 2 described above. It is particularly preferable that only the icon IC corresponding to a person or an article obtained as analysis result data is presented to the user.

In step S723, the CPU 71 checks an extraction condition. Specifically, an operation performed by the user for designating the icon IC is detected by a UI process.

In step S724, the CPU 71 performs an image extraction process according to the designated extraction condition, and controls display of extracted images. Specifically, images meeting the extraction condition are extracted with reference to the analysis result data associated with each of the images in the image group corresponding to the processing target. Thereafter, the extracted images are displayed in the image region 128 of the display unit 1*a*.

Subsequently, in a case where the user performs a rating operation for the images displayed in the image region 128, the CPU 71 proceeds from step S725 to step S726 to store rating information. In the case of the CPU 71 of the staff terminal 1, the set rating information is stored and updated as rating information in the imaging and editing information table 62 of the event data 60 as depicted in FIG. 5.

Note that the staff terminal 1 also selects images posted on a web gallery, selects cover images and highlight images, or selects images desired to be edited, for example, according to an operation performed by the camera staff in step S724 or following steps in some situations. In that case, the event data 60 is updated according to these operations.

Figure 44:
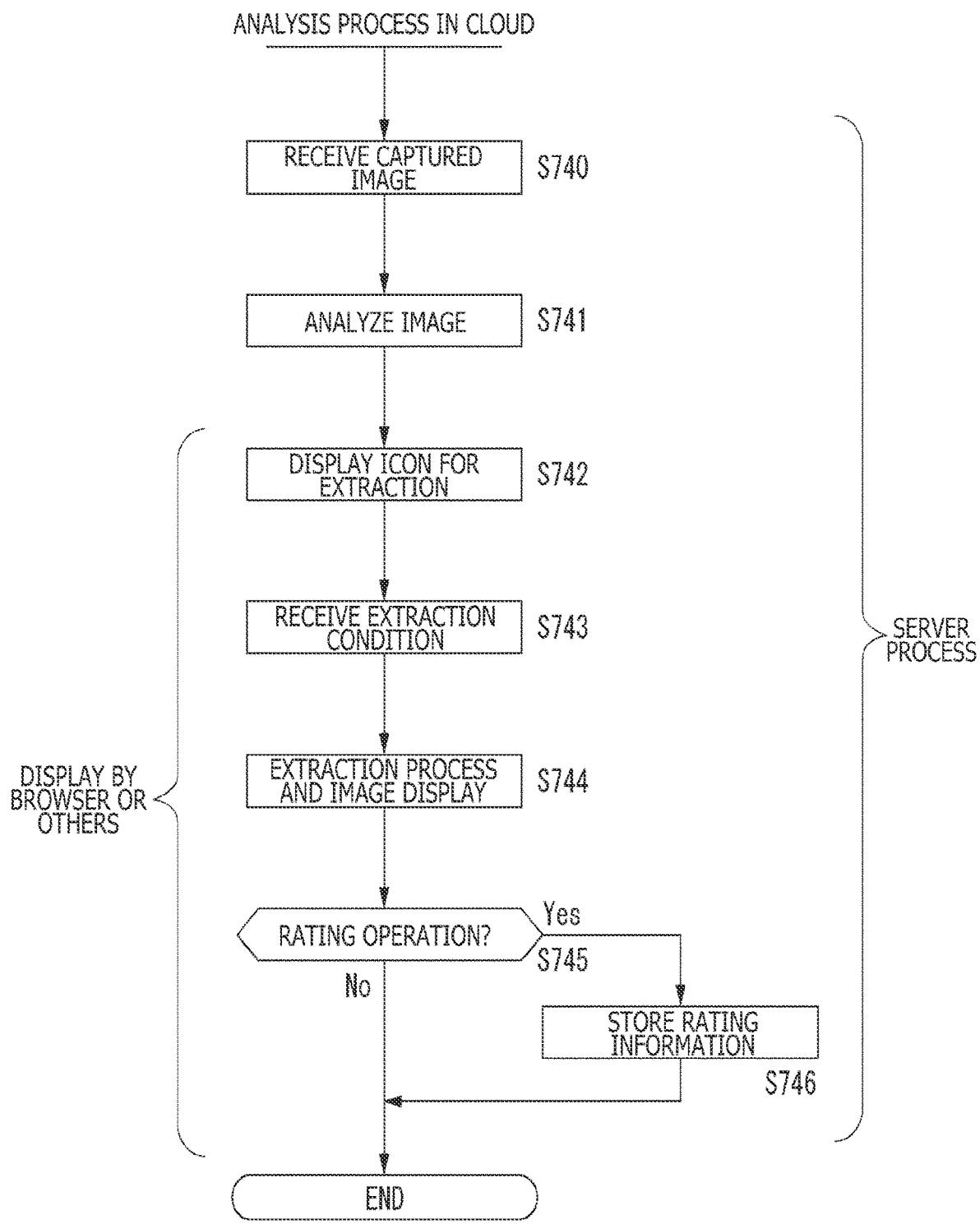
FIG. 44 is a flowchart illustrating an example of processing performed by the terminal device of the embodiment.

Next, FIG. 44 presents an example of a case where the server device 4 performs the selection speedup assistance process as described in FIG. 38C.

In step S740, the CPU 71 of the server device 4 receives images from the staff terminal 1 or the imaging device 2. For example, images stored in the imaging device 2 by a series of imaging processes performed by the photographer or images transferred to the staff terminal 1 are uploaded to the server device 4 in the cloud 7.

In step S741, the CPU 71 of the server device 4 analyzes each of the received images. Person information or scene information is obtained by analysis of each of the images as described above, and analysis result data is generated with reference to these items of information. The analysis result data is stored as information associated with images. In this case, the analysis result data may be stored in the event data 90 depicted in FIG. 7, for example, as information associated with the respective images.

Steps S742 to S746 correspond to processing for providing a UI image from the server device 4 to the staff terminal 1 by a browser, an application program, or the like. For example, processing in step S742 and the following steps is performed in response to a request for display issued from the staff terminal 1 to the server device 4 by a browser or the like.

In step S742, the CPU 71 displays the icons IC on the display unit 1*a* of the staff terminal 1 as display in the icon region 200 in a web page, for example. In this case, types of the displayed icons IC may similarly be those set beforehand for the event related to marriage. It is particularly preferable that only the icon IC corresponding to a person or an article obtained as analysis result data be presented to the user.

In step S743, the CPU 71 receives an extraction condition based on an operation performed by the staff terminal 1 or the like.

In step S744, the CPU 71 performs an image extraction process according to the designated extraction condition, and controls display of extracted images. Specifically, images meeting the extraction condition are extracted with reference to the analysis result data associated with each of the images in the image group corresponding to the processing target. Thereafter, the extracted images are displayed on the display unit 1*a* or the like as the image region 128 in a web page or the like.

Subsequently, in a case where the user performs a rating operation for the images displayed in the image region 128, the CPU 71 proceeds from step S725 to step S726 to store rating information. In the case of the CPU 71 of the server device 4, the set rating information is stored and updated as rating information in the imaging and editing information table 92 of the event data 90 as depicted in FIG. 7.

Note that the staff terminal 1 also selects images posted on a web gallery, selects cover images and highlight images, or selects images desired to be edited, for example, according to an operation performed by the camera staff in step S744 or following steps in some situations. In that case, the CPU 71 of the server device 4 updates the event data 90 according to these operations.

In the case where the event data 90 is updated on the server device 4 side, the event data 60 on the staff terminal 1 side is also synchronized with the event data 90 as described above.

In addition, in the configuration that the imaging device 2 has a web browsing function or the like, the process presented in FIG. 44 is achievable by not only the staff terminal 1 but also an interface process using the imaging device 2.

Meanwhile, described with reference to FIG. 38A and FIG. 38B has also been the example where image analysis is also executed by the server device 4 in a case where the selection speedup assistance process is performed by the imaging device 2 or the staff terminal 1. In that case, it is sufficient if the processing for image analysis in step S701 in FIG. 42 and step S721 in FIG. 43 is performed as presented in FIG. 45.

Figure 45:
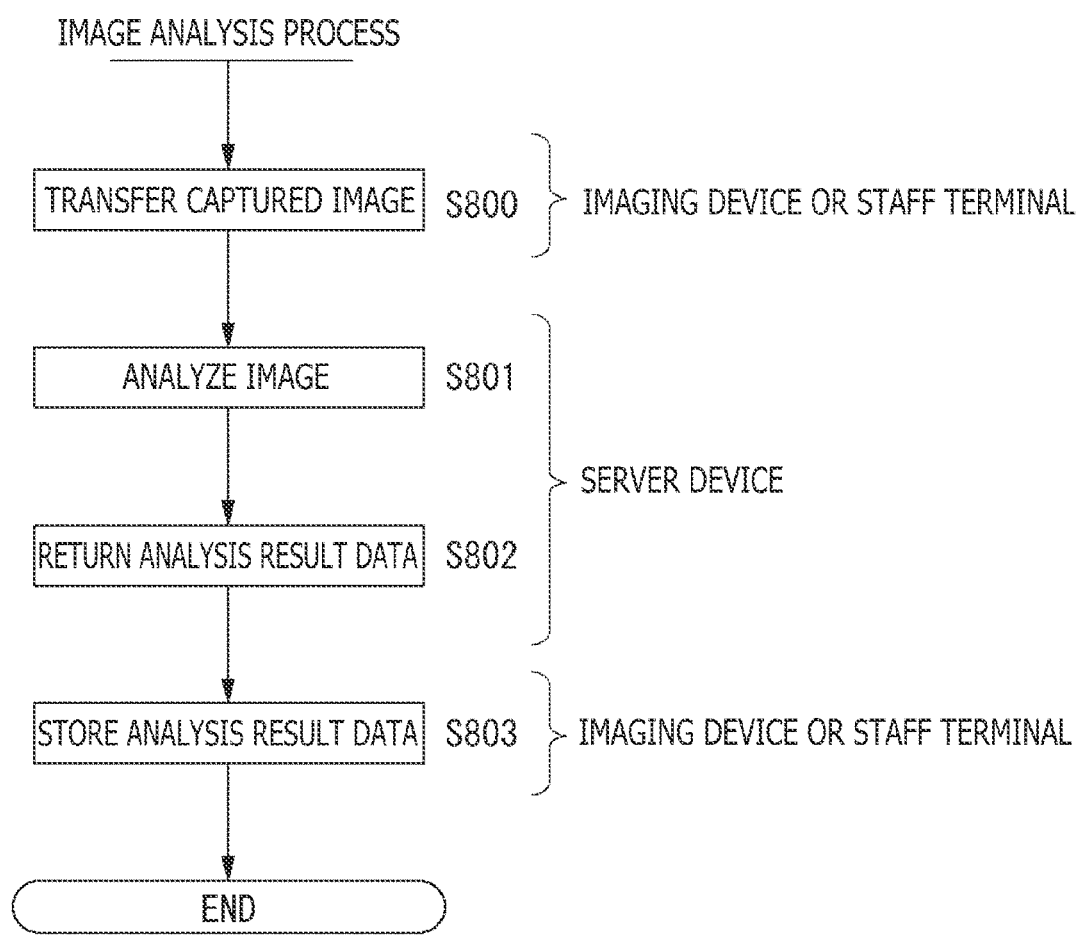
FIG. 45 is a flowchart illustrating an image analysis process of the embodiment.

For example, steps S800 and S803 in FIG. 45 correspond to processing performed by the function of the analysis result data reception unit 36 (FIG. 39A) included in the CPU 71 of the staff terminal 1 or the imaging device 2, while steps S801 and S803 correspond to processing performed by the function of the analysis unit 37 (FIG. 39B) included in the CPU 71 of the server device 4.

As step S800, the imaging device 2 or the staff terminal 1 uploads captured images to the server device 4. In this case, the captured images may be transmitted as reduced images having lowered resolution, in light of a communication volume, a communication speed, or the like, for example. Original images have a large size, and require time for transfer and analysis. Accordingly, reduction of the transfer time and reduction of the analysis processing load imposed on the server device 4 can be achieved by reduction of the image to a size sufficient for analysis.

Note that the image may also be uploaded without reduction. In that case, it is also possible that the server device 4 creates reduced images for analysis.

In step S801, the server device 4 performs an analysis process for each of the images to generate analysis result data.

In step S802, the server device returns analysis result data for each of the images to the imaging device 2 or the staff terminal 1.

In step S803, the imaging device 2 or the staff terminal 1 receives the analysis result data from the server device 4, and stores the analysis result data. For example, the imaging device 2 stores the analysis result data as metadata for the images, or in a form of a database separately generated. On the other hand, the staff terminal 1 may store the analysis result data in the event data 60.

The foregoing processing performed in step S701 in FIG. 42 or step S721 in FIG. 43 eliminates the necessity of performing an analysis process which imposes a relatively high processing load on the imaging device 2 or the staff terminal 1 carrying out the analysis process.

Described hereinafter will be a specific example of the selection speedup assistance achieved by the processing example described above.

While not described one by one, the display example described hereinafter with reference to respective figures is a display example of the display unit 1a of the staff terminal 1 or the display unit 2a of the imaging device 2. The display example of the display unit 1a or 2a includes display of images supplied from the server device 4 by a browser or an application program.

FIG. 46 depicts an example of a user interface provided by the selection speedup assistance.

In FIG. 46A, a list of captured images is displayed in the image region 128, while various types of icons IC are displayed in the icon region 200. The icons IC are displayed according to an analysis result of each image, for example.

FIG. 46B depicts an example where extracted images are displayed in the image region 128 as images extracted by an extraction process performed according to an extraction condition determined by designation of icons IC1 and IC4 by the user.

The designated icons IC1 and IC4 are displayed in a mode different from modes of the other icons IC in the icon region 200. In this example, each of the icons IC1 and IC4 is displayed with a thick frame. As a result, which of the icons IC has been designated is recognizable for the user.

Various modes are adoptable as the different display mode. The designated icon IC itself or the frame of the icon may have a color, luminance, or a size different from those of the other icons IC, or the designated icon which is displayed two-dimensionally in a normal state may be displayed three-dimensionally.

Particularly, assuming that multiple icons are to be designated by the user, clearly presenting the designated icons IC to the user in a different display mode is desirable for the user.

A rating icon 130 is provided for each of the images in the image region 128.

The user is allowed to set rating information for each of the images by operating the corresponding rating icon 130. The user having recognized the extraction result depicted in FIG. 46B provides rating setting for each of the images. FIG. 46C depicts an updated state of the rating information achieved by an operation.

For example, the user is allowed to browse images meeting a desired extraction condition by using the selection speedup assistance process in such a manner, and is thereafter allowed to provide rating setting while comparing the extracted images. Needless to say, images to be posted on a web gallery, cover images, highlighted images, images desired to be edited, and others may be selected in addition to performing rating setting.

FIG. 47 depicts examples of the icons IC displayed in the icon region 200. For example, the following items are included.

Icon IC1: image containing bride
Icon IC2: image containing bridegroom
Icon IC3: image containing cake
Icon IC4: image containing single person
Icon IC5: image containing multiple persons
Icon IC6: close-up image containing large-sized face (e.g., image containing face with face size of 20 or larger of horizontal width of screen)
Icon IC7: "zoom-out" image containing small-sized face (e.g., image containing face with face size of 5% or smaller of horizontal width of screen)
Icon IC8: image containing glass
Icon IC9: image containing bouquet
Icon IC10: icon for time designation (e.g., icon for designating time, time range, etc., for partition by time or scene)

The above items are presented only by way of example. Various types of icons are assumable in addition to those examples. However, it is preferable to adopt icons suited for extraction of images at an event related to marriage. As described above, suited icons may be learned according to a result of image analysis, and added as the icons IC provided for setting extraction conditions. For example, when it is determined by learning that a certain object is contained in a relatively large number of images, an icon corresponding to this object is added. This leads to an article which is likely to become an object to be imaged during a wedding or the like being automatically iconized.

Various types of examples of extraction test image extraction will be described here. In addition, in a case where multiple icons IC are designated, it is assumed that each of extraction conditions indicated by the designated icons IC is provided as an AND condition unless particularly specified otherwise in the following description.

Example 1: Example Designating Person Information as Extraction Condition

Figure 48:
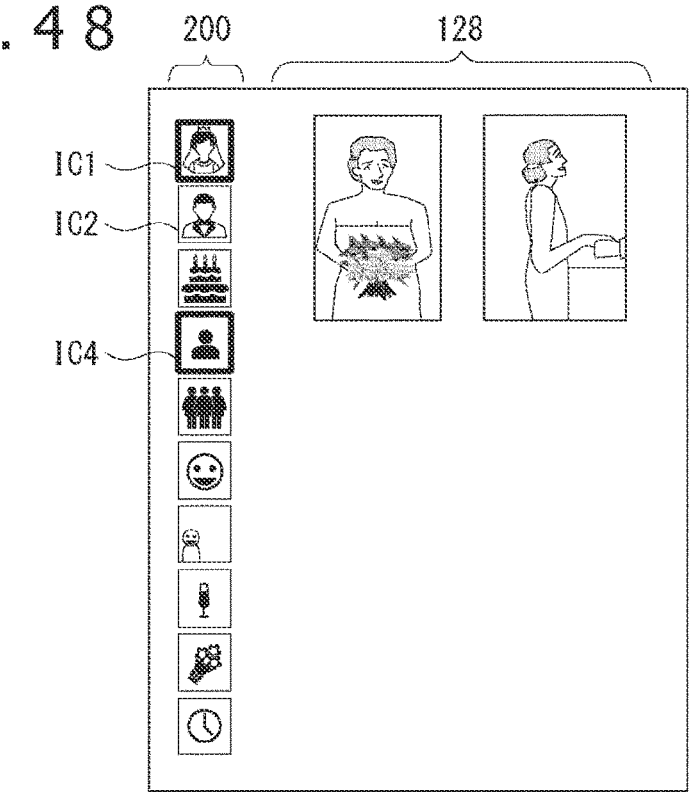
FIG. 48 is an explanatory diagram for extraction of a single person according to the embodiment.

FIG. 48 depicts a case where the icon IC1 indicating the bride and the icon IC4 indicating a single person are designated. Images each containing only the bride are extracted according to this designation. This designation is effective in a case of performing, for example, rating or selection of images containing the bride who is the star of the wedding.

Similarly, images each containing only the bridegroom are extracted according to designation of the icon IC2 indicating the bridegroom and the icon IC4 indicating a single person.

Figure 49:
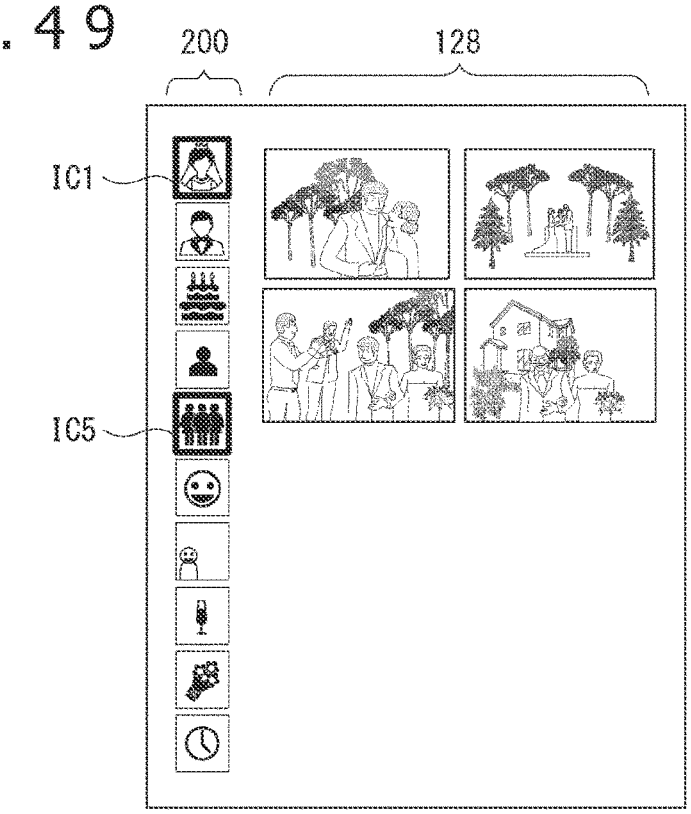
FIG. 49 is an explanatory diagram for extraction of multiple persons according to the embodiment.

Example 2: Example Designating Person and Number of Persons as Extraction Condition FIG. 49 depicts a case where the icon IC1 indicating the bride and the icon IC5 indicating multiple persons are designated. Images each containing multiple persons including the bride are extracted according to this designation. This designation is effective in the case of performing rating, selection, and the like of images containing the bride and persons concerned.

Similarly, images each containing multiple persons including the bridegroom are extracted according to designation of the icon IC2 indicating the bridegroom and the icon IC5 indicating multiple persons.

Example 3: Example Designating Person, Number of Persons, and Face Size as Extraction Condition FIG. 50 depicts a case where the icon IC1 indicating the bride, the icon IC4 indicating a single person, and the icon IC6 indicating a closeup image are designated. Closeup images each containing only the bride are extracted according to this designation.

A cut of a closeup face or of "zoom-out" is only required to be determined from a size of a rectangular shape (bounding box BB) containing a face.

FIG. 51A and FIG. 51B depict an example of the bounding box BB.

FIG. 51A depicts an example where the bounding box BB is defined by upper left coordinates and lower right coordinates.

FIG. 51B depicts an example where the bounding box BB is defined by upper left coordinates, a width, and a height.

Figure 52:
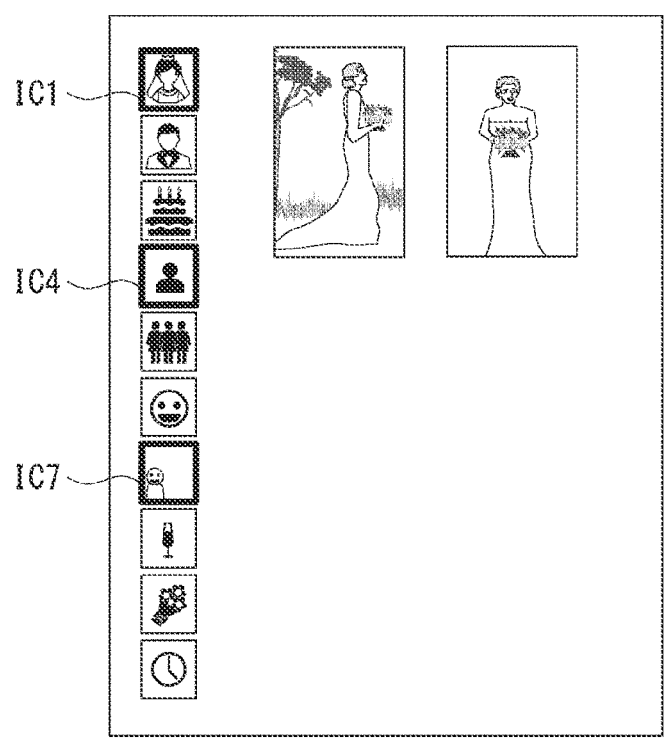
FIG. 52 is an explanatory diagram for a zoom out image of a single person according to the embodiment.

Example 4: Example Designating Person, Number of Persons, and Face Size as Extraction Condition FIG. 52 depicts a case where the icon IC1 indicating the bride, the icon IC4 indicating a single person, and the icon IC7 indicating a "zoom-out" image are designated. "Zoom-out" images each containing only the bride are extracted according to this designation.

Example 5: Example Designating Person and Thing as Extraction Condition

Figure 53:
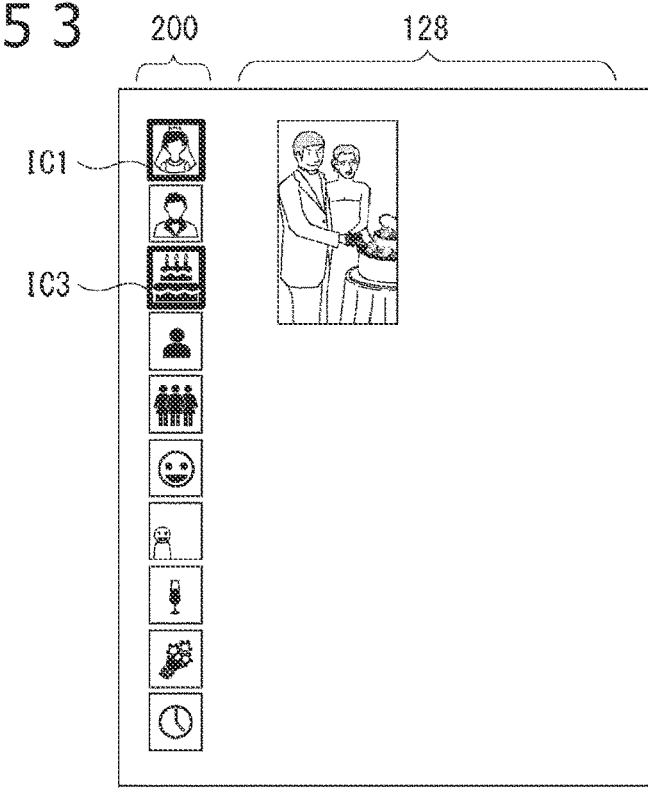
FIG. 53 is an explanatory diagram for an image of a person and an object according to the embodiment.

FIG. 53 depicts a case where the icon IC1 indicating the bride and the icon IC3 indicating the cake are designated. Images each containing the bride and the cake are extracted according to this designation. For example, this designation is applied in a case of checking an image of a cake-cut scene. In such a manner, a desired scene can easily be extracted according to an extraction condition designating a thing.

Example 6: Example Designating Thing as Extraction Condition

Figure 54:
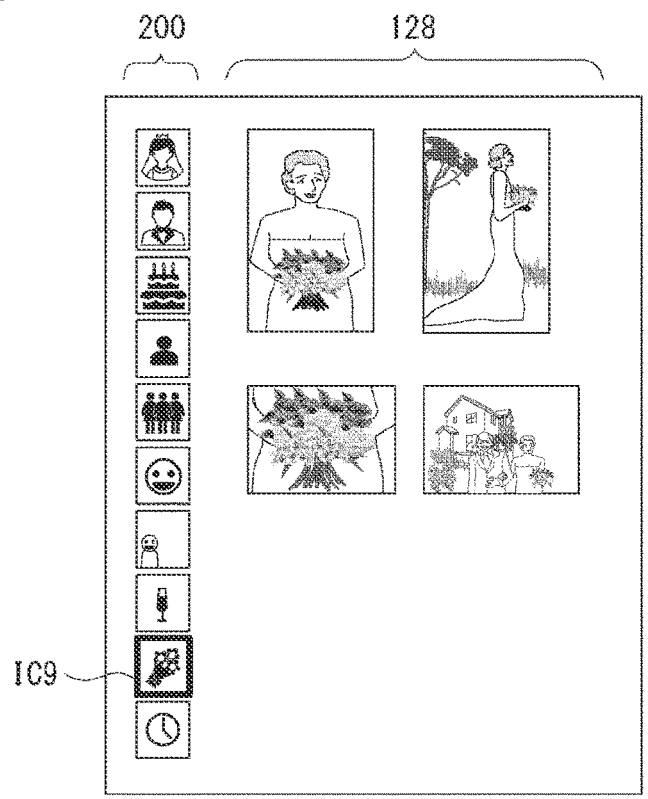
FIG. 54 is an explanatory diagram of an image of an object according to the embodiment.

FIG. 54 depicts a case where the icon IC9 indicating the bouquet is designated. This designation leads to extraction of images where the bouquet is detected as an object to be imaged. This designation is useful in a case where an article that is symbolic of a wedding or the like is desired to be extracted, for example.

Figure 55:
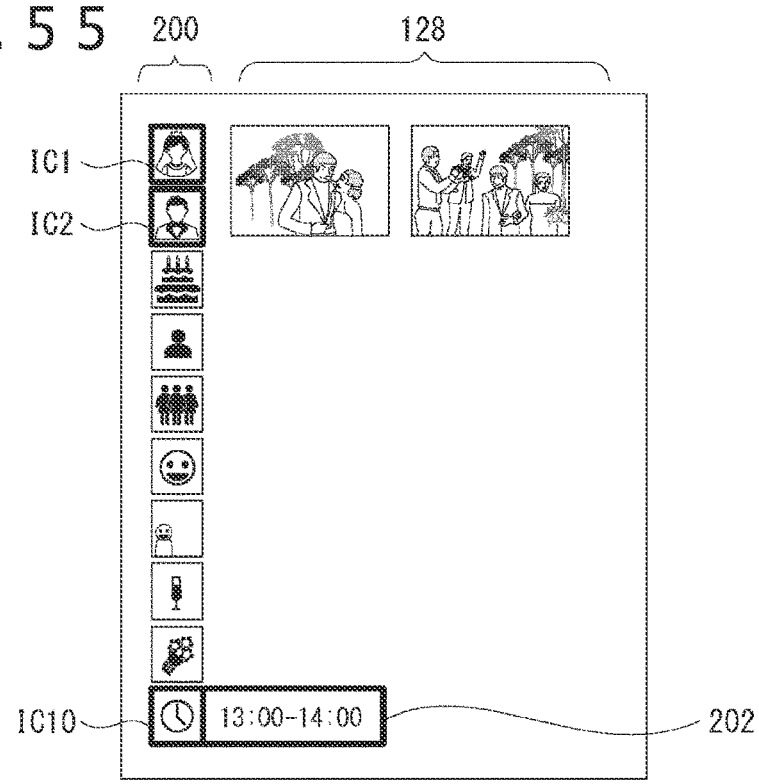
FIG. 55 is an explanatory diagram for extraction by person and time according to the embodiment.

Example 7: Example Designating Person and Time Information as Extraction Condition FIG. 55 depicts a case where the icon IC1 indicating the bride, the icon IC2 indicating the bridegroom, and the icon IC10 indicating time designation are designated. For the icon IC10 indicating time designation, a time designation frame 202 appears as a frame to which a time range is input according to an operation of the icon IC10, and the user inputs a desired time to the time designation frame 202. In the case of the example depicted in the figure, images containing the bride and the bridegroom are extracted from images captured during a period from 13:00 to 14:00.

Designation of the time information may also be considered as a condition for extracting a scene at a particular time.

Figure 56:
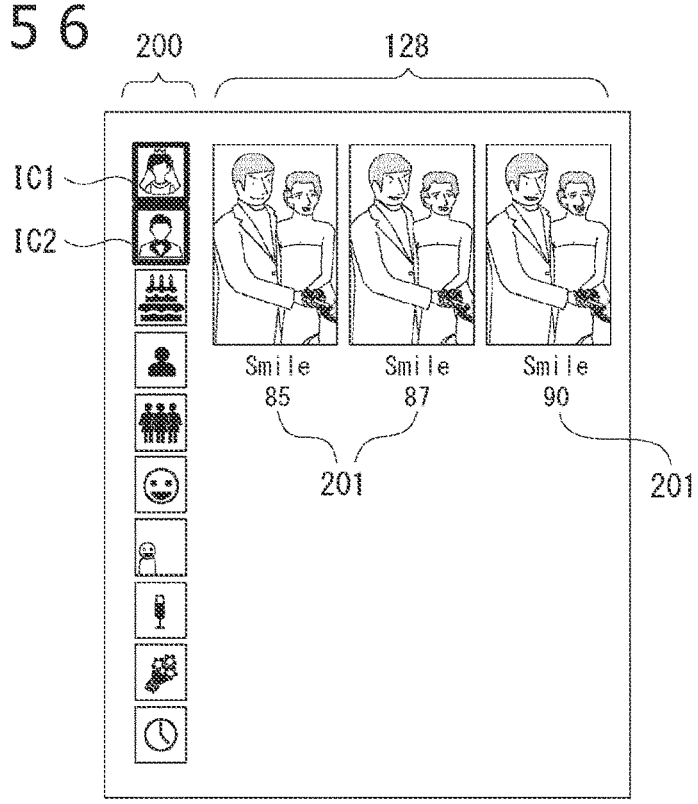
FIG. 56 is an explanatory diagram for display of emotion recognition information according to the embodiment.

Example 8: Example Designating Person as Extraction Condition, and Displaying Recognition Level FIG. 56 depicts a case where the icon IC1 indicating the bride and the icon IC2 indicating the bridegroom are designated. Images each containing the bride and the bridegroom are extracted according to this designation. In this case, an emotion and facial expression recognition level 201 is displayed for each of the images.

The emotion and facial expression recognition level is a value indicating a degree of an emotion and a facial expression such as a smiling face, an amazed face, and a crying face in a case where these emotions and facial expressions are recognized. For example, in a case where a process recognizing a "smiling face" is performed at the time of image recognition, a degree of a smiling face is quantified as a recognition level and added to analysis result data. In that case, the emotion and facial expression recognition level 201 can be displayed as depicted in the figure. The user is allowed to provide rating setting and selection with reference to the emotion and facial expression recognition level 201.

Described above have been the examples each designating the extraction condition by using the icon IC corresponding to analysis result data. A UI example corresponding to such a case will be described.

For example, the display unit 2a of the imaging device 2, or the display unit 1a of a case where a smartphone or the like is assumed to be the staff terminal 1 has a display area smaller than that of a desktop PC or the like. In this case, recognizability and operability may be lower. Described will be a UI example suitable for such a case using the display unit 2a or 1a which is relatively small-sized.

Figure 57:
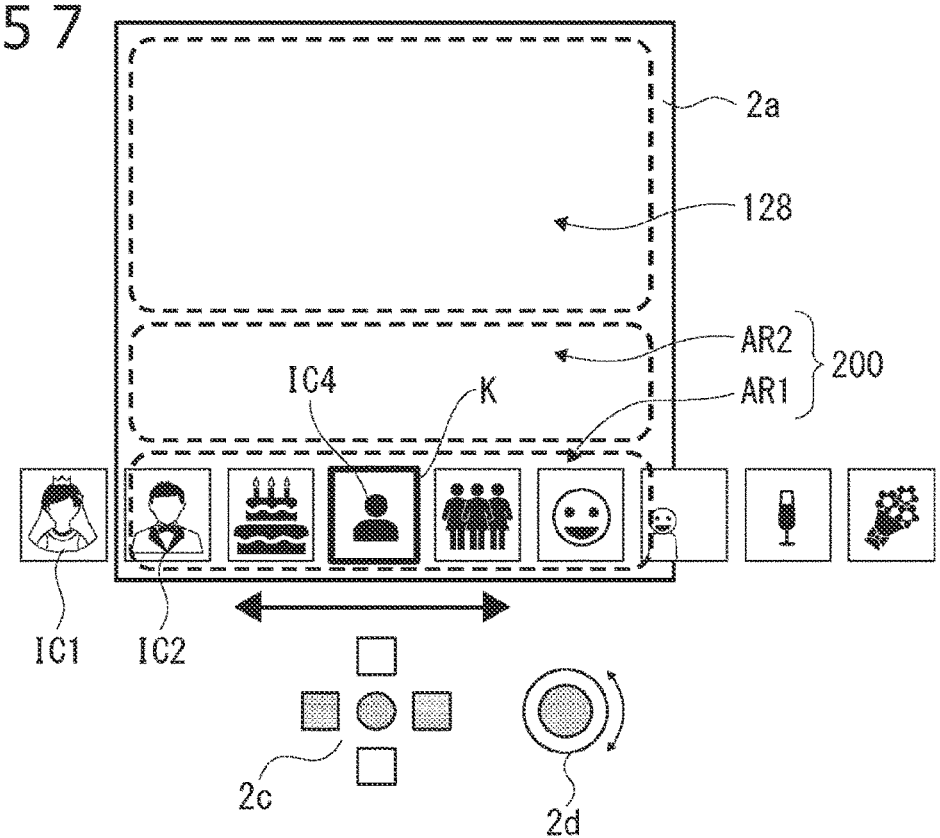
FIG. 57 is an explanatory diagram for a user interface example of the embodiment.
Figure 58:
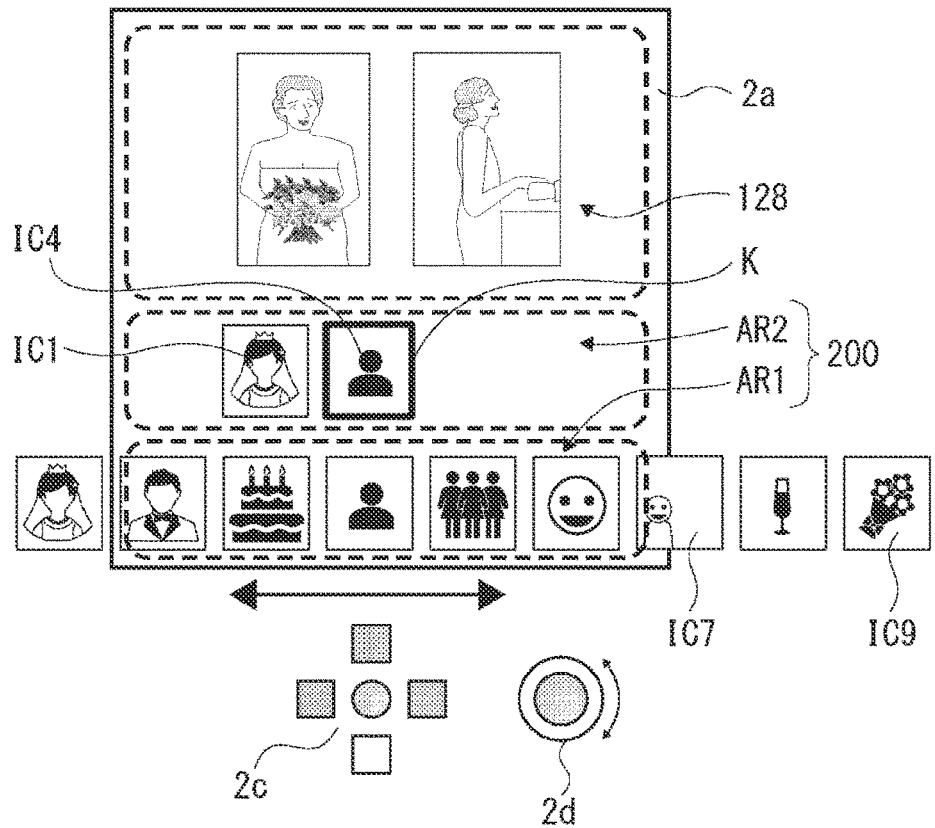
FIG. 58 is an explanatory diagram for a user interface example of the embodiment.

FIGS. 57 and 58 each depict the display unit 2a of the imaging device 2. These figures further depict a cross-key 2c and a wheel 2d equipped on the imaging device 2 as operators.

The cross-key 2c is an operator pressable at upper, lower, left, and right keys and a central key. The wheel 2d is an operator rotatable and pressable at a central key.

For example, the display unit 2a has the image region 128 set in an upper part of the screen and the icon region 200 set in a lower part of the screen. A candidate region AR1 and a selection region AR2 are set in the icon region 200.

The candidate region AR1 is a region where the icons IC are arranged in a horizontal line in a lowermost part of the screen, and schematically indicates that the one icon IC located at the center is currently being selected by a cursor K with the displayed icons IC scrolled in the horizontal direction according to an operation of the left key or the right key of the cross-key 2c or a rotational operation of the wheel 2d.

Note that the line of the icons IC are expressed in such a manner protruding from the screen of the display unit 2a in the figure. This figure schematically represents that the respective icons IC are displayed within the screen by scrolling.

The selection region AR2 is a region located above and adjacent to the candidate region AR1.

The user performs a scroll operation for the candidate region AR1 to produce a state of selecting the desired icon IC by the cursor K. Thereafter, the user performs an enter operation by pressing the center key of the cross-key 2*c* and the center key of the wheel 2*d*.

In that case, the icons IC associated with the enter operation are displayed in the selection region AR2 as depicted in FIG. 58.

In such a manner, the user can easily check the designated icon types by the icons IC designated by the user being displayed in the selection region AR2. It is useful to display the designated state by changing the display mode as described above. However, depending on situations, a difference in the display mode may be difficult to recognize particularly in a relatively small screen such as the display unit 2*a* of the imaging device 2. Moreover, in a case where all the icons cannot be displayed at once and need to be scrolled, the designated icons themselves may not be displayed and thus be difficult to check even in a different display mode depending on situations. When the selection region AR2 is provided separately from the candidate region AR1 to indicate the designation state by display in the selection region AR2 as depicted in FIG. 58, the designated icons IC are easily checked even in a small-sized screen.

When a predetermined operation is performed in a state where one or more icons IC are displayed in the selection region AR2, images are extracted according to extraction conditions corresponding to these icons IC, and displayed in the image region 128. In the example of FIG. 58, the icon IC1 indicating the bride and the icon IC4 indicating a single person are displayed in the selection region AR2. In this case, these icons are designated as the extraction conditions, and images each containing the bride alone are displayed in the image region 128.

Moreover, the icon IC once displayed in the selection region AR2 can be deleted from the selection region AR2 by an operation of selection cancelling performed by the user.

For example, a scrolling target is shifted to the selection region AR2 by an operation of the upper key of the cross-key 2*c*. Thereafter, the cursor K is brought into a state currently selecting any of the icons IC by a scroll operation, and an enter operation is performed. As a result, the selection state of the corresponding icon IC is cancelled, and corresponding the icon IC is deleted from the selection region AR2.

Note that the example of FIGS. 57 and 58 depicts the case where the icon IC4 is designated. In this case, the icon IC4 is displayed in both the candidate region AR1 and the selection region AR2 as depicted in FIG. 58.

Instead of such an example, the designated icon IC may be shifted from the candidate region AR1 to the selection region AR2. For example, in the case of the example depicted in FIG. 58, the icons IC1 and IC4 are displayed in the selection region AR2. At this time, the icons IC1 and IC4 are deleted (do not appear even by scrolling) from the candidate region AR1.

As a result, the number of the icons corresponding to selectable candidates in the candidate region AR1 decreases as the number of the icons IC in the selection region AR2 increases. Accordingly, the user can easily select the icons IC and avoid a repetitive selection operation.

Moreover, in a case where the icons IC shift as described above, the icons IC whose selection has been cancelled in the selection region AR2 are displayed again in the candidate region AR1.

Figure 59:
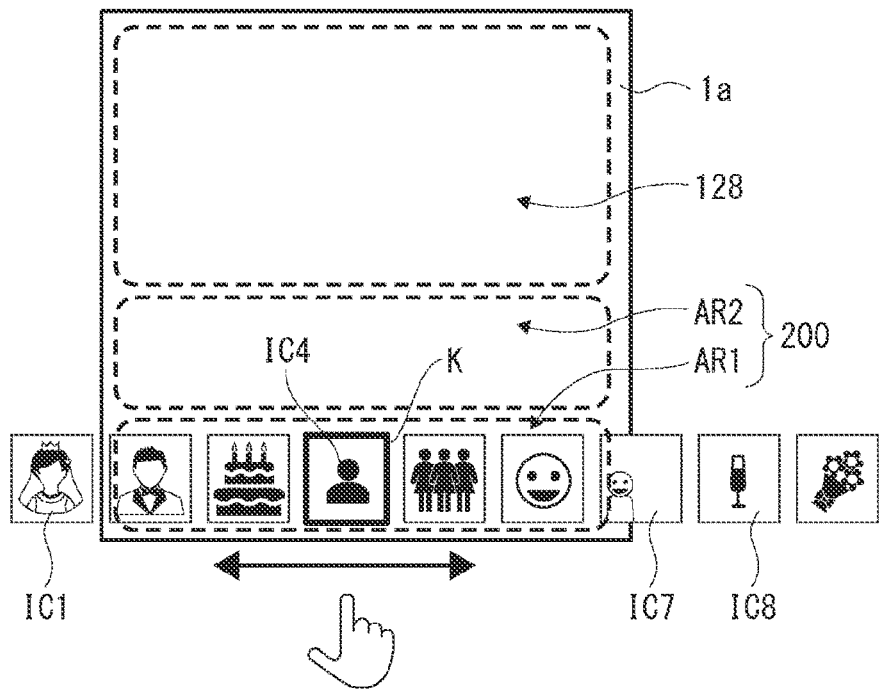
FIG. 59 is an explanatory diagram for a user interface example of the embodiment.
Figure 60:
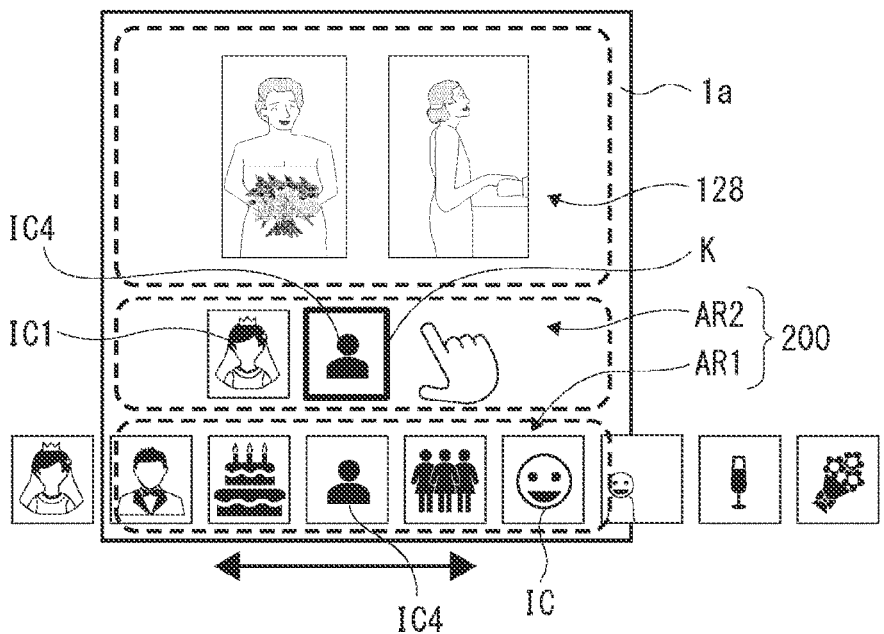
FIG. 60 is an explanatory diagram for a user interface example of the embodiment.

Subsequently, FIGS. 59 and 60 each depict a case assuming the display unit 1*a* of the staff terminal 1, particularly the display unit 1*a* of a small-sized portable device such as a smartphone. It is assumed that the display unit 1*a* has a touch panel mechanism to allow the user to perform such operations as tapping, double tapping, flicking, dragging, and pinch-in/out.

As in FIG. 57 referred to above, for example, the display unit 1*a* has the image region 128 set in an upper part of the screen and the icon region 200 set in a lower part of the screen. The candidate region AR1 and the selection region AR2 are set in the icon region 200.

The candidate region AR1 is a region where the icons IC are arranged in a horizontal line in a lowermost part of the screen, and schematically indicates that one icon IC located at the center is currently being selected by the cursor K with the display icons IC scrolled in the horizontal direction by a flick operation in the left-right direction.

The user performs a scroll operation for the candidate region AR1 to produce a state of selecting the desired icon IC by the cursor K. Thereafter, such an operation as dragging toward the selection region AR2 is performed for the icons IC to display the icons IC in the selection region AR2 as depicted in FIG. 60.

When a predetermined operation is performed in a state where one or more icons IC are displayed in the selection region AR2, images are extracted according to extraction conditions corresponding to these icons IC. The extracted images are displayed in the image region 128.

Moreover, the icon IC once displayed in the selection region AR2 can be deleted from the selection region AR2 by a selection cancelling operation performed by the user.

For example, the user performs a tap operation for the icon IC present in the selection region AR2. As a result, the selection state of the corresponding icon IC is cancelled, and the corresponding icon IC is deleted from the selection region AR2.

In the manner described above, even in the case of the display unit 1*a* of the staff terminal 1, the user can easily check the designated icon types by the icons IC designated by the user being displayed in the selection region AR2.

Needless to say, the designated icons IC in this case may also be shifted from the candidate region AR1 to the selection region AR2, and the icon IC whose selection has been cancelled may be shifted from the selection region AR2 to the candidate region AR1.

Figure 61:
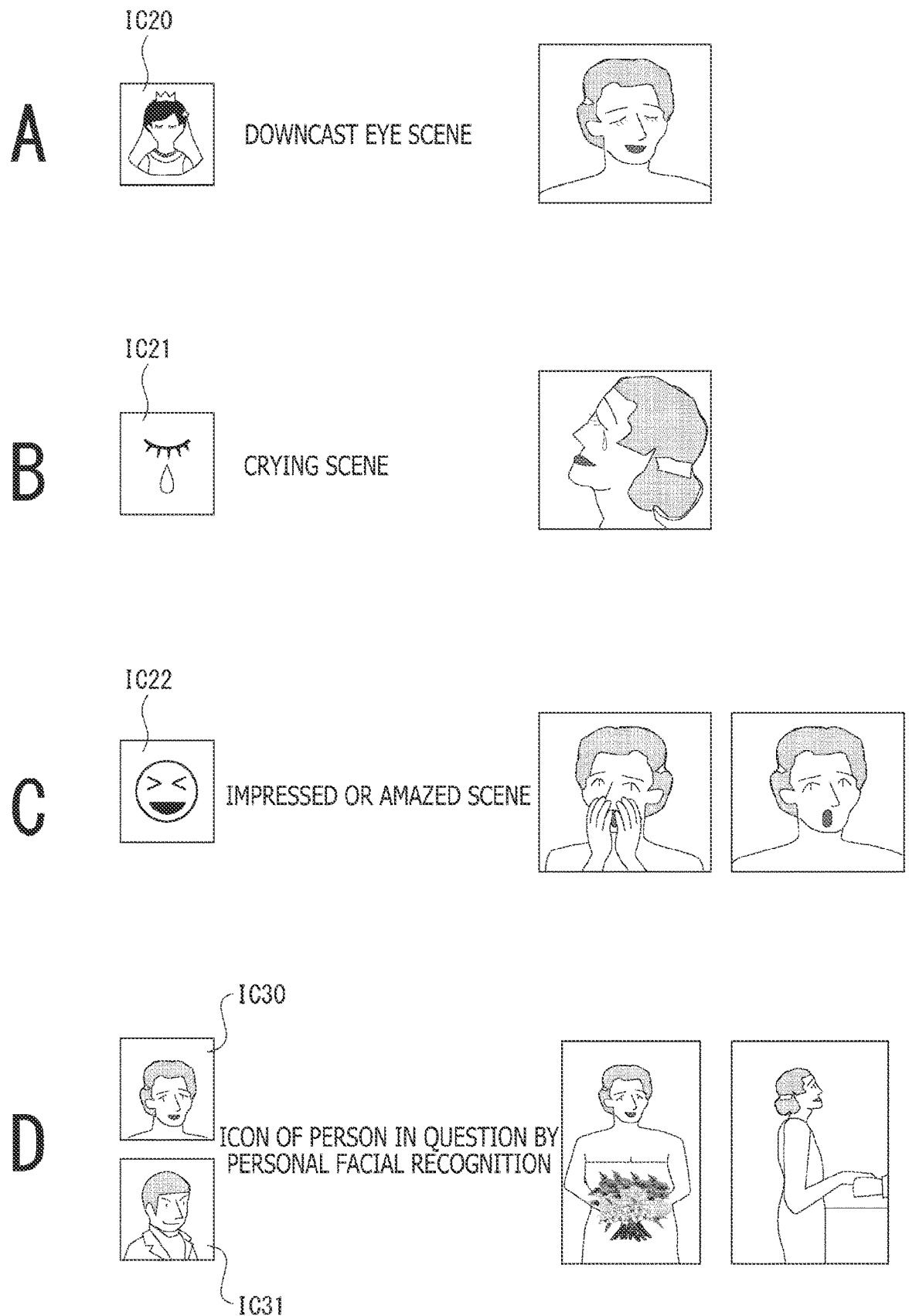
FIG. 61 depicts explanatory diagrams for extraction by emotion recognition information according to the embodiment.

Subsequently, further presented with reference to FIG. 61 will be an example of the icons IC useful in a case where images of a wedding or the like are targeted. This is a further variation of the example of the icons IC depicted in FIG. 47.

FIG. 61A depicts an icon IC20 designating images in a scene of the bride with downcast eyes as an extraction condition.

FIG. 61B depicts an icon IC21 designating images in a scene of crying as an extraction condition.

FIG. 61C depicts an icon IC22 designating images of impressed or amazed facial expressions as an extraction condition.

These icons are the icons IC corresponding to useful extraction conditions for extracting images each containing an emotion and a facial expression of a person as an object to be imaged. Particularly, it is desirable to select scenes rich in emotions and facial expressions as images to be included in an image collection of an event related to marriage. Accordingly, extraction conditions to which elements of emotions and facial expressions are added are set to facilitate image extraction using the icons IC corresponding to the set extraction conditions.

Images in a scene with downcast eyes can be determined by closed eyes, a face angle, and machine learning.

Images in a crying scene can be determined by detection of tears, a gesture of wiping tears away with a handkerchief or the hand, or the like.

Images in an impressed or amazed scene can be determined by facial expression determination, particularly, analysis of the eyes, the mouth, gestures, or the like.

Accordingly, image extraction according to the extraction conditions using, for example, the icons IC20, IC21, and IC22 is achievable by determining these scenes by image analysis and adding this determination to analysis result data.

FIG. 61D depicts icons IC20 and IC31 each indicating a person in question recognized by personal facial recognition. Images of specific persons can be extracted by extraction of faces of persons having participated in a wedding or the like and designation of these images as the icons IC.

The icons IC are generated using images of faces of the respective participants with personal identification at the time of analysis of respective images. In such a manner, the personal face icons described above are generated, and used as icons for the selection speedup assistance.

Next considered will be linkage with not only analysis result data but also metadata added by the imaging device 2.

For example, the imaging device 2 connects focal position information with images as metadata associated with the images, at the time of imaging. Narrowing down of images based on a focused position is achievable by combining this focal position information with analysis result data.

Figure 62:
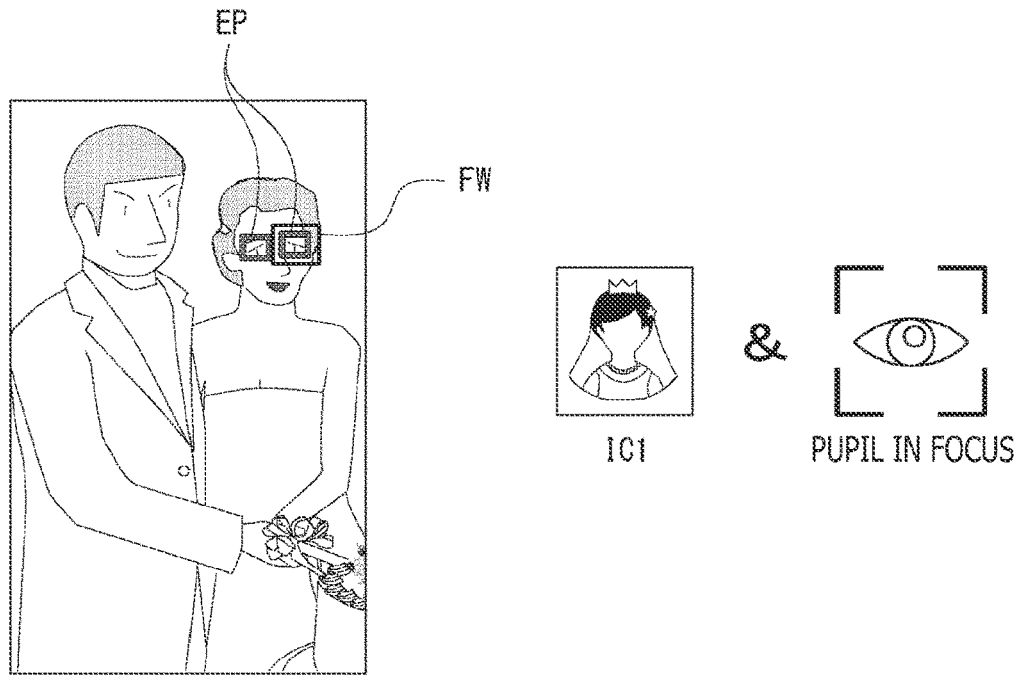
FIG. 62 is an explanatory diagram for narrowing-down of images by focal position information according to the embodiment.

Example 9: Example Designating Person and Pupil in Focus as Extraction Condition FIG. 62 depicts a case where a condition of an image containing a pupil in focus is added to designation of the icon IC1 indicating the bride.

In each of images, information presenting a pupil frame EP for indicating a pupil position during imaging and information presenting a focal frame FW for indicating a focal position are contained in metadata. As a result, images containing the bride can be extracted in reference to analysis result data, and images containing the bride with pupils in focus can further be extracted from the extracted images. In this case, for example, images where the focal position and the pupil position are substantially aligned can be determined as images containing the bride whose pupils are in focus.

Figure 63:
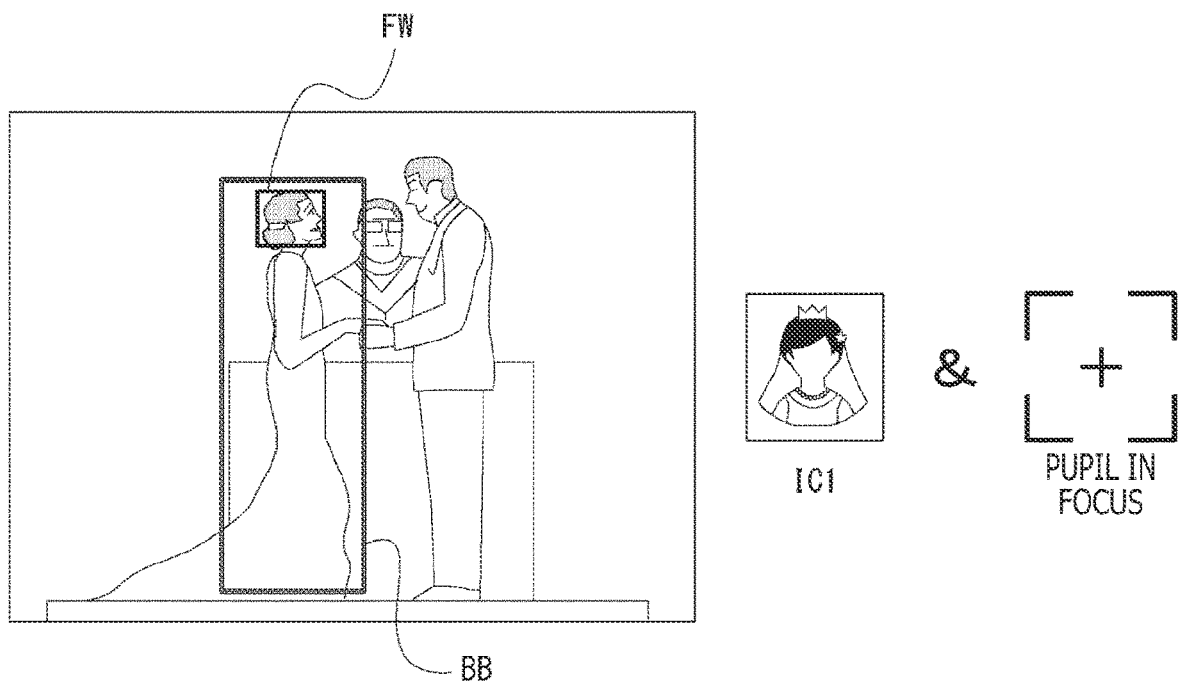
FIG. 63 is an explanatory diagram for narrowing-down of images by the focal position information according to the embodiment.

Example 10: Example Designating Person and State in Focus as Extraction Condition FIG. 63 depicts a case where a condition of a state in focus is added to designation of the icon IC1 indicating the bride. Specifically, images each containing the bride in focus are extracted.

The figure depicts the bounding box BB indicating a range of the body of the bride. Images each containing the focal frame FW located in the bounding box BB are images each containing the bride in focus. Accordingly, images containing the bride can be extracted in reference to analysis result data, and images containing the bride in focus can further be extracted from the extracted images.

As described in the foregoing examples, the UI for extraction which uses focus information included in metadata is only required to enable designation by the user with use of such icons as "pupil in focus" and "in focus," for example.

Figure 64:
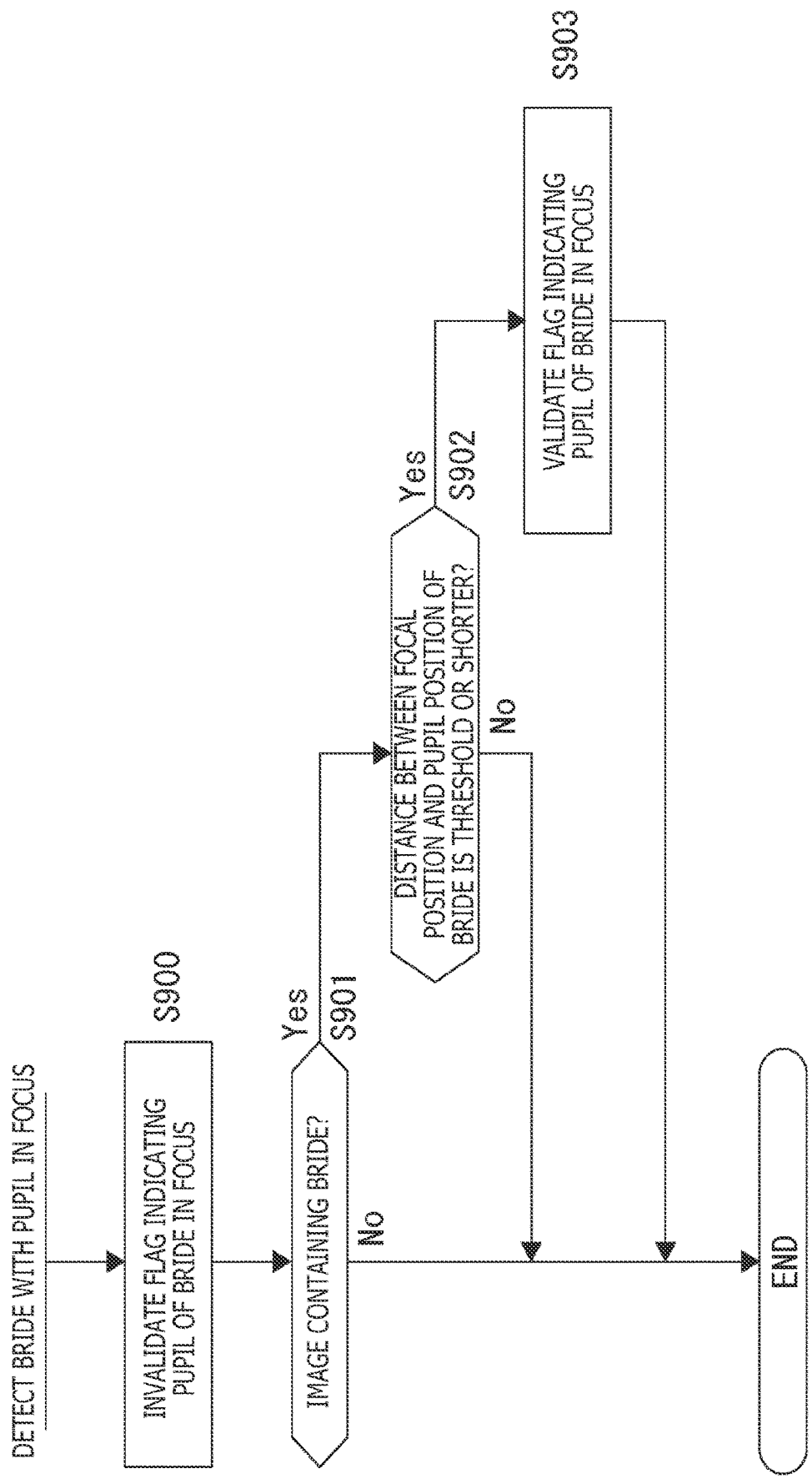
FIG. 64 is a flowchart illustrating detection of an image in which pupils are in focus according to the embodiment.

FIG. 64 presents an example of an extraction process using focus information included in metadata. FIG. 64 is an example of extraction of images each containing the bride whose pupils are in focus as in example 9.

The CPU 71 performs the process presented in FIG. 64 for all targeted images to set, for each image, a flag indicating that the pupils of the bride are in focus.

First, the CPU 71 in step S900 invalidates (initializes) the flag indicating that the pupils of the bride are in focus for one target image.

In step S901, the CPU 71 determines whether or not the corresponding image is an image containing the bride with reference to analysis result data of the image. If the image is not an image containing the bride, the process for the image ends.

In a case of such a determination that the image is an image containing the bride in step S901, the CPU 71 proceeds to step S902 to determine whether or not a distance between the focal position and the pupil position of the bride is a threshold or shorter. Specifically, it is determined whether or not the image is such an image where the two positions are substantially aligned in a state where the pupils are in focus.

In a case where the distance exceeds the threshold, it is considered that the image is not an image containing the pupils in focus. In this case, the process for the image ends.

On the other hand, in a case of such a determination that the focal position and the pupil position of the bride are substantially aligned in the state where the pupils are in focus, the CPU 71 proceeds to step S903 to validate the flag indicating that the pupils of the bride are in focus. Thereafter, the process for the image ends.

Images corresponding to the enabled flag are extracted as images containing the bride with pupils in focus, by performance of the foregoing process for all images of a target image group.

Note that display of the focal frame FW and the pupil frame EP depicted in FIGS. 62 and 63 allows the user to easily recognize the focal position and the focused state, and is also available as a reference for rating setting and image selection at the time of display of images corresponding to an extraction result in the image region 128 of the display unit 1a or 2a.

Example 11: Example Designating Thing and State in Focus as Extraction Condition An example of conditions of "pupil in focus" and "state in focus" will further be presented.

Figure 65:
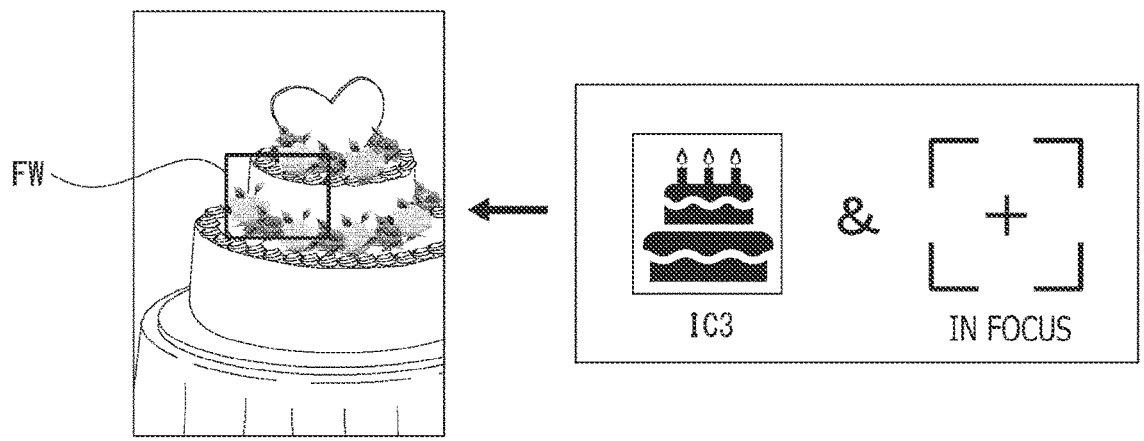
FIG. 65 is an explanatory diagram for extraction of an image in which an object is in focus according to the embodiment.

FIG. 65 depicts a case where a condition of a state in focus is added to designation of the icon IC3 indicating the cake. Specifically, images each containing the cake in focus are extracted.

As depicted in the figure, extractable are images meeting such a condition that the position of the focal frame FW is located at a position recognized as the cake at the time of image analysis.

Figure 66:
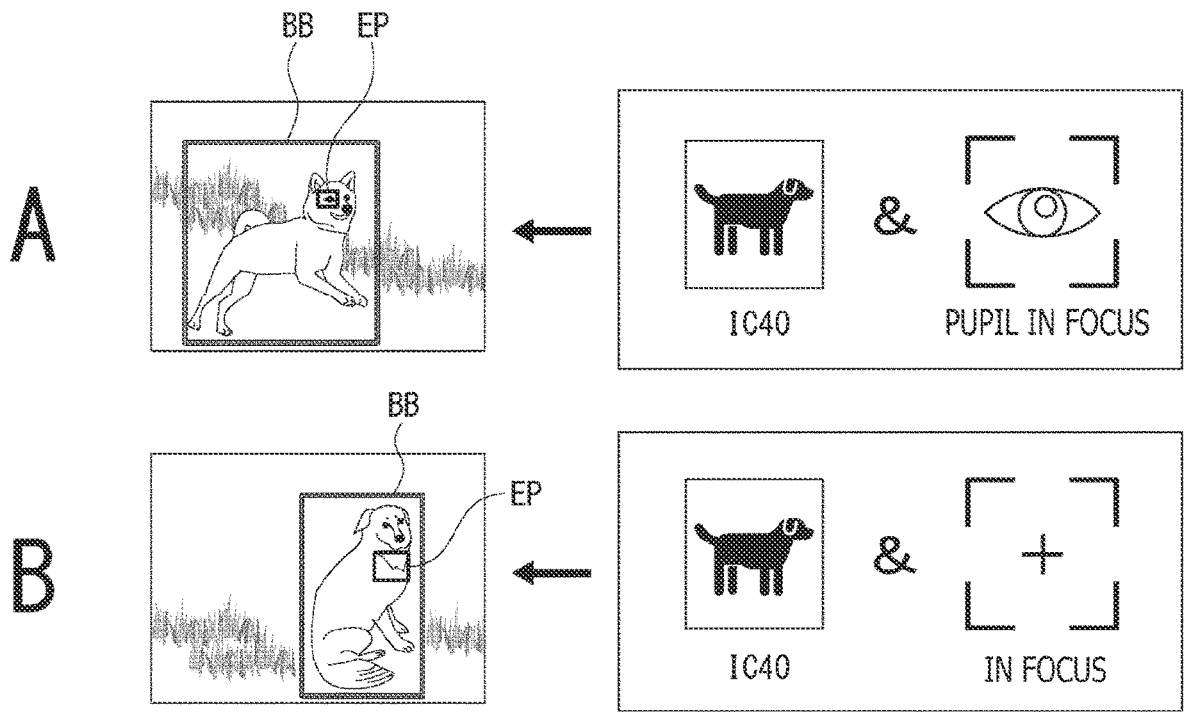
FIG. 66 depicts explanatory diagrams for extraction of images in which animals are in focus according to the embodiment.

Example 12: Example Designating Animal and State in Focus as Extraction Condition FIG. 66A depicts a case where a condition of a pupil in focus is added to designation of an icon IC40 indicating an animal. In this case, extracted are images each containing an animal and the pupil frame EP that indicates the pupil in focus and is located in the bounding box BB of the animal.

FIG. 66B depicts a case where a condition of a state in focus is added to designation of the icon IC40 indicating an animal. In this case, extracted are images each containing an animal and the focal frame FW located in the bounding box BB of the animal.

Figure 67:
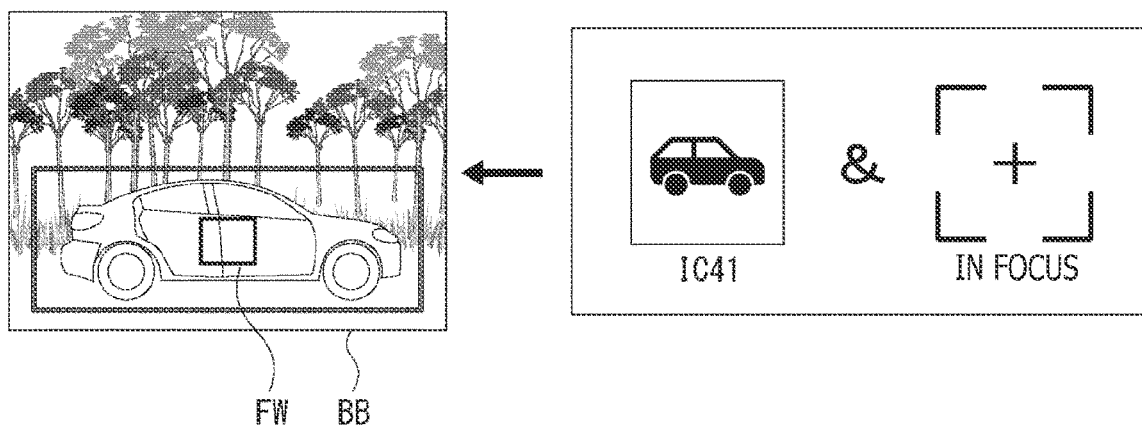
FIG. 67 is an explanatory diagram for extraction of an image in which an extracted object is in focus according to the embodiment.

Example 13: Example Designating Thing and State in Focus as Extraction Condition FIG. 67 depicts a case where a condition of a state in focus is added to designation of an icon IC41 indicating a vehicle. In this case, extracted are images each containing the focal frame FW located in the bounding box BB of a vehicle recognized from the image.

Example 14: Example of Extraction by OR Condition

Described above have been AND conditions as extraction conditions using multiple icons IC and AND conditions using the icons IC and metadata. However, extraction under an OR condition may be applied to expand the range of images to be extracted.

FIG. 68A depicts a case where the icon IC1 indicating the bride and the icon IC2 indicating the bridegroom are designated as OR conditions. Images each containing either the bride or the bridegroom are extracted according to this designation.

Moreover, narrowing down of images may be achieved by combining the OR condition and the AND condition.

FIG. 68B depicts a case where the icon IC1 indicating the bride and the icon IC2 indicating the bridegroom are designated as OR conditions. In addition, the icon IC3 indicating the cake and the icon IC7 indicating a "zoom-out" image are designated as AND conditions.

As a result, images each containing either the bride or the bridegroom, containing the cake, and corresponding to a "zoom-out" image are extracted.

Examples 15-1 and 15-2: Example of Extraction Using Exclusion Condition

An exclusion condition (NOT condition) may also be applied.

FIG. 69A depicts images of an image group corresponding to a processing target and including images of closed eyes.

FIG. 69B depicts a case of designation of the icon IC1 indicating the bride and an icon IC50 indicating closed eyes as an exclusion condition.

In this manner, images each containing the bride, but not the bride with closed eyes are extracted as depicted in FIG. 69C.

Moreover, FIG. 70A depicts images of an image group corresponding to a processing target and including images each containing the cake.

FIG. 70B depicts a case of designation of the icon IC1 indicating the bride and the icon IC2 indicating the bridegroom as AND conditions and designation of the icon IC3 indicating the cake as an exclusion condition.

In this manner, images each containing the bride and the bridegroom but not the cake are extracted as depicted in FIG. 70C.

Such setting of the exclusion condition allows extraction of images other than images not corresponding to targets of rating setting and image selection by the camera staff, and thus improves work efficiency.

Example 16: Registration of Extraction Condition

Meanwhile, the foregoing extraction conditions may be set beforehand, or various extraction conditions may be set in time series.

For example, an extraction condition for extracting cuts assumed by the photographer or the like may be registered beforehand, to quickly extract cuts that constitute a web gallery or the like and are necessary for delivery. Moreover, extraction of images in respective scenes is facilitated by setting extraction conditions in line with a standard flow of a wedding or the like.

FIG. 71 depicts this example.

A condition of the "bride," the "bridegroom," and a "church" is set as condition c1 to extract images in a scene with a background of a church. For example, the icon IC1 indicating the bride, the icon IC2 indicating the bridegroom, and an icon IC51 indicating the church are registered by an operation for designating these icons being performed.

A condition of the "bride," the "bridegroom," and a "pastor" is set as condition c2 to extract images in a scene with a pastor. For example, the condition c2 is registered by an operation designating the icon IC1 indicating the bride, the icon IC2 indicating the bridegroom, and an icon IC52 indicating the pastor.

A condition of the "bride" and a "ring" is set as condition c3 to extract images in a scene of putting a ring on. For example, the condition c3 is registered by an operation designating the icon IC1 indicating the bride and an icon IC53 indicating a ring.

A condition of the "bride," the "bridegroom," and "rice shower" is set as condition c4 to extract images in a scene of the bride and the bridegroom in rice shower. For example, the condition c4 is registered by an operation designating the icon IC1 indicating the bride, the icon IC2 indicating the bridegroom, and an icon IC54 indicating church rice shower.

A condition of the "bride," the "bridegroom," and a "child" is set as condition c5 to extract images in a scene where a child gives flowers to the bride and the bridegroom. For example, the condition c5 is registered by an operation designating the icon IC1 indicating the bride, the icon IC2 indicating the bridegroom, and an icon IC55 indicating the child.

Registration of such conditions in a time series achieves extraction of images meeting the conditions by an extremely easy operation in a time series, and improves efficiency of work performed by the camera staff, such as quick selection of images necessary for delivery.

In addition, images corresponding to such scenes as the "church" and the "rice shower" may be learned beforehand by machine learning, to extract these images.

The extraction conditions may be registered by designation of the icons IC made by the camera staff for each event. Alternatively, extraction conditions for designating typical scenes in a wedding or the like, such as the conditions c1 to c5 described above, may be registered beforehand and selected for each event.

For example, the extraction condition indicating the "bride," the bridegroom," and the "church" is set as a "church scene." Such setting types described above are provided in plural number, and the registered setting types are used for each event. In this manner, efficiency of registration state of the extraction conditions improves for the camera staff.

Example 17: Application to Video

Described above has been the selection speedup assistance process from a viewpoint of selection of still images. This process is also applicable to a video.

FIG. 72 depicts this example.

For example, a video section (in-point to out-point) corresponding to a scene containing the bridegroom and the bride holding the bouquet is extractable by designation of the icon IC1 indicating the bride, the icon IC2 indicating the bridegroom, and the icon IC9 indicating the bouquet.

Moreover, a video section (in-point to out-point) corresponding to a scene of a cake cut is extractable by designation of the icon IC1 indicating the bride, the icon IC2 indicating the bridegroom, and the icon IC3 indicating the cake.

Furthermore, a video section (in-point to out-point) corresponding to a scene of the bride and the bridegroom with friends or the like is extractable by designation of the icon IC1 indicating the bride, the icon IC2 indicating the bridegroom, and the icon IC5 indicating multiple persons.

It is also possible that these extraction conditions of the video are registered beforehand in the manner described above (example 16).

Example 18: Automatic Creation of Highlight Video

It is also possible to automatically extract a scene and create a highlight video by registration of extraction conditions of a video as described above.

FIG. 73 depicts this example. FIG. 73 depicts an example of extraction conditions of a scene similar to the scene in FIG. 72. The CPU 71 extracts video sections of the corresponding scene under these extraction conditions, and automatically creates a highlight video by connecting the video sections according to registration of the extraction conditions.

Figure 74:
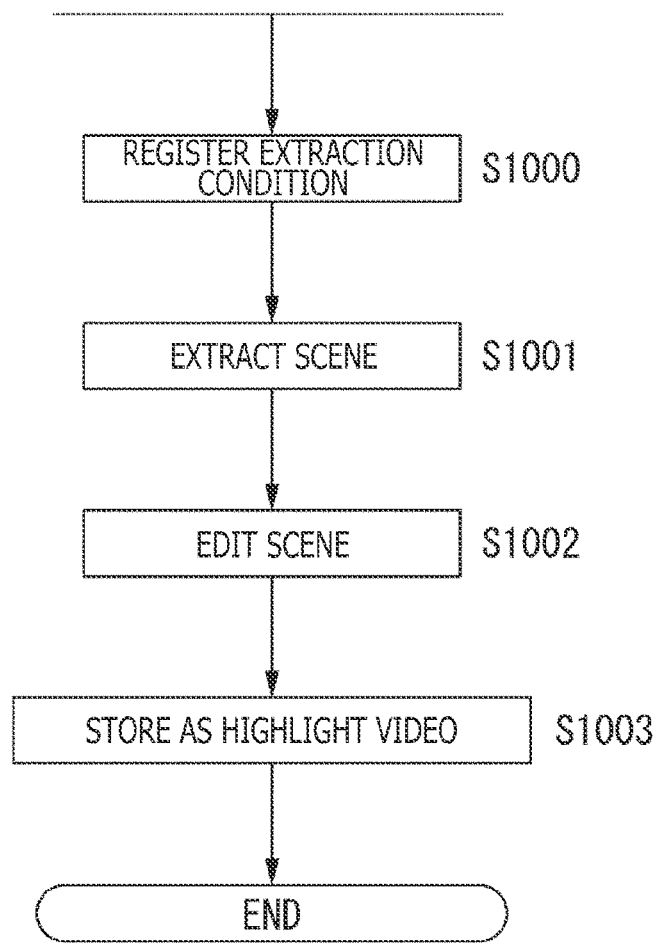
FIG. 74 is a flowchart illustrating a highlight video creation process according to the embodiment.

FIG. 74 presents a highlight video creation process performed by the CPU 71 using the function of the video editing unit 38 in FIG. 39.

In step S1000, the CPU 71 registers one or multiple extraction conditions according to an operation performed by the user.

In step S1001, the CPU 71 extracts a scene meeting the respective extraction conditions thus registered. Specifically, an in-point and an out-point are set to designate a scene meeting the respective extraction conditions.

Various specific methods are adoptable for extraction of video sections. For example, images meeting extraction conditions are searched in units of frame. However, in the case of a video, extraction conditions are not necessarily met by successive frames. For example, there may be a case where the bride is located out of the frame for a moment even in a scene containing the bride. Accordingly, adoptable is such a process which defines an out-point at a time when the condition is not continuously met for a certain number or more of frames, for example.

In step S1002, the CPU 71 edits scenes. Specifically, images from the in-point to the out-point in each of the scenes set in step S1001 are connected to generate a series of videos.

In step S1003, the series of videos thus generated are stored as a highlight video.

The highlight video can automatically be created by the foregoing process, and be viewed and listened to by the camera staff as video content, or provided to the client.

Video editing which typically requires time and labor can be completed only by registration of an extraction condition. Accordingly, highlight video creation is extremely facilitated for the camera staff.

11. Final Confirmation Support for Selection of Delivered Image

Figure 75:
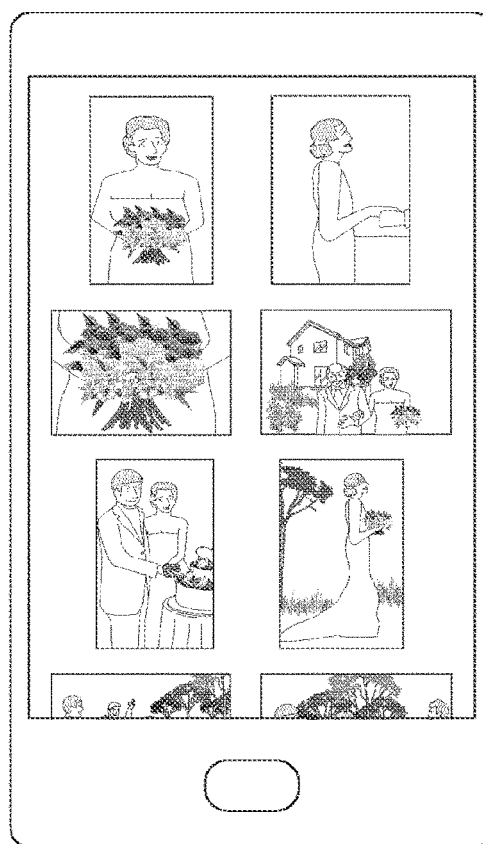
FIG. 75 is an explanatory diagram of a checking screen for an image as delivery candidates according to the embodiment.

For delivered images, the camera staff checks a balance of persons contained in the delivered images, for example, while viewing a simple list of images corresponding to delivery candidates. For example, FIG. 75 depicts a state where a list of images corresponding to delivery candidates is displayed.

Note that the "delivered images" in the embodiment may be either images delivered to constitute a web gallery (images selected as pictures to be included in the web gallery), or images selected for regular delivery.

In addition, the following items are checked while such delivered images are being viewed, for example.

respective attendants associated with the bride and the bridegroom are well-balanced?
the number of group pictures is reasonable?
a ratio of close-up pictures to zoom-out pictures is reasonable?

Filtering of images may be carried out by various elements with use of facial recognition, object recognition, or the like achieved by image analysis, to improve efficiency of this work and facilitate final confirmation.

For example, faces of each person contained in pictures are recognized, and information indicating the number of pictures containing the corresponding person is presented.

Figure 76:
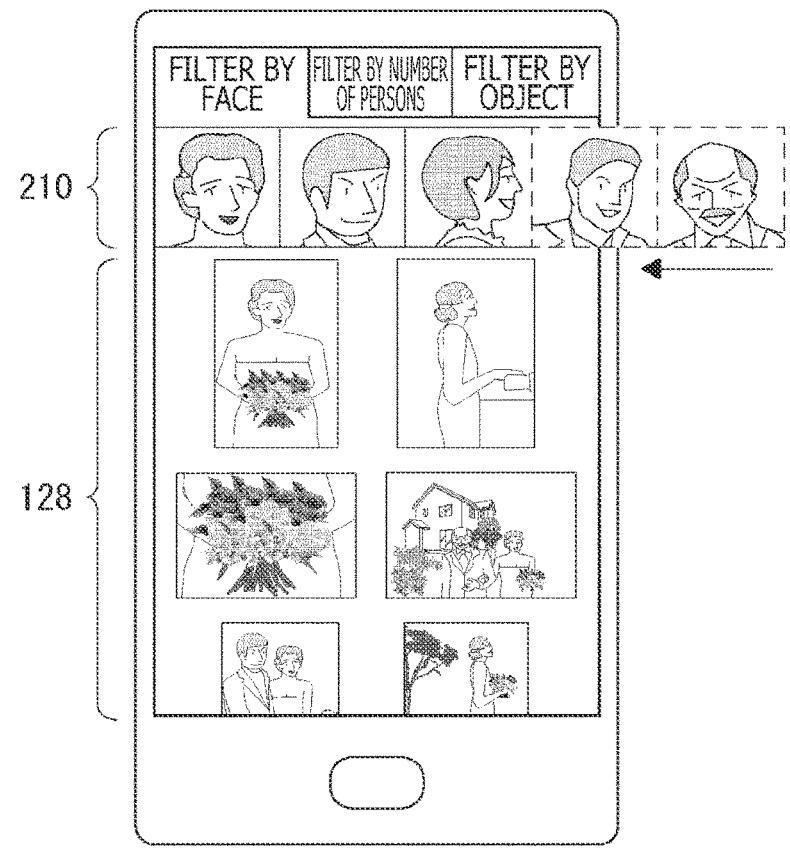
FIG. 76 is an explanatory diagram for filtering using faces according to the embodiment.

FIG. 76 schematically depicts an example of narrowing down of images by faces.

For example, a face selection region 210 is provided in a screen of a tab "filter by face" to select a face image by scrolling. When the camera staff selects any one of face images, images each containing a person corresponding to this face are extracted, and displayed in the image region 128.

This example facilitates checking of whether or not images of respective participants are contained in a balanced manner, for example.

Moreover, narrowing down of images or the like based on more effective information is achievable by setting attributes of the respective persons, such as names and positions in the corresponding event (e.g., bridegroom, bride, friends, and family members in a wedding), beforehand.

Moreover, narrowing down of images is achievable by use of the number of persons contained in images.

For example, images are narrowed down according to whether each image contains a single person, or is a group picture.

For checking delivered images, this example is useful for facilitating confirmation of the presence or absence of a picture containing only one important person, or for checking a person only contained in a group picture.

Furthermore, pictures can be narrowed down by an object contained in each picture.

Delivered images can be checked in terms of whether or not images of important items as an image collection of a wedding or the like, such as a cake and a ring, are contained, for example.

12. Presentation Based on Face Information

A person not imaged can be presented by prior registration of face information associated with attendants. In this manner, a delivery status can be presented during imaging.

The number of pictures containing a corresponding person is countable for each person by detection of faces contained in captured pictures or delivered pictures.

Moreover, such a state where the number of pictures containing parents of the bride is smaller than the number of pictures containing parents of the bridegroom can be checked and made well-balanced.

13. Automatic Selection of Delivered Image

Tags are automatically added to images by analysis of the images.
  person information (bridegroom, bride, bridesmaid, etc.)
  object information (ring, cake, welcome board, etc.)
  scene information (cake cutting, entrance of bride and bridegroom, etc.)
Image selection at the time of delivery can be supported by use of these tags.

Moreover, pictures to be delivered can automatically be selected by a prior definition of a template.
  Examples of this template include the following.
  deliver one picture containing bride and bridegroom entrance
  deliver five pictures containing bridegroom
  deliver eight pictures containing bride
  deliver three pictures containing cake cutting

14. Presentation of Person not Included in Delivered Picture by Use of Face Information or Others At the time of selecting pictures to be delivered from captured pictures, a "person contained in captured pictures but not in any of pictures to be delivered" is detected, and presented as information.

Figure 77:
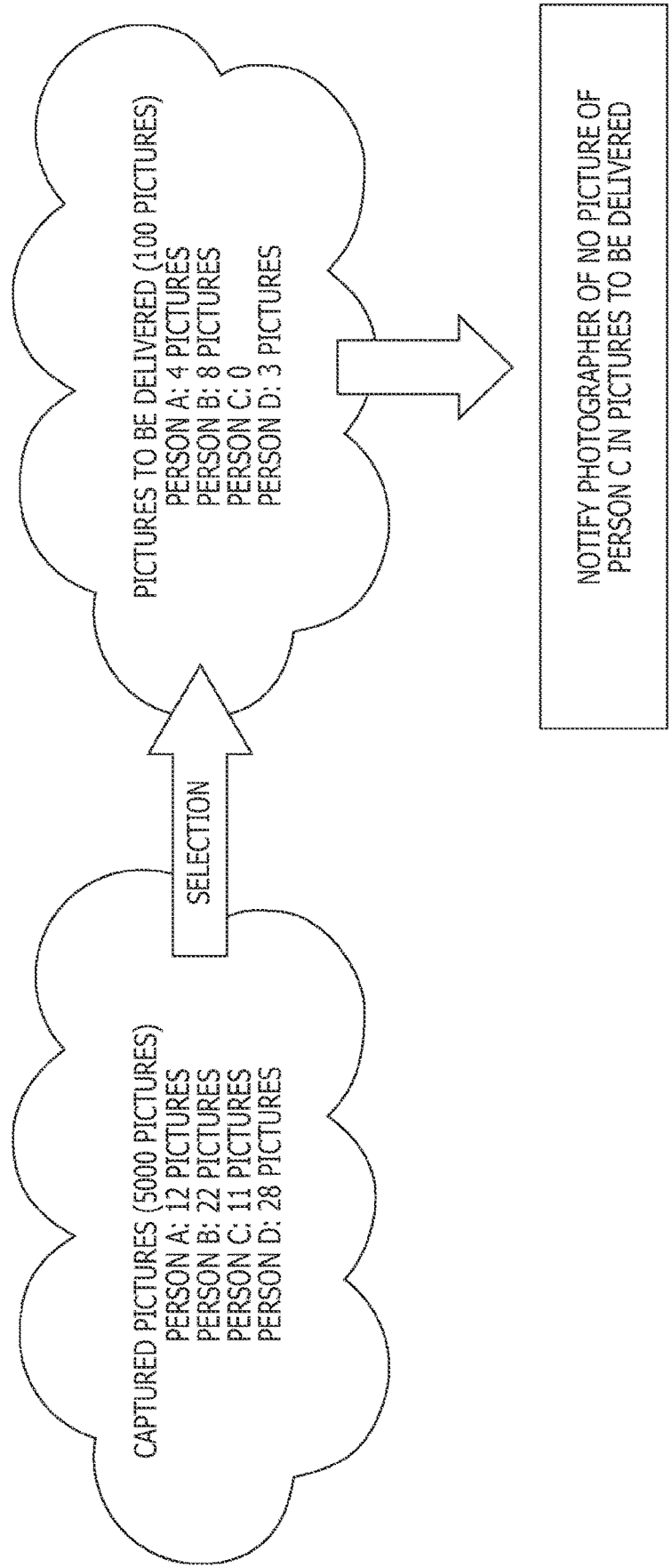
FIG. 77 is an explanatory diagram for presentation of persons not included in delivery images according to the embodiment.

For example, as depicted in FIG. 77, the camera staff is notified of the fact that no picture of a person C is contained in the pictures to be delivered.

15. Imaging Support Using Shot List

A shot list is assumed to be a list considered as plan data for image collection creation, such as the number of images to be included in an image collection and the number of images for each scene, these numbers being set for each of the bride, the bridegroom, families, relatives, and friends, for example.

A list of pictures desired to be taken (shot list) is created by asking the bride beforehand, for example, and input.
  For example, the shot list contains the following contents.
  scene: desiring cake cut scene
  person: desiring picture containing aunt and bride
  thing: cake, ring
Selection is automatically made during a wedding according to the foregoing shot list to pick up pictures to be delivered.

Any cut not captured by the photographer can be recognized by checking this shot list even during imaging.

16. Summary and Modifications

According to the embodiment, the following advantageous effects are offered by the selection speedup assistance process described with reference to FIG. 37 and the following figures.

The information processing device according to the embodiment, i.e., the staff terminal 1, the server device 4, or the imaging device 2, includes the UI control unit 31 that allows designation of an extraction condition for an image group including multiple images captured during an event related to marriage and the extraction processing unit 34 that extracts one or multiple images from the image group under the designated extraction condition.

In a case where a web gallery or an image collection for regular delivery is created using images carefully selected from an image group of an enormous number of images captured during one event associated with a wedding, for example, evaluation of each of these images is needed in the first place. However, this evaluation requires a huge amount of effort and time. Accordingly, a condition specific to a wedding or the like is designated, and image extraction is achieved according to the designated extraction condition. In such a manner, efficiency of work performed by the camera staff improves.

Particularly, work for creating an image collection for an event related to marriage can appropriately be supported by providing an interface capable of classifying image contents of images captured during the event related to marriage.

According to the embodiment described above, the UI control unit 31 performs control for displaying images extracted by the extraction processing unit 34 and providing a user interface allowing an input operation for inputting rating information associated with each of the images.

This configuration allows such an operation which extracts corresponding images according to a person, a scene, or the like that is likely to be included in an image collection, and sets rating information while viewing a list of these images, for example.

Accordingly, work efficiency extremely improves in comparison with a method which inputs rating information while viewing all of captured images one by one. Moreover, rating is set while similar types of images are compared. This advantage is desirable in view of easy standardization of evaluation criteria and appropriate setting of rating enabled by rating setting performed simultaneously with a comparison of similar types of images. Particularly, rating is achievable with collective comparison of similar types of images. Accordingly, appropriate evaluation is easily made. Furthermore, in this manner, desired images are easily selected at the time of selection of images to be included in the image collection in reference to the rating information. Accordingly, the rating information becomes more valuable as information for selection.

According to the embodiment, the extraction processing unit 34 extracts images meeting designated extraction conditions with reference to analysis result data of image contents of each image included in an image group of a certain event.

Whether or not each image meets the extraction conditions can easily be determined with reference to analysis result data that indicates contents of the corresponding image and is associated with such images by image analysis.

According to the embodiment presented by way of example, analysis result data is received from an external device, such as the server device 4.

This enables analysis result data indicating contents of each image to be obtained without a need for image analysis which imposes a relatively large load on the device used as the staff terminal 1 or the imaging device 2, for example.

According to the embodiment, the UI control unit 31 performs control for displaying the icons IC each presenting an extraction condition for images of an image group, and detecting an operation of any of the icons IC as a designation operation for designating the extraction condition.

The icons IC allow easy presentation of the extraction conditions for images of an event associated with a wedding and easy designation of the extraction conditions.

According to the above description, the icons IC are preferably set according to an analysis result of each image. For example, in a case where an image recognition result indicating a "bride" and a "bouquet" is obtained for a certain image, the icon IC1 indicating the bride and the icon IC9 indicating the bouquet are provided. Icons necessary for image extraction from a targeted image group can be provided by provision of icons corresponding to analysis results of all images corresponding to an analysis target.

In other words, this also means that icons unnecessary for the targeted image group need not be displayed. For example, in a case where no image containing a "cake" is included in an image group of a certain event, the icon IC3 for the cake is not displayed, making it possible to avoid useless execution of extraction.

According to the embodiment described by way of example, the UI control unit 31 displays the icon IC corresponding to an operation target for designating an extraction condition in a display mode different from a display mode of the icons IC each not corresponding to an operation target for designation.

For example, the icon IC operated for designation is distinguished from the other icons IC by the color of the operated icon or the color of the frame being changed or by highlight display being used.

This display allowing identification of the icon designated as the extraction condition clearly presents the extraction condition itself to the user. Accordingly, the type of the extracted image is easily recognizable.

Moreover, the icons (conditions) already designated are easily recognizable when extraction conditions are combined. In addition, a combination state of the conditions is recognizable at a glance.

Furthermore, the designated icon is displayed such that the designated state is recognizable together with a list of extracted images. Accordingly, in which condition or in which combination the extracted image is obtained is also easily recognizable.

According to the embodiment, an extraction condition includes a condition for designating a person. For example, an extraction condition can designate a bride, a bridegroom, relatives (e.g., parents and brothers and sisters), friends, guests of honor, and the like.

What should be considered most important for an image collection of an event related to marriage is to appropriately feature persons as participants, mainly the bride and the bridegroom. Accordingly, it is appropriate to prepare an extraction condition such that images can be extracted by persons in view of assistance for image collection creation.

According to the embodiment, an extraction condition includes a condition allowing designation of a scene of an event related to marriage.

For example, an extraction condition allowing designation of a scene itself such as a "cake cut," a "ring exchange," and a "bouquet toss," an extraction condition assuming a certain scene such as a "cake" and a "ring," and an extraction condition allowing specification of a scene by, for example, time designation for designating a time corresponding to a scene are prepared. This leads to easy extraction of an image of a specific scene. This advantage is useful in a case where rating or the like is given to a large number of images in the corresponding scene, for example.

According to the embodiment, an extraction condition includes a condition allowing designation of time information associated with an event related to marriage.

For example, an image of a specific scene can be extracted by designation of a time or the like corresponding to a scene such as a "cake cut," a "ring exchange," and a "bouquet toss." This advantage is useful in a case where rating or the like is given to an image of a specific scene, for example.

According to the embodiment, an extraction condition includes a condition for designating a thing or an animal corresponding to an object to be imaged.

For example, a condition for designating an article likely to become an object to be imaged during an event related to marriage, such as a cake, a candle, a ring, a pet, and a glass, is prepared.

Designation of an article is often appropriate for extraction of similar images from images of an event related to marriage. Similar images can easily be extracted according to the extraction condition prepared for designating a thing. This advantage is useful for rating and selecting images.

According to the embodiment, an extraction condition includes a condition for designating an emotion or a facial expression of an object to be imaged.

For example, a condition for designating a smiling scene, an emotional scene, a crying scene, a downcast-eye scene, or the like is prepared.

It is appropriate to select images richer in emotion and increase rating to represent emotions of participants in view of creation of an image collection of an event related to marriage. The extraction condition prepared for extracting images as a recognition result of an emotion and a facial expression, such as a smiling scene, is useful for rating and selecting images.

According to the embodiment presented by way of example, information indicating a degree of an emotion or a facial expression of an object to be imaged is presented for images extracted by the extraction processing unit 34.

As described with reference to FIG. 56, display of a numerical value or the like obtained as a result of recognition of an emotion or a facial expression for an image extracted by a certain extraction condition is useful as a reference for rating or selection and assistance for creating an image collection. While the example indicating the degree of smiling is presented in FIG. 56, assumed to be displayed is a degree of an analysis result of an emotion or a facial expression for an image, such as a degree of a crying face, a degree of an amazed face, a degree of casted eyes, and a degree of pleasure.

According to the embodiment, an extraction condition includes a condition allowing designation of an item determined by metadata added during imaging.

For example, a condition allowing determination by the imaging device during imaging with reference to metadata associated with images, such as information associated with focusing, can be designated (see FIGS. 62 to 67).

For example, an image containing a bride whose pupils are in focus is extractable by designation of metadata added during imaging, such as information indicating a focal position of focusing achieved by control such as face focusing and pupil focusing, as one of the extraction conditions. Extraction of only images in focus is achievable as well as images selected by contents, for example, by adding an imaging state to the extraction condition. This advantage is appropriate in view of extraction of images corresponding to candidates to be included in an image collection from a large number of images.

According to the embodiment presented by way of example, information indicating "pupil in focus" and "in focus" is applied as an example using metadata. However, needless to say, other metadata is available. For example, in a case where information such as an F-number, an ISO-number, a shutter speed, and a zoom magnification is included in metadata, images may be narrowed down under extraction conditions including these.

According to the embodiment presented by way of example, a focal position is presented for an image extracted by the extraction processing unit 34.

As described with reference to FIGS. 62 and 63, a position or a region in focus, or an image indicating information associated with these is superimposed and displayed as the focal frame FW, the pupil frame EP, the bounding box BB, or the like. In this manner, the camera staff can achieve appropriate selection or rating of images with reference to the superimposed information.

According to the embodiment described by way of example, control is performed for displaying the icons IC each indicating an extraction condition in the candidate region AR1 in the display screen and the icons IC designated by a predetermined operation in the selection region AR2 in the display screen.

A list of the icons IC allowed to be designated is displayed in the candidate region AR1, and the icons IC each corresponding to a target of a designation operation are displayed in the selection region AR2. Accordingly, the user can constantly recognize the icons IC currently being selected. This display increases recognizability and operability in a case where multiple icons IC (extraction conditions) are desired to be combined and used for image extraction.

Particularly, in the case of the display unit (1a, 2a) as a relatively small unit included in a small-sized device such as the staff terminal 1 and the imaging device 2, preferable visibility and recognition of a selection state are offered for the camera staff by an indication of whether or not the icons IC are currently being selected by the region where the icons IC are displayed, rather than by a change of the display mode of the icons IC.

As described in the examples with reference to FIGS. 57, 58, 59, and 60, the selection state can be clearly presented by arrangement of the candidate region AR1 and the selection region AR2 adjacent to each other in the up-down direction (or left-right direction) and display of the icons in the selection region AR2 according to an operation.

Moreover, the selection state can be clearly presented by the icons being shifted from the candidate region AR1 to the selection region AR2 according to an operation.

Furthermore, a large number of icons can be displayed in the candidate region AR1 by scroll display even in a small-sized display screen.

The case of the shift from the candidate region AR1 to the selection region AR2 is useful in view of prevention of selection and operation of identical icons, and facilitation of selection using the cursor K with reduction of the number of icons corresponding to a scroll target in the candidate region AR1.

According to the embodiment described by way of example, control is performed to end display of the icons displayed in the selection region AR2 according to a predetermined selection cancelling operation.

Specifically, the user is allowed to perform an operation for returning the icons located in the selection region to the candidate region. In this manner, selection of the icon IC (extraction condition) once selected as the extraction condition can be cancelled. The camera staff is allowed to flexibly perform an icon operation for appropriately setting a condition necessary for image extraction.

In the case of the shift of the icon IC designated in the candidate region AR1 to the selection region AR2, the icon IC may be returned to the candidate region AR1 according to a predetermined selection cancellation operation. In this manner, the selection state becomes easily recognizable.

According to the embodiment described by way of example, the extraction processing unit 34 sets an AND condition, an OR condition, or an exclusion condition for each of multiple designated extraction conditions, to extract images.

In this manner, the camera staff is allowed to set a condition expression by combining the AND condition, the OR condition, or the exclusion condition to designate an extraction condition for multiple extraction conditions set for an event related to marriage, and designate the set condition as an extraction condition. Accordingly, desired images can be extracted in a more appropriate manner.

According to the embodiment presented by way of example, the video editing unit 38 is provided to create video content with use of multiple video scenes extracted by the extraction processing unit 34 under an extraction condition.

As described with reference to FIGS. 72 to 74, the extraction process based on an extraction condition is also applicable to scene extraction for producing a video. In that case, video content as a highlight video is created by connecting extracted scenes. The camera staff is allowed to easily achieve video creation by selection of an extraction condition. This advantage is preferable for swift creation of a highlight video.

According to the processes according to the above embodiment described with reference to FIGS. 1 to 36, advantageous effects described below are offered.

The staff terminal 1 according to the embodiment includes the event data management unit 30 which stores image data received via communication with the imaging device 2 and metadata (additional information) containing at least rating information corresponding to the image data, both as the event data 60 associated with a specific event, and updates the event data 60 according to operation input. Moreover, the staff terminal 1 has the UI control unit 31 which controls presentation of the images and the rating information associated with the event data 60 of the specific event as a project target, and detects the operation input. The staff terminal 1 further includes the communication control unit 32 which controls communication with the server device 4 disposed outside for synchronization between the event data 60 and the event data 90 according to storage or update of the event data 60.

Accordingly, the information processing device 10 as the staff terminal 1 performs an event data management process which includes a process for storing the image data received via communication with the imaging device 2 and the additional information containing at least the rating information corresponding to the image data, both as the event data associated with the specific event, and an update process for updating the event data according to operation input, a UI control process which controls presentation of the images and the rating information associated with the event data of the specific event, and detects the operation input; and a communication control process which controls communication with the server device disposed outside for synchronization of the event data, according to storage or update of the event data.

The staff terminal 1 thus configured is capable of managing the images and the metadata sequentially transferred from the imaging device 2, as the event data of the specific event, and presenting these images and metadata to the camera staff in a list form, for example. Accordingly, the camera staff is capable of checking images constituting an image collection, such as a web gallery, by using the staff terminal 1.

Moreover, the rating information given to each of the images by the photographer using the imaging device 2 is also displayed as the rating icon 130 at this time. Accordingly, this rating information can support the camera staff such as the photographer himself or herself and the assistant at the time of selection of images to be included in the image collection.

Further, communication is performed to maintain a state of synchronization between the event data 60 of the staff terminal 1 and the event data 90 of the server device 4. Thus, even in a case where the assistant operates the terminal device 1B after the photographer completes such an operation as selection by using the terminal device 1A, for example, with the terminal device 1B having logged in to the server device 4, the terminal device 1A is allowed to be operated in a state where synchronized latest event data contents are reflected. Accordingly, creation of the image collection is efficiently executable.

While the imaging device 2 and the staff terminal 1 have been presented as separate components, it is also possible that the imaging device 2 and the terminal device 1A of the staff terminal 1 are integrated into one device, for example.

According to the embodiment, the event data management unit 30 acquires event data of a specific event from the server device 4 in response to selection of the specific event (see step S204 in FIG. 12).

The event data of the server device 4 is synchronized through communication from the staff terminal 1. Accordingly, the event data of the server device 4 is the latest event data. When an application program is started in the staff terminal 1, a list of events is displayed. In a case where the user selects an event, latest event data can be acquired by first loading event data from the server device 4 side. Needless to say, the rating information is the latest information. For example, even in a case where the assistant uses the terminal device 1B, the assistant can check latest rating reflecting previous setting or change of rating made by the photographer with the imaging device 2 or the staff terminal 1.

According to the embodiment, the event data 60 contains the prior setting information 61. The UI control unit 31 displays images of image data contained in the event data 60 by using editing image data edited with reference to editing information contained in the prior setting information (see step S250 in FIG. 15).

Each of images captured and imported can be automatically edited and displayed by setting such editing information as retouch parameters as the prior setting information 61. This method is effective in a case where a unified atmosphere is to be given to each image in a web gallery or the like.

Moreover, automatic editing eliminates the necessity of performing a similar editing operation for individual images, and hence considerably facilitates work performed by the camera staff.

According to the embodiment, the UI control unit 31 performs control for providing a user interface allowing an editing information input operation for image data contained in the event data 60. The event data management unit 30 performs a process for updating the event data according to the editing information input operation (see step S251 and step S260 to step S267 in FIG. 15).

In the configuration allowing input of such editing information as retouch parameters, the camera staff is enabled to edit individual images in any manner, for example.

Particularly, by editing the respective images in correspondence with the retouch parameters of prior setting, fine adjustment and an atmosphere change for the respective images are achievable after setting a common tone for the respective images, for example.

According to the embodiment, the UI control unit 31 performs control for providing a user interface allowing an input operation for inputting rating information associated with image data contained in the event data 60. The event data management unit 30 performs a process for updating the event data according to the input operation for inputting the rating information (see steps S217, S230, and S231 in FIG. 14, steps S255, S282, and step S283 in FIG. 16, and others).

For example, in the configuration allowing input of the rating information, the camera staff is enabled to change rating set by the camera staff for the individual images during imaging, in any manner later, for example. More appropriate selection may be achievable by reviewing images and resetting rating after the end of the wedding, for example.

According to the embodiment, the UI control unit 31 performs control for providing a user interface allowing a setting operation for setting selection information for selective use of the image data contained in the event data 60 and creation of an image collection. The event data management unit 30 performs a process for updating the event data according to the setting operation for setting the selection information (see steps S218, S219, and S232 to S237 in FIG. 14, steps S256, S284, and S285 in FIG. 16, steps S301, S302, S310, S311, S320, and S321 in FIG. 17, and others).

By setting the selection information, an intention of the camera staff concerning the image collection can be added to the event data 60. In this case, such an image collection reflecting the intention of the camera staff can be created at the time of automatic creation of a web gallery by the server device 4 in reference to the synchronized event data 90. Accordingly, a web gallery reflecting the creation intention of the camera staff can be presented to the client extremely promptly.

According to the embodiment, the selection information contains the use image information indicating selection as images included in the image collection.

Specifically, a flag can be set as use image information indicating which images are to be included in the web gallery. The camera staff can easily set images to be included by switching between on and off of the flag.

According to the embodiment, the selection information contains cover image information indicating selection as a cover image of the image collection.

Specifically, a cover image can be set as selection information indicating which image is to be adopted as a cover of the web gallery. The camera staff can easily set an image to be adopted as a cover by setting the cover image.

According to the embodiment, the selection information contains emphasis display image information indicating selection as an image to be displayed with emphasis in the image collection.

Specifically, an image to be displayed with emphasis such as a larger size than sizes of other images in the web gallery can be selected by highlight setting. The camera staff is enabled to select an image to be emphasized by highlight setting. Moreover, a web gallery created with highlight setting constitutes an image collection which has been created automatically but is not monotonous.

Note that the server device 4 may be configured to create a web gallery which displays images with highlight for which highlight setting has not been made.

Further, highlight setting is not limited to a size increase, and also includes emphasis display using luminance, color, or frame display, for example.

In the example according to the embodiment described above, the staff terminal 1 includes the automatic setting unit 33 which performs a process for automatically setting selection information in reference to tendency information generated in reference to previous selection information associated with the camera staff.

Tendency information indicating which images are to be adopted, which images are to be designated as cover images, and which images are to be designated as highlight images is set by learning previous selection setting. Specifically, characteristic points of such images as images likely to be designated as flag-on images, images likely to be designated as highlight setting images, and images likely to be designated as cover images are analyzed and provided as tendency information. Automatically providing selection setting with use of this tendency information facilitates, to some extent, the work performed by the corresponding camera staff.

Needless to say, the camera staff is allowed to provide manual setting after the automatic selection setting. Accordingly, an image collection further reflecting the intention of the camera staff can be created.

In addition, automatic setting of the selection information may be performed on the server device 4 side, and event data reflecting this automatic setting may be supplied to the staff terminal 1.

Moreover, while the tendency information is generated on the server device 4 side according to the above description, the staff terminal 1 may include a tendency information generation unit to generate tendency information.

In the example according to the embodiment described above, the staff terminal 1 includes the automatic setting unit 33 which performs a process for automatically setting selection information in reference to tendency information generated according to preference of the client user.

The tendency information is generated by learning a tendency of preferred images of the client and analyzing characteristic points of the preferred images. Automatically providing selection setting with use of this tendency information enables easy creation of an image collection agreeing with the tendency of the client to some extent.

In addition, automatic setting of the selection information may be performed on the server device 4 side, and event data reflecting this automatic setting may be supplied to the staff terminal 1.

Moreover, while the tendency information is generated on the server device 4 side according to the above description, the staff terminal 1 may include a tendency information generation unit to generate tendency information.

The server device 4 according to the embodiment includes the event data management unit 40 which stores the event data 90 containing image data and rating information corresponding to the image data and manages update, in response to reception of information associated with a specific event from the staff terminal 1.

The server device 4 adds and updates the event data 90 such that the image data and the rating information transmitted from the staff terminal 1 can be reflected in the event data 90 of the specific event. Thus, the event data 90 synchronized with the images and the rating information of the event data 60 on the staff terminal 1 side can be stored. Particularly, the rating information is changeable in any manner on the staff terminal 1 side. This change can be reflected in the event data 90 of the server device 4 to retain the latest event data 90.

While the server device 4 receives the image data and the rating information corresponding to the image data from the staff terminal 1 in the above description, the server device 4 may receive transmission of metadata (additional information) containing the image data and the rating information corresponding to the image data directly from the imaging device 2.

The server device 4 according to the embodiment includes the event data supply control unit 42 which causes transmission for supply of event data to the staff terminal 1 to be performed.

The event data of the server device 4 is synchronized with the event data of the staff terminal 1 through communication from the staff terminal 1. Accordingly, the event data of the server device 4 is the latest event data. Display based on the latest event data is executable by supply of the event data to the staff terminal 1 in a case where an event is selected after a start of an application program in the staff terminal 1. Accordingly, the photographer and the assistant can perform various types of works in a latest state by using the staff terminal 1.

The event data management unit 40 of the server device 4 according to the embodiment stores and manages update of the event data 90 containing selection information or editing information corresponding to image data, in response to reception of information associated with a specific event from the staff terminal 1.

The server device 4 side also updates the event data in response to reception of editing information, such as retouch parameters, and selection information associated with flags, a cover, and highlights. As a result, a synchronous state with the event data of the staff terminal 1 can be maintained.

The server device 4 according to the embodiment includes the image collection creation unit 41 which creates a web gallery corresponding to image collection data associated with a specific event by using selection information and editing information.

The event data 60 and the event data 90 are synchronized with each other on the server device 4 side and the staff terminal 1 side. Accordingly, an image collection (web gallery) reflecting an intention of the camera staff who uses the staff terminal 1 can be created with reference to the edition information and the selection information included in the event data 90 on the server device 4 side.

Moreover, creation of the image collection on the server device 4 side can reduce a processing load imposed on the staff terminal 1 which is a terminal device having a small volume of resources.

According to the embodiment, selection information contained in the event data 90 on the server device 4 side includes use image information indicating selection as images to be included in the image collection.

Thus, an image collection (web gallery) including images selected by the camera staff who uses the staff terminal 1 can be created with reference to the selection information.

According to the embodiment, the selection information contained in the event data 90 on the server device 4 side includes cover image information indicating selection as a cover image of the image collection.

Thus, an image collection (web gallery) designating a cover image selected by the camera staff who uses the staff terminal 1 as a cover can be created with reference to the selection information.

According to the embodiment, the selection information contained in the event data 90 on the server device 4 side includes emphasis display image information indicating selection as an image to be displayed with emphasis in the image collection.

Thus, an image collection (web gallery) containing emphasized highlight images selected by the camera staff who uses the staff terminal 1 can be created with reference to the selection information.

The server device 4 according to the embodiment includes the data output unit 43 which transmits all or a part of the event data 90 to the terminal device (personal computer 3 or staff terminal 1) as a file in a predetermined format.

Accordingly, for example, the camera staff side can efficiently acquire materials of an image collection for regular delivery by using the personal computer 3 or the staff terminal 1, and easily create an image collection for regular delivery by performing necessary editing or the like.

According to the embodiment, while an image file received from the imaging device 2 is transferred to the staff terminal 1 and uploaded from the staff terminal 1 to the server device 4, the image file may be directly uploaded from the imaging device 2 to the server device 4.

According to the embodiment described above, creation of an image collection of still images is assumed. However, the image collection may contain a video as a part of content, or may include multiple videos. In these cases, the processes described in the embodiment are similarly applicable.

The video in this case may be either a video with sounds, or a video containing only image information without sounds.

A program according to the embodiment is a program which causes a CPU, a DSP, or the like, or a device including these, for example, to execute the processes presented in FIGS. 42 to 45 and FIG. 74.

Specifically, the program according to the embodiment causes the information processing device constituting the staff terminal 1, the server device 4, or the imaging device 2 to execute a control process which provides a user interface that allows a designation operation for designating an extraction condition for an image group of images captured at an event related to marriage and an extraction process which extracts an image from the image group according to the designated extraction condition.

Such a program allows the staff terminal 1 or the server device 4 performing the above selection speedup assistance process to be implemented in a different apparatus capable of executing information processing, such as a portable terminal device and a personal computer. Alternatively, the selection speedup assistance process can be executed by the imaging device 2.

The program described above for implementing the staff terminal 1, the server device 4, or the imaging device 2 may be recorded in advance in an HDD as a built-in recording medium of a device such as a computer device, a ROM in a microcomputer having a CPU, or the like.

Alternatively, the program may be stored (recorded) temporarily or permanently in a removable recording medium such as a flexible disk, a CD-ROM (Compact Disc Read Only Memory), an MO (Magneto Optical) disk, a DVD (Digital Versatile Disc), a Blu-ray disc (Blu-ray Disc (registered trademark)), a magnetic disk, a semiconductor memory, and a memory card. Such a removable recording medium may be provided as what is generally called package software.

Moreover, the program described above may be installed in a personal computer or the like from the removable recording medium, or may be downloaded via such a network as a LAN (Local Area Network) and the Internet from a download site.

Furthermore, the program described above is applicable to a wide range of supply of the staff terminal 1, the server device 4, or the imaging device according to the embodiment. For example, the program may be downloaded to a portable terminal device such as a smartphone and a tablet, a cellular phone, a personal computer, a still camera, a video camera, a game console, a video device, and a PDA (Personal Digital Assistant) to allow the smartphone or the like to function as the staff terminal 1, the server device 4, or the imaging device 2 of the present disclosure.

Note that the advantageous effects described in the present description are presented only by way of example. Advantageous effects to be produced are not limited to these examples, and may include other advantageous effects.

Note that the present technology may also have the following configurations.

(1)

An information processing device including:
a user interface control unit that performs control for providing a user interface that allows a designation operation for designating an extraction condition for an image group of images captured at an event related to marriage; and
an extraction processing unit that extracts an image from the image group according to the designated extraction condition.

(2)

The information processing device according to (1) described above, in which the user interface control unit performs control for displaying the image extracted by the extraction processing unit and providing a user interface that allows an input operation for inputting rating information associated with each of the images.

(3)

The information processing device according to (1) or (2) described above, in which the extraction processing unit extracts an image meeting the designated extraction condition with reference to analysis result data of image contents of the respective images included in the image group.

(4)

The information processing device according to (3) described above, in which the analysis result data is received from an external device.

(5)

The information processing device according to any one of (1) to (4) described above, in which the user interface control unit performs control for displaying an icon that indicates the extraction condition for the images of the image group, to detect an operation for the icon as a designation operation for designating the extraction condition.

(6)
The information processing device according to (5) described above, in which the user interface control unit displays the icon corresponding to an operation target for designating the extraction condition in a display mode different from a display mode of an icon not corresponding to the operation target for the designation.

(7)
The information processing device according to any one of (1) to (6) described above, in which the extraction condition includes a condition for designating a person.

(8)
The information processing device according to any one of (1) to (7) described above, in which the extraction condition includes a condition allowing designation of a scene of the event related to marriage.

(9)
The information processing device according to any one of (1) to (8) described above, in which the extraction condition includes a condition allowing designation of time information for the event related to marriage.

(10)
The information processing device according to any one of (1) to (9) describe above, in which the extraction condition includes a condition allowing designation of a thing or an animal corresponding to an object to be imaged.

(11)
The information processing device according to any one of (1) to (10) described above, in which the extraction condition includes a condition allowing designation of an emotion or a facial expression of an object to be imaged.

(12)
The information processing device according to any one of (1) to (11) described above, in which the user interface control unit presents information indicating a degree of an emotion or a facial expression of an object to be imaged for the image extracted by the extraction processing unit.

(13)
The information processing device according to any one of (1) to (12) described above, in which, as the extraction condition, a condition allowing designation of an item determined in reference to metadata added during imaging is included.

(14)
The information processing device according to any one of (1) to (13) described above, in which the user interface control unit presents a focal position of the image extracted by the extraction processing unit.

(15)
The information processing device according to any one of (1) to (14) described above, in which the user interface control unit performs control for displaying an icon of the extraction condition in a candidate region in a display screen and displaying an icon designated by a predetermined operation in a selection region in the display screen.

(16)
The information processing device according to (15) described above, in which the user interface control unit performs control for ending display of the icon displayed in the selection region, according to a predetermined selection cancelling operation.

(17)
The information processing device according to any one of (1) to (16) described above, in which an AND condition, an OR condition, or an exclusion condition is set for each of multiple designated extraction conditions to extract an image.

(18)
The information processing device according to any one of (1) to (17) described above, further including: a video editing unit that creates video content by using multiple video scenes extracted by the extraction processing unit according to the extraction condition.

(19)
An information processing method performed by an information processing device, the method including: a control process that provides a user interface that allows a designation operation for designating an extraction condition for an image group of images captured at an event related to marriage; and an extraction process that extracts an image from the image group according to the designated extraction condition.

(20)
A program causing an information processing device to execute:
a control process that provides a user interface that allows a designation operation for designating an extraction condition for an image group of images captured at an event related to marriage; and
an extraction process that extracts an image from the image group according to the designated extraction condition.

REFERENCE SIGNS LIST

1: Staff terminal
1a: Display unit
2: Imaging device
2a: Display unit
2c: Cross-key
2d: Wheel
3: Personal computer
4: Server device
5: Client terminal
6: Network
10: Information processing device
30: Event data management unit
31: UI control unit
32: Communication control unit
33: Automatic setting unit
34: Extraction processing unit
35: Rating information management unit
36: Analysis result data reception unit
37: Analysis unit
38: Video editing unit
71: CPU
200: Icon region
201: Emotion and facial expression recognition level
202: Time designation frame
210: Face selection region
AR1: Candidate region
AR2: Selection region

The invention claimed is:
1. An information processing device comprising:
a memory storing program code, and
a processor configured to execute the program code to perform operations comprising:
providing a user interface that allows a designation operation for designating an extraction condition for an image group of images captured at an event related to marriage;

extracting an image from the image group according to the designated extraction condition;

displaying a first icon that indicates the extraction condition for the images of the image group, to detect an operation for the first icon as a designation operation for designating the extraction condition; and displaying the first icon corresponding to an operation target for designating the extraction condition in a first display mode that is different from a second display mode of a second icon not corresponding to the operation target for the designation.

2. The information processing device according to claim 1, wherein the operations further comprise:
displaying the extracted image and providing a user interface that allows an input operation for inputting rating information associated with each of the images.

3. The information processing device according to claim 1, wherein the operations further comprise:
extracting an image meeting the designated extraction condition with reference to analysis result data of image contents of the respective images included in the image group.

4. The information processing device according to claim 3, wherein the analysis result data is received from an external device.

5. The information processing device according to claim 1, wherein the extraction condition includes a condition for designating a person.

6. The information processing device according to claim 1, wherein the extraction condition includes a condition allowing designation of a scene of the event related to marriage.

7. The information processing device according to claim 1, wherein the extraction condition includes a condition allowing designation of time information for the event related to marriage.

8. The information processing device according to claim 1, wherein the extraction condition includes a condition allowing designation of a thing or an animal corresponding to an object to be imaged.

9. The information processing device according to claim 1, wherein the extraction condition includes a condition allowing designation of an emotion or a facial expression of an object to be imaged.

10. The information processing device according to claim 1, wherein the operations further comprise:
presenting information indicating a degree of an emotion or a facial expression of an object to be imaged for the extracted image.

11. The information processing device according to claim 1, wherein, as the extraction condition, a condition allowing designation of an item determined in reference to metadata added during imaging is included.

12. The information processing device according to claim 1, wherein the operations further comprise:
performing control for displaying the first icon in a candidate region in a display screen and displaying the second icon in a selection region in the display screen.

13. The information processing device according to claim 1, wherein an AND condition, an OR condition, or an exclusion condition is set for each of multiple designated extraction conditions to extract the image.

14. The information processing device according to claim 1, wherein the operations further comprise:
creating video content by using multiple video scenes extracted according to the extraction condition.

15. An information processing device comprising:
a memory storing program code, and
a processor configured to execute the program code to perform operations comprising:
providing a user interface that allows a designation operation for designating an extraction condition for an image group of images captured at an event related to marriage;
extracting an image from the image group according to the designated extraction condition; and
presenting a focal position of the extracted image.

16. An information processing device comprising:
a memory storing program code, and
a processor configured to execute the program code to perform operations comprising:
providing a user interface that allows a designation operation for designating an extraction condition for an image group of images captured at an event related to marriage;
extracting an image from the image group according to the designated extraction condition;
displaying a first icon of the extraction condition in a candidate region in a display screen and displaying a second icon designated by a predetermined operation in a selection region in the display screen; and
performing control for ending display of the second icon displayed in the selection region, according to a predetermined selection cancelling operation.

17. An information processing method performed by an information processing device, the method comprising:
providing a user interface that allows a designation operation for designating an extraction condition for an image group of images captured at an event related to marriage;
extracting an image from the image group according to the designated extraction condition;
displaying a first icon that indicates the extraction condition for the images of the image group, to detect an operation for the first icon as a designation operation for designating the extraction condition; and
displaying the first icon corresponding to an operation target for designating the extraction condition in a first display mode that is different from a second display mode of a second icon not corresponding to the operation target for the designation.

18. A non-transitory computer readable medium storing a program, the program being executable by a processor to perform operations comprising:
providing a user interface that allows a designation operation for designating an extraction condition for an image group of images captured at an event related to marriage;
extracting an image from the image group according to the designated extraction condition;
displaying a first icon that indicates the extraction condition for the images of the image group, to detect an operation for the first icon as a designation operation for designating the extraction condition; and
displaying the first icon corresponding to an operation target for designating the extraction condition in a first display mode that is different from a second display mode of a second icon not corresponding to the operation target for the designation.

* * * * *